(12) United States Patent
Hitomi et al.

(10) Patent No.: US 7,024,463 B1
(45) Date of Patent: Apr. 4, 2006

(54) NETWORK SYSTEM, CONTROL METHOD, CONTROL APPARATUS, AND MULTIPROCESSOR

(75) Inventors: Shigeru Hitomi, Kyoto (JP); Jintaro Deki, Kyoto (JP); Toshiaki Sasamori, Kyoto (JP)

(73) Assignee: Omron Corporation, Kyoto (JP)

( * ) Notice: Subject to any disclaimer, the term of this patent is extended or adjusted under 35 U.S.C. 154(b) by 398 days.

(21) Appl. No.: 10/110,457

(22) PCT Filed: Oct. 13, 2000

(86) PCT No.: PCT/JP00/07104

§ 371 (c)(1),
(2), (4) Date: Aug. 20, 2002

(87) PCT Pub. No.: WO01/27701

PCT Pub. Date: Apr. 19, 2001

(30) Foreign Application Priority Data

Oct. 15, 1999   (JP) ................................ 11-293957

(51) Int. Cl.
  G06F 15/16   (2006.01)
  G06F 12/00   (2006.01)

(52) U.S. Cl. ...................... 709/214; 709/201; 711/203; 711/141

(58) Field of Classification Search ................. 709/213, 709/201, 214; 711/203, 206, 207, 141
See application file for complete search history.

(56) References Cited

U.S. PATENT DOCUMENTS 6,081,833 A * 6/2000 Okamoto et al. ........... 709/213

FOREIGN PATENT DOCUMENTS

| JP | 09-54719 | 2/1997 |
| JP | 09-91011 | 4/1997 |
| JP | 10-23047 | 1/1998 |

* cited by examiner

Primary Examiner—Reginald G. Bragdon
(74) Attorney, Agent, or Firm—Foley & Lardner LLP

(57) ABSTRACT

A logical name of shared data is defined. A network system comprises a communication portion for exchanges of data with other control apparatuses; a link memory (15) for storing data shared through the network; an indirect reference table (16) for storing logical names and the pointers used to access data stored in the link memory; and a database (17) of variables in which logical names are associated with memory addresses in the indirect reference table storing the pointers of the logical names. A control execution portion (18) accesses the link memory through the indirect reference table based on a logical name so that there is no need to know the specific memory location. Specifically, the user program contains logical names and no addresses (pointers) storing data.

24 Claims, 47 Drawing Sheets

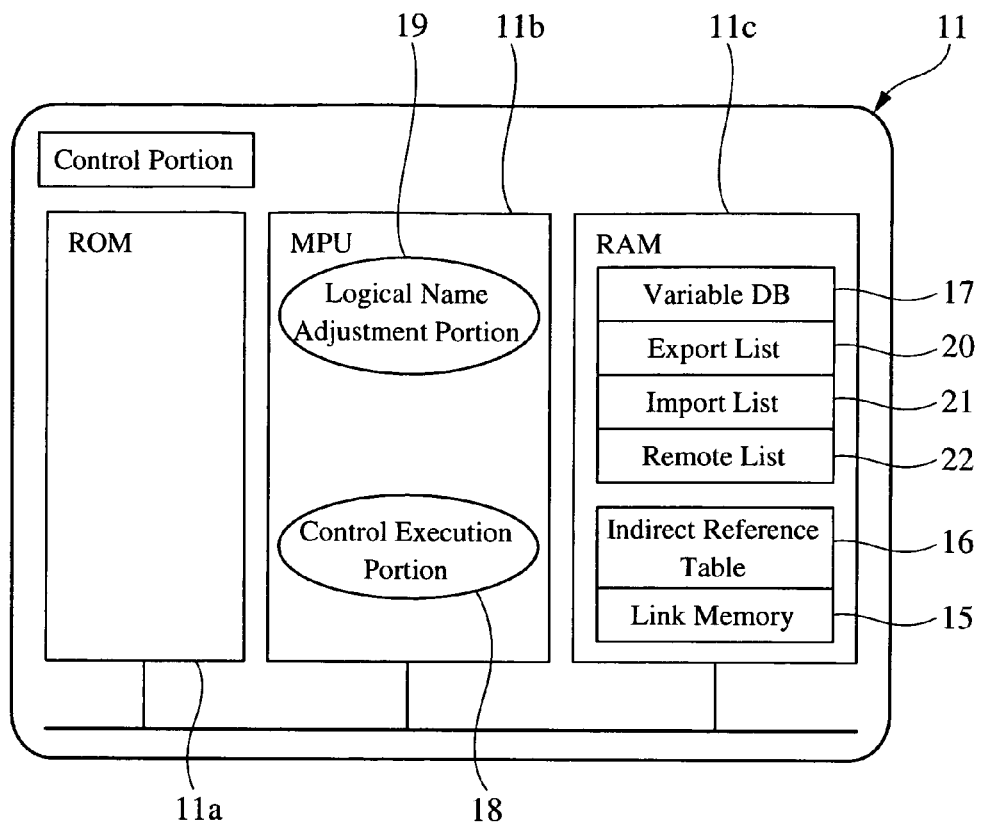

| Logical Name | Type | Size | Input / Output Attributes | Memory Address |
|---|---|---|---|---|
| Switch 1 | BOOL | 1 Bit | Input | 0000 |
| Motor 1 | BOOL | 1 Bit | Output | 0004 |
| ... | | | | |

| Link Area Pointers | |
|---|---|
| Word Position | Bit Position |
| 0x10000 | 00 |
| 0x10000 | 01 |
| 0x00500 | 00 |
| ... | ... |

NETWORK SYSTEM, CONTROL METHOD, CONTROL APPARATUS, AND MULTIPROCESSOR

TECHNICAL FIELD

The present invention is related to a network system, a control method, a control apparatus, and a multiprocessor system. More specifically, the present invention is related to improvements of processes of sharing data in a system (e.g., a distribution control system or the like) for planning the sharing of data between a plurality of nodes, control apparatuses and processors.

PRIOR ART TECHNOLOGY

There are situations where control apparatuses of PLCs or the like of a plurality of platforms are connected to a network, and these plurality of apparatuses execute cooperation/synchronization controls and the like while sharing data. In such case, in order for each control apparatus to share data, the respective I/Os thereof are physically connected, or a user program for sharing data is used.

Further, as another method of having each control apparatus share data, there is also the so-called data link method. This data link method is a method in which data is exchanged (linked) cyclically between a plurality of control apparatuses. Namely, all nodes possess a common table, and each control device can share data by referring to this table. At this time, the accessing of data is carried out by specifying the memory address (physical address). Further, this table is collectively established by a separate tool outside of the control apparatuses. This method has merit in the fact that no attention to communication needs to be made at the time the user program is developed.

However, the prior art methods described above have the problems described below. Namely, in the former method which uses a user program, it is necessary to bury communication logic inside the ladder program for operating the control apparatus (PLC), the development of the user program becomes complex, and maintenance is difficult.

Further, in the case of the latter data link method, it is difficult to establish the allocation of memory area at the time data is linked. Furthermore, a user program is provided to directly access the memory address with the ladder. Accordingly, after a memory area allocation has been temporarily established, if there is a change in this memory area allocation, the user program thereof needs to be rewritten, and this creates complications. Moreover, in the case where a new control apparatus is added to the network, the reallocation of the memory area and the accompanying changes to the user program must be made up to the existing user programs provided in control apparatuses already connected to the network, and there is the problem that the system must be shut down.

It is an object of the present invention to provide a network system, a control method, a control apparatus and a multiprocessor system which make it possible to easily access shared data without attention to the communication process, which make it possible to easily create developments for carrying out such access and corrections accompanying system changes thereafter, which make it possible to connect new nodes and control apparatuses and the like without having to shut the system down during operations, and which make it possible to dynamically solve the collation of the reference of the logical name and variable data.

SUMMARY OF THE INVENTION

In the network system according to the present invention, logical names of data shared between a plurality of nodes connected to a network are defined; said shared data is stored in prescribed memory regions of memory portions of said nodes; correlation information correlated with said logical names and memory position information of said memory portions storing data corresponding to the logical names is stored in correlation information memory portions; transmission and reception of said shared data between said plurality of nodes are carried out based on said logical names and said correlation information; and said correlation information is changed while the processes of the nodes connected to said network are operated without interruption in the case where the state of a communication partner node changes and the change has an effect on said correlation information.

Further, preferably, such network system is constructed so that said nodes group the logical names of data shared between the plurality of nodes, and store group control information correlated with the group name and updating information, and in the case where the updating information for the same group name stored in said plurality of nodes does not match, this is judged to be a time when there is an effect on said correlation information, and an updating process of said correlation information is carried out.

The memory portion of the node corresponds to the "link memory" in the embodiments. The memory position information of the memory portion corresponds to the "address, pointer" in the embodiments. The process of the node corresponds to the "execution of the user program" in the embodiments.

In this regard, as for the change in the state of a communication partner node, there are various kinds of state changes such as addition to or removal from the network, changes in the information stored in a node due to recompiling or the like, starting/stopping of operations even when there is a physical connection, and the like. In short, the case where a new control apparatus joins (plugs into) the network and the like are of course included.

Further, the control method according to the present invention is a control method in a control apparatus capable of sharing data with a plurality of control apparatuses connected to a network. Then, when a user program provided in said control apparatus accesses data stored in a memory portion, correlation information correlated with memory position information where said data is stored and with logical names assigned to the data is stored, and said user program acquires said correlation information based on the logical names, and accesses said memory portion.

Now, the control apparatus adapted for achieving the method described above is a control apparatus capable of sharing data with a plurality of control apparatuses connected to a network, and is constructed so as to be equipped with a communication portion which carries out data exchange with other control apparatuses; a memory portion which stores data shared through said network, wherein said shared data are defined by logical names; a correlation information memory portion which stores correlation information correlated with the logical names and memory position information of said memory portion storing data corresponding to the logical names; a control execution portion having a function which accesses said correlation information memory portion based on said logical names, acquires said position information corresponding to the logical names and accesses memory regions of said memory portion storing corresponding data; and updating means which update said correlation information of said correlation information memory portion based on changes of said position information inside said memory portion.

In this regard, the memory portion which stores shared data corresponds to the "link memory 15" in the embodiments. The memory position information of the memory portion corresponds to the "address, pointer" and the like in the embodiments. The correlation information memory portion is achieved by "the indirect reference table 16 and the variable database 17" in the embodiments. The updating of the memory position information inside the memory portion is a wide concept that includes addition/removal and the like. The updating means correspond to the "logical name adjustment portion 19" in the embodiments.

Now, preferably, said correlation information memory portion is provided with an indirect reference table which stores the memory position information used for accessing data stored in the memory portion, and a correspondence table having a correspondence with the memory position information inside said indirect reference table storing the logical names and the memory position information for the logical names. Of course, the control apparatus may be constructed without such structure. Now, the correspondence table having a correspondence with the memory position information corresponds to the "variable database" in the embodiments.

Further, as a preferred control apparatus for constructing a network system which carries out the updating process by group units described above, the inventions of each of the control apparatuses described above form a precondition, and such control apparatuses are further equipped with group control information memory means which group the logical names of data shared between a plurality of control apparatuses connected to said network, and store group control information correlated with the group name, updating information and information on the presence or absence of a possession right to such group; and wherein the updating means is provided with a function which executes a process for updating said correlation information of said correlation information memory portion for the data belonging to the group when the group name and updating information do not match the other control apparatuses.

The information on the presence or absence of a possession right corresponds to the server/client attribute in the embodiments, with a server attribute occurring in the case where there is a possession right, and a client attribute occurring in the case where there is no possession right. Further, the updating information is an item applied every time the content of the group is updated/revised, and in the case where there is a plurality of groups having the same group name, in the case where the updating information of each of such groups is the same, the updating information is information which insures that the content of the group is the same. In the embodiments, this corresponds to the ID or the version.

Further, the control apparatus having said possession right may be constructed so as to be equipped with updated information transmission means which transmit said updated information to the other control apparatuses that have the same group but not said possession right; and correlation information transmission means which transmit said correlation information of said correlation information memory portion for the data belonging to the group only when there is a request from said other control apparatuses.

Further, the control apparatus having said possession right may be constructed so as to be equipped with reference information memory means which store reference information on whether or not reference has been made for data forming input variables for the control apparatus having said possession right from the shared data belonging to the same group; and a function which, based on the reference information stored in said reference information memory means, carries out an updating process of said correlation information for the data only in the case where a reference has not been made to any of the other control apparatuses. The reference information memory means correspond to the reference counter in the embodiments. Now, the stored reference information may be a numeric value corresponding to the number of references, or "1/0" discriminating whether or not a reference has been carried out. This invention is achieved by the embodiment that executes the flowchart shown in FIG. 54.

Further, the control apparatus not having said possession right may be constructed so as to be equipped with reception means for receiving said updating information transmitted in from the other control apparatuses having the same group and said possession right; and request means which collate said updating information received by the reception means and the updating information controlled by itself, and in the case where these are different, make a request for the transmission of said correlation information of said correlation information memory portion for the data belonging to the group to the other control apparatuses having said possession right; wherein said updating means carry out updating of the correlation information held by itself based on said correlation information transmitted in following the request.

Furthermore, the control apparatus may be constructed so as to be equipped with judgment means which judge whether or not each control apparatus that shares data belonging to the same group shares the same data, and a function which stops the accessing of shared data belonging to said same group when said judgment means judges that the same data is not shared. This is achieved by the embodiment that executes the flowchart shown in FIG. 55. The judgment means carry out judgments, for example, by whether or not the logical name, name or data format match. Namely, in the case where the name, data format or the like does not match even for only one item among the shared data included in a group, the group validity is judged to be a mistake, and the use of such data is prohibited. The method of prohibiting access can be carried out, for example, by invalidating the address for accessing such data, or by carrying out rewriting in a special address.

Moreover, the control apparatus may be provided with updating stop command operation means, and means for prohibiting the execution of said updating process when a stop command is issued from the updating stop command operation means. The updating stop command operation means correspond to the "name solving lock switch" in the embodiments. This invention is achieved by the embodiment that executes the flowchart shown in FIG. 56. In the case where it is understood that there is no need for the updating process, by operating such updating stop command means to output a stop command, it is possible to proceed to the actual program execution without carrying out the process which judges whether or not the updating process is needed. Accordingly, a quicker setup can be carried out.

In each of the inventions described above, in the case where the control execution portion for operating the control apparatus (node) accesses data stored in the memory portion, it is possible to carry out access by acquiring correlation information based on the logical name. Accordingly, because there is no need for the control execution portion itself to know the specific memory position information of the data, even in the example where the memory position that stores the data is changed, a correspondence can be carried out by only correcting the correlation information, and there is no need to correct the user program and the like of the control execution portion side.

Further, even for the transmission and reception of data between the nodes (control apparatuses), the standardization of data is planned based on logical names, and based on the correlation information, it is possible to easily know which memory region of the memory portion of each node/control apparatus stores data forming required data, and data transfer can also be carried out easily.

Furthermore, in the case where the logical names are grouped and control is carried out by group units, in the case where the updating information of the same group name matches, the correlation information related to the shared data for such group held by each control apparatus (node) is considered to match. Accordingly, even in the case where there are changes in the correspondence table (variable database) due to, for example, a new addition to the network, recompiling, online editing or the like, because each control apparatus already possesses the same shared data, it is possible to quickly proceed to the actual operation of the control apparatus without the need to carry out the updating process of the correlation information.

Further, the control method according to the present invention may be constructed so that said correlation information is stored separately in an indirect reference table which stores memory position information used for accessing data stored in the memory portion, and a correspondence table (variable database) having a correspondence with the memory position information inside said indirect reference table storing the logical names and the memory position information for the logical names; and a process for notifying the other control apparatuses connected to the network about the changed content of said correspondence table is carried out in the case where the content of said correspondence table changes.

In this regard, the case where the content of the correspondence table changes includes various situations (which are the same below) such as of course the case where the content for an existing logical name changes, the case where the content for an already existing logical name is erased, the case in the reverse example where a new addition is made by plug in or the like, and the like.

The control apparatus adapted for executing such method is equipped with a function which transmits the changed content of said correspondence table to the other control apparatuses connected to the network in the case for example where the content of said correspondence table changes.

Further, the transmission of the changed content of the correspondence table includes of course the case where the data for a certain logical name of the correspondence table is transmitted as is, and the case where data of one portion thereof is transmitted. Furthermore, other information such as information of the indirect reference table or the like may be combined and transmitted therewith. Namely, in short, prescribed information related to the logical name for which the table content was changed may be transmitted. This is the same for the other inventions.

Further, in another control method according to the present invention, said correlation information is stored separately in an indirect reference table which stores memory position information used for accessing data stored in the memory portion, and a correspondence table having a correspondence with the memory position information inside said indirect reference table storing the logical names and the memory position information for the logical names; and each control apparatus that receives the notification of the changed content interprets the changed content and carries out a process for updating said indirect reference table.

The control apparatus adapted for executing such method is equipped with a function which, for example, when notification of the changed content of the correspondence table stored in the other control apparatuses is received through the network from the other control apparatuses, interprets the changed content, and updates its own said indirect reference table.

By providing such structure, in the case where there is a change in the correspondence table (variable database) due to a new control apparatus joining the network, recompiling, online editing or the like, such change can be sent to the other control apparatuses smoothly. Further, at the control apparatus side that receives such change, it is possible to update the correlation information and the like in accordance with the changed content. Accordingly, data corrections can be carried out without stopping the system during operation, and because additions can be carried out individually, incremental developments can be carried out by a plurality of people without the need to update the entire system all at once. Accordingly, the development environment is good, and it is possible to shorten the periods of development, debugging, system corrections and the like.

Furthermore, the control method may be constructed so that the logical names of data shared between a plurality of control apparatuses connected to said network are grouped, and group control information correlated with the group name, updating information and information on the presence or absence of a possession right to such group is stored; and said correlation information is updated when the group name and updating information do not match the other control apparatuses, and the updating process is not carried out in the case where there is a match.

When constructed in this way, even in the case where there are changes in the correspondence table (variable database) due to, for example, a new addition to the network, recompiling, online editing or the like, in the case where each control apparatus already possesses the same shared data, because the group name and the updating information will match, it is possible to quickly proceed to the actual operation of the control apparatus without the need to carry out the updating process of the correlation information again.

Furthermore, as for the received changed content, for example, all of such changed content may be updated and stored at once inside its own control apparatus, or it is possible to provided the structure described below in order to reduce the memory capacity. Of course, other configurations may be employed. Namely, the control method may be constructed so that the correlation information is stored separately in an indirect reference table which stores memory position information used for accessing data stored in the memory portion, and a correspondence table having a correspondence with the memory position information inside the indirect reference table storing the logical names and the memory position of the logical names; and each control apparatus that receives the notification of the changed content, judges whether or not it requires the data of the logical names corresponding to the changed content at the time of reception, and stores only required items; and next, the stored changed contents is interpreted, and a process for updating the indirect reference table is carried out.

Now, the control apparatus adapted for executing such method is constructed so as to be equipped with means which judge whether or not received notifications of the changed content of the correspondence table are related to logical names used by itself, and store only the notifications of changed content related to logical names used by itself, wherein said updating function is executed based on said stored changed content. When constructed in this way, because information not required for itself is not stored, it is possible to reduce the memory capacity for storing only required data.

Further, the control method may be constructed so that said correlation information is stored separately in an indirect reference table which stores memory position information used for accessing data stored in the memory portion, and a correspondence table having a correspondence with the memory position information inside said indirect reference table storing the logical names and the memory position information for the logical names; a message requesting the transmission of information related to the logical name used by itself is transmitted on the network; information related to said logical name sent in from the other control apparatuses in reply to said message is received; and a process for creating said indirect reference table is carried out based on said received information.

Now, the control apparatus adapted for executing such method is constructed so as to be equipped with means for transmitting a message requesting the transmission of information related to logical names used by itself on the network, and means which receive information related to said logical names sent in from the other control apparatuses in reply to said message, and create said indirect reference table based on the received information. When constructed in this way, because the transmission and reception of unnecessary information are not carried out, traffic becomes good.

Furthermore, another control apparatus according to the present invention can be constructed so as to be equipped with a function which publicizes the logical names used inside its own control apparatus to the other control apparatuses, and supplies data corresponding to the logical names to the other control apparatuses. Namely, it is possible to construct a control apparatus that only outputs data for the logical name.

Further, in a reverse arrangement, the control apparatus can be constructed so as to be equipped with a function which uses the logical names publicized by the other control apparatuses connected to the network, and refers to the supplied data corresponding to the publicized logical names. Namely, it is possible to construct a control apparatus that only inputs data for the logical name. Now, in the case where there is dependency on the control apparatus equipped with a function which publicizes the logical names used inside its own control apparatus to the other control apparatuses, and supplies data corresponding to the logical names to the other control apparatuses, this forms an apparatus equipped with a normal function which inputs and outputs data.

Moreover, the control apparatus can be constructed so as to be equipped with a function which interprets online edit requests received from a connected programming apparatus, carries out updating of the correspondence table in accordance with the interpretation, and updates said indirect reference table in accordance with the updating of the correspondence table. By providing such structure, it is possible to carry out data updating without stopping the system even when the apparatuses connected to the network are operating.

In the case where the online edit described above is carried out, the control apparatus can be constructed so as to possess a plurality of said indirect reference tables, and appropriate switching between the plurality of indirect reference tables is carried out to establish one indirect reference table in a state of use.

When constructed in this way, for example, by writing the content corrected by the online edit into the indirect reference table during a nonuse state, and then, for example, by switching the indirect reference table updated by the newly written content to a use state at a prescribed timing when a reference to the indirect reference table is not being carried out or the like, it becomes possible to rewrite the indirect reference table even when the user program and the like are operating, and this makes it possible to shorten the stopping time as much as possible.

Further, the multiprocessor system according to the present invention is a multiprocessor system in which occupied local memories possessed by a plurality of processors are connected by a pass, and is constructed so as to be equipped with a data transfer process portion which periodically carries out data exchange between each of said local memories; an indirect reference table used for accessing data stored inside the local memories; a control execution portion which possesses a mechanism for accessing data through said indirect reference table; and a logical name adjustment portion which controls a correspondence table of logical names and local memory addresses, and changes said indirect reference table based on such information. The plurality of processors corresponds to the "MPU" in the embodiments.

Namely, each of the inventions described above are inventions for the case where data is shared for the control apparatuses or nodes connected to the network, and the side that defines shared data by logical names and carries out access by such logical names can operate without being aware of the specific memory position of the data. Now, even in the invention equipped with this plurality of processors, in the case where data is transferred and shared by the plurality of processors, by defining the data by logical names, it is possible to carry out operations without being aware of the specific memory position of the data. Having such point in common, the operational effects thereof are also obtained by each of the inventions described above. Furthermore, even though no dependency was described for the invention equipped with this plurality of processors, it is possible to construct such invention with a dependency function the same as that of the control apparatus and control method.

The structural elements of the inventions described above can be combined as much as possible. Each of the means and functions constructing the control apparatus according to the present invention can be achieved by dedicated hardware circuits, or by a programmed computer. The control method according to the present invention can be achieved by software (program) which operates a computer, or by dedicated hardware circuits.

BRIEF DESCRIPTION OF THE DRAWINGS

FIG. 3 is a drawing showing one example of the internal structure of a control portion.

FIG. 4 is a drawing showing one example of the data structure of a link memory.

FIG. 44 is a flowchart showing an exchange function of a server-side control apparatus when a server joins the network or the like.

FIG. 52 is a flowchart showing an exchange function of a client-side control apparatus when a client joins the network or the like.

FIG. 53 is a flowchart showing the function for replying to an ID information request of a server-side control apparatus when a client joins the network or the like.

PREFERRED EMBODIMENTS OF THE INVENTION

The present invention will now be described in greater detail with reference to the appended drawings.

Figure 1:
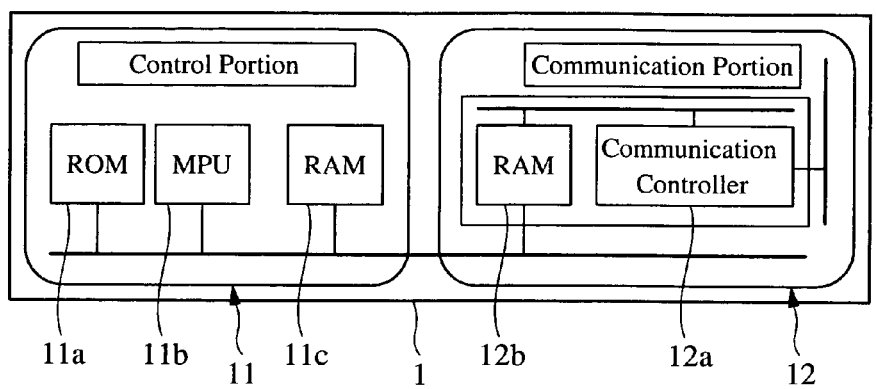
FIG. 1 is a block diagram showing a preferred embodiment of a control apparatus (node) according to the present invention.

FIG. 1 shows a preferred embodiment of a control apparatus according to the present invention. As shown in this drawing, the control apparatus is equipped with a control portion 11 and a communication portion 12. The control portion 11 executes a ladder program, and carries out essential control of the control apparatus, namely, a PLC 1. The communication portion 12 is connected to a network, and possesses a function for communicating with other control apparatuses. Specifically, the communication portion 12 includes a communication controller 12a which is connected to the network for carrying out transmission and reception of data (common data exchange when stated by the relationship with the present invention) by a prescribed communication protocol, and a RAM 12b which temporarily stores data at the time protocol changes are made when communication control is carried out by the communication controller 12a, which carries out protocol changes, and which holds information (database) in storage when specifying the transmission and reception destinations.

On the other hand, the control portion 11 includes a ROM 11a which stores control programs sent to connected devices, control programs used when carrying out cooperation operations with other PLCs connected to the network, and the like; a MPU 11b which executes programs stored in the ROM 11a; and a RAM 11c which stores data (control data) required when executing various processes by the MPU 11b. This hardware structure itself is basically the same as that of the prior art.

Figure 2:
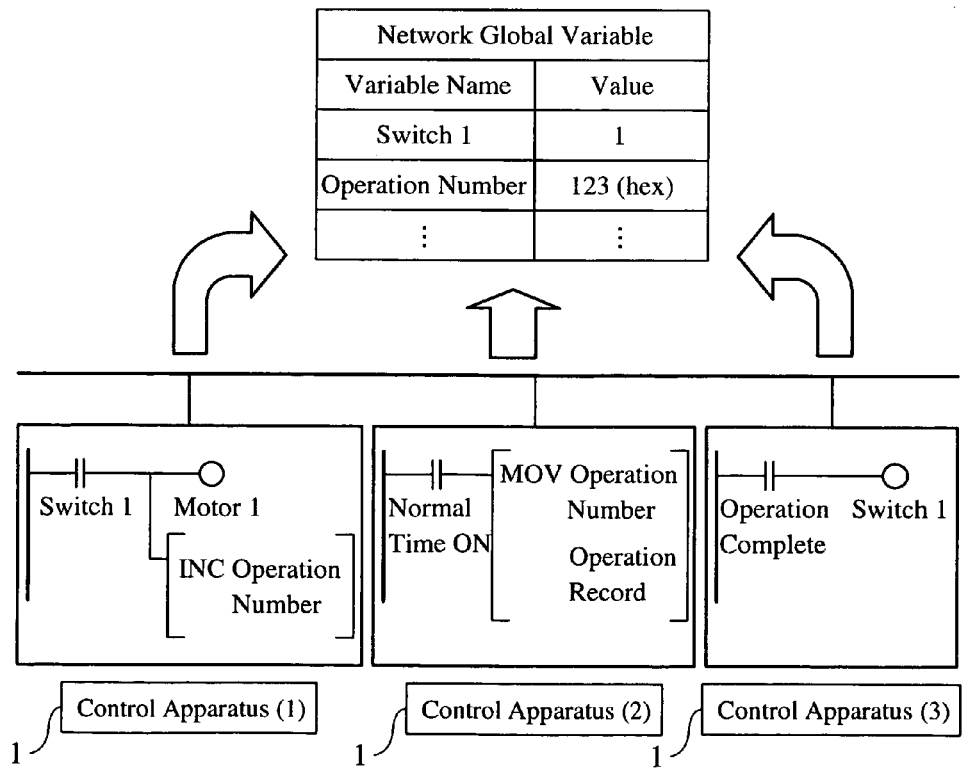
FIG. 2 is a drawing for describing a summary of the function of the present embodiment.

In this regard, in the present invention, as shown by the conceptual drawing in FIG. 2, respective data is defined by a logical name (network global variable), and the user program (object code) provided in each control apparatus (PLC) 1 acquires shared data by specifying the logical name. In this way, it is possible for each PLC 1 to share data without having to store the physical address that stores corresponding data, and because the physical address is not stored, after a recording is carried out once, it is possible to freely change the physical address that stores the shared data.

To show one example of this concept, as shown in FIG. 2, a Switch is defined (in the case shown in the drawing, variable name: value is defined as "Switch 1") by a certain PLC 1 (1). Then, in the case where another control apparatus (PLC 1 (3)) wants data of Switch 1 of the control apparatus (PLC 1 (1)), the user program of the control apparatus (PLC 1 (3)) specifies "Switch 1" which is a variable name, and by executing commands to acquire such data, it is possible to acquire concrete data correlated with Switch 1. In other words, data having the same content is defined by the same logical name, and this logical name has a sole existence on the network. Namely, different logical names are assigned to different data.

Then, in the case where there are changes in the data content, by having a prescribed PLC rewrite such content, the content stored in other PLCs sharing such data will also be rewritten.

Next, a description will be given for the specific structure for achieving the function described above. As shown in FIG. 3, such structure includes a link memory 15 for storing data (variable data) logically shared via the network inside the RAM 11c, an indirect reference table 16 used for referring to each variable data stored in the link memory 15, and a variable database 17 correlated with the logical names and the memory addresses (addresses of the indirect reference table 16). Further, a detailed description of each portion is given below.

On the other hand, the MPU 11b is equipped with a control execution portion 18 for executing control operations of a PLC 1 equipped with a function for accessing the link memory 15 via the indirect reference table 16, and a logical name adjustment portion 19 which controls the variable database 17, and which changes the indirect reference table 16 based on information stored in the variable database 17.

Next, a description of each portion will be given. First, the link memory 15 is a memory for storing logically shared data via the network as described above, and an example of such data structure is shown in FIG. 4. Namely, because the same logical name has a sole existence on the network and is shared by each of the control apparatuses (PLCs), there is an authorization for the process of updating and the like for the data of a certain logical name to be executed by one specific control apparatus on the network, and the other control apparatuses acquire data sent from such one control apparatus. In other words, with regard to the data of a certain logical name, the one control apparatus described above possesses a function for carrying out updating and the like on such data, and a function for supplying such changes to the other control apparatuses.

Accordingly, as shown in the drawings, there is a self node area which stores data related to the logical name (publicized logical name) that possesses a function for updating itself and the like as described above, and other node areas which store copies of the data related to the logical name that stores data forming the source for other control apparatuses. In the present embodiment, the link memory 15 is divided into individual nodes in order to improve the data transfer efficiency, but the present invention is not limited to this arrangement.

Furthermore, the offset value inside the area storing the data (variable data) of the shared same logical name (variable name) is common to each node. Namely, in the case where variable data x related to a certain logical name X is stored only as a prescribed size portion from an offset value N of the self node area of node (1) (as will be described later, a pointer related to the indirect reference table forms N), storage in prescribed positions of other node areas takes place in the other nodes. Then, these stored positions are stored in a prescribed size portion area from the offset value N of the other node areas for node (1). Namely, in the case where the variable data publicized by the other nodes which itself requires is stored in the other node areas of itself, storage takes place at the same offset value as the offset value from the head of the self node area in such publicized other nodes. In this way, by matching the offset value of each node area with the publicizing side and the utilization side, the various processes for maintaining common data can be easily carried out.

Furthermore, with regards to the actual transmission and reception of data, output may be carried out by the control apparatus that possesses the supplying function described above, or acquisition may be carried out by going and reading data from the control apparatus that possesses data forming the source for the other control apparatuses.

Figures 5, 6, 7:
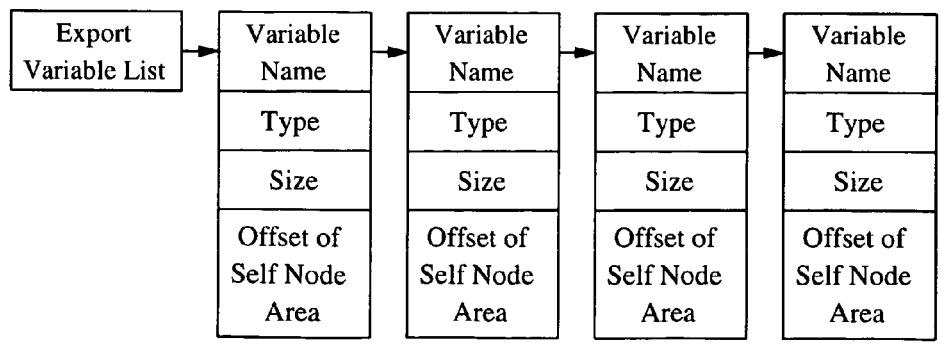
FIG. 5 is a drawing showing one example of the data structure of a variable database.
FIG. 6 is a drawing showing one example of the data structure of an indirect reference table.
FIG. 7 is a drawing showing one example of the data structure of an Export variable list.

Further as shown in FIG. 5, the data structure of the variable database 17 forms a table correlated with the "logical name", the "type", the "size", the "input/output attributes" and the "memory address". In this regard, the "size" is the data size of information related to the logical name, and the "input/output attributes" specify the transmission and reception directions of the data specified by the logical name.

Namely, the "output" of the input/output attributes means information related to the logical name stored in the node (PLC) is outputted to the other nodes. Then, data related to the logical name that forms the output of such input/output attributes is stored in a prescribed region of the self node area of the link memory 15.

Further, the "input" of the input/output attributes means information related to the logical name that will be used and the like by the node is acquired by being sent in from the other nodes. Then, data related to the logical name that forms the input of such input/output attributes is stored in a prescribed region of the other node areas of the link memory 15.

The "memory address" stores address information inside the indirect reference table which stores pointers specifying the position of the link memory 15 where the actual data related to the logical name is stored. Further, in the present embodiment, the offset of the indirect reference table is used. Accordingly, in order to access the indirect reference table 16 by referring to the memory address stored in the variable database 17, a value is formed by adding the above-described offset to the base address of the indirect reference table 16.

Further, in the present embodiment, because it is assumed that the specified address (pointer) of the link memory address stored in the indirect reference table 16 is expressed by 4 bytes, a value having a multiple of 4 is stored in the memory address of the variable database 17.

Now, in the example shown in the drawings, because the memory address of the logical name "Switch 1" is "0000", the data inside the link memory 15 shown by the pointer stored in the head (first) memory region of the indirect reference table 16 shown in FIG. 6 forms data related to "Switch 1". In the same manner, because the memory address of the logical name "Motor 1" is "0004", the data inside the link memory 15 shown by the pointer stored in the second memory region of the indirect reference table 16 shown in FIG. 6 forms data related to "Motor 1".

Further, as shown in FIG. 6, the data structure of the indirect reference table 16 stores the pointer inside the link memory 15 which stores data related to each logical name. Now, in the present embodiment, the pointers which specify the memory areas inside the link memory 15 are specified by 4 bytes, with the upper 3 bytes specifying the word position, and the lower 1 byte specifying the bit position storing data forming the object inside the word position.

Now, for each of these stored pointers, which logical name a pointer is related to is specified by the correlation between the memory address and the logical name stored in the variable database 17 as described above. In other words, the n'th pointer from the head of the indirect reference table 16 is recorded as a pointer related to a prescribed logical name in advance, and this will not change so long as the memory content (memory address) of the variable database 17 is not changed.

Namely, in the case where changes are made to the memory area of data related to a certain logical name for example, a correspondence is made by updating the corresponding pointer stored in the area storing pointers related to the logical names of the indirect reference table 16. Even in this case, operations can be completed without changing the memory contents of the variable database 17. Accordingly, in the case where the program which has the control apparatus carry out actual control has a need to know information related to the logical name for sharing data, first, the indirect reference table 16 is accessed to acquire a pointer in accordance with the memory address stored in the variable database 17. Next, the data indicated by such pointer is acquired. In this way, regardless of the presence or absence of changes to the specific memory area, it is possible for the above-described program to acquire data and carry out operations correctly.

Furthermore, in the present embodiment, the RAM 11c is provided with an Export variable list 20, an Import variable list 21 and a Remote variable list 22 for carrying out transmission and reception of data corresponding to the memory content of the indirect reference table 16 described above, and the actual logical name, and carrying out the sharing of data smoothly and reliably. These variable lists 20~22 are created based on information stored in the variable database 17, and the specific structures thereof are as follows below.

First, the Export variable list 20 is a list of network global variables outputted from the self node. Further, as shown in FIG. 7, the data structure thereof is formed from a table (hereafter called "Export conversion information table") formed from the variable name (logical name), the type and size (number of bytes) of the variable, and the offset of the self node area (see FIG. 4) inside the link memory 15 storing data of such variable.

Such table extracts the item that has "Output" in the input/output attributes column of the variable database 5 shown in FIG. 5, and by accessing the indirect reference table (see FIG. 6) from the memory address column and acquiring the offset (region storing data related to the logical name for controlling itself) of the self node area, it is possible to create a list like that shown in FIG. 7.

Figure 8:
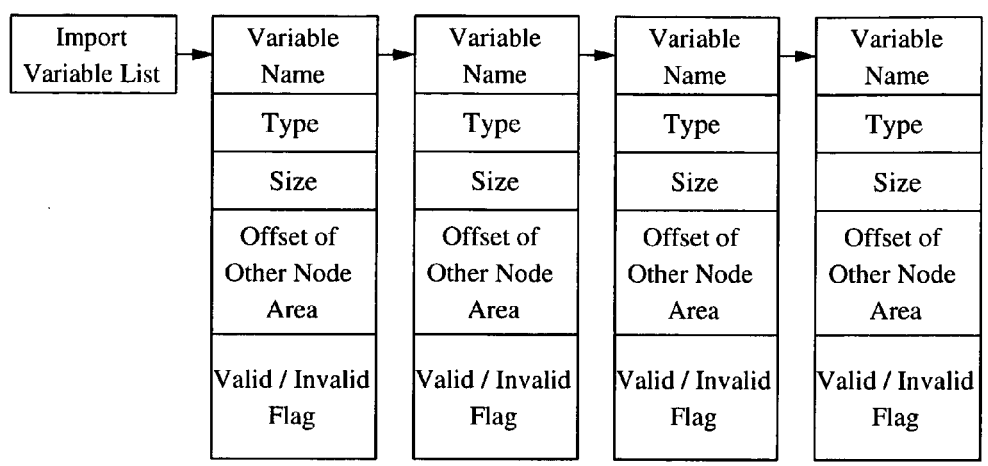
FIG. 8 is a drawing showing one example of the data structure of an Import variable list.

On the other hand, the Import variable list 21 is a list of network global variables inputted from other nodes, and as shown in FIG. 8, the data structure thereof is formed from a table (hereafter called "Import conversion information table") equipped with the variable name (logical name), the type and size (number of bytes) of the variable, the offset of the other node area (see FIG. 4) inside the link memory 15 storing data of such variable, and additionally a flag showing whether such variable is valid or invalid.

Such table extracts the item that has "Input" in the input/output attributes column of the variable database 5 shown in FIG. 5, and by accessing the indirect reference table (see FIG. 6) from the memory address column, and acquiring the offset (region storing data sent in from other nodes) of the other node area inside the link memory 15, it is possible to create a list like that shown in FIG. 8.

Figure 9:
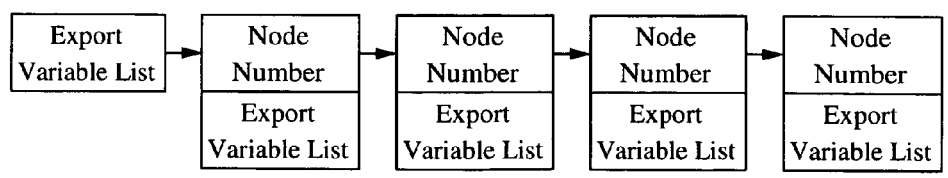
FIG. 9 is a drawing showing one example of the data structure of a Remote variable list.

Further, the Remote variable list 22 is a list which stores the received other node variable list classified by node. As shown in FIG. 9, the data structure thereof is formed from a table (hereafter called "Remote conversion information table") storing the node number and the head pointer of the Export variable list.

Figure 10:
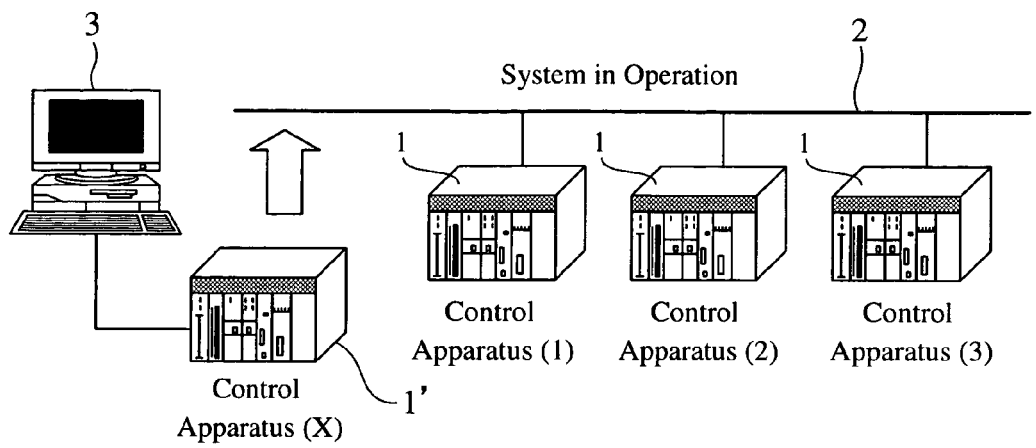
FIG. 10 is a drawing showing a preferred embodiment of a network system.

Each table information described above is carried out using a programming apparatus (tool). Namely, as shown in FIG. 10, each control apparatus 1 is connected in LAN2 to a network in which the system is already operating. In such case, before a new control apparatus (X) 1' is added to the network, a programming apparatus 3 is connected to the control apparatus (X) 1', and prescribed data/information is downloaded into the control apparatus (X) 1' from the programming apparatus 3.

Figure 11:
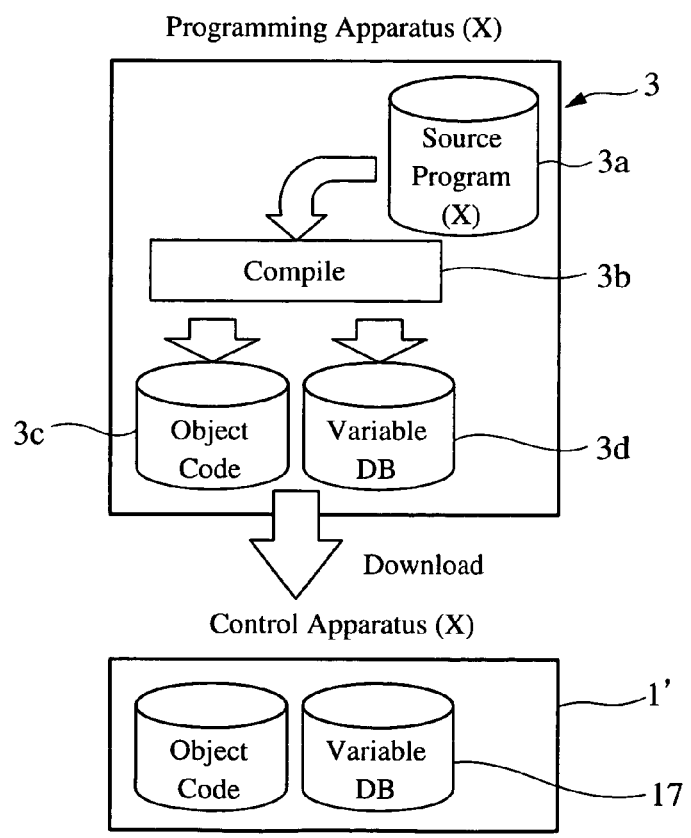
FIG. 11 is a drawing for describing the operation of downloading to a control apparatus using a programming apparatus.

Specifically, as shown in FIG. 11, first, using the programming apparatus 3, a user creates a source program 3a by a ladder, higher language or the like. At this time, the data shared by a plurality of control apparatuses (1), (2), (3), ..., (X) is defined as the same logical name by each control apparatus, and network sharing attributes are assigned.

Then, a compile function 3b of the programming apparatus 3 is executed to compile the source program 3a created as described above, and an object code 3c for having the control apparatus execute essential controls, and a required variable database (see FIG. 5) 3d for sharing data of the same logical name are created.

Next, the programming apparatus 3 downloads the created object code 3c and variable database 3d into the control apparatus (X) 1'. Then, these downloaded object code and variable database are stored in a non-volatile memory of the control apparatus (X) 1'.

Further, although an example was described in which the above-described programming apparatus was connected to the control apparatus (X) 1' in the example shown in the drawing to carry out downloading therefor, even for each of the control apparatuses (1), (2), ... already connected to the network, before (at the time of) connecting to the network, such control apparatuses are connected to the programming apparatus, and prescribed data/information is downloaded.

Next, a description will be given for the logical name adjustment portion 19. The logical name adjustment portion 19 includes a function for creating the Export variable list 20 and the Import variable list 21 based on information stored in the variable database 17 downloaded as described above. The specific creation process is like that mentioned in the description of the Export variable list 20 and the Import variable list 21 described above.

Figure 12:
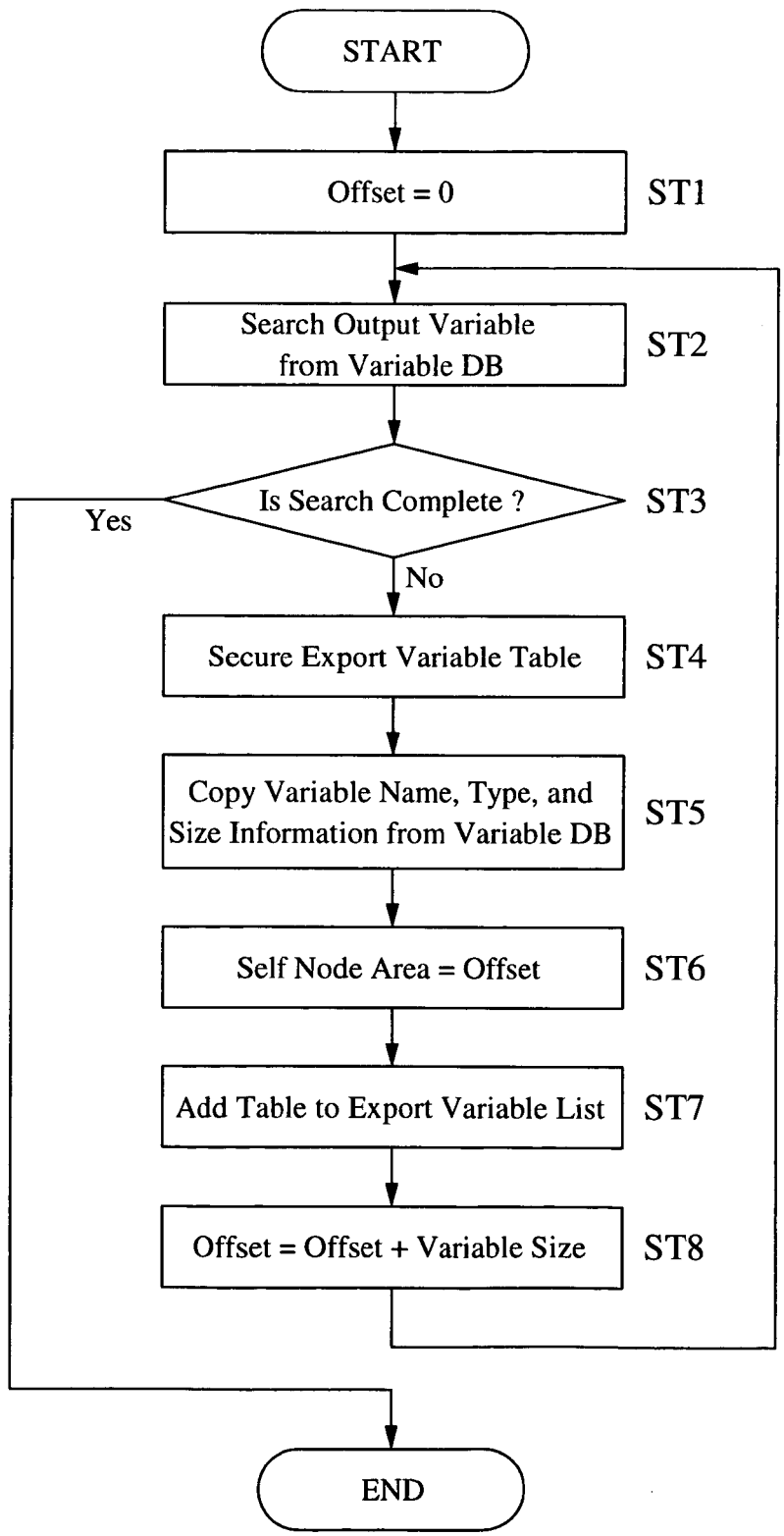
FIG. 12 is a flowchart showing the function for creating the Export variable list which is one portion of the function of the logical name adjustment portion.

Namely, as shown by the flowchart shown in FIG. 12, the creation of the Export variable list 20 establishes 0 as the offset value (ST1), and the output variable formed by accessing the variable database 17 and outputting the input/output attribute, namely the network global variable publicized for the other nodes by the self node is searched (ST2).

Then, each time a search is carried out, an Export conversion table storing the Export conversion information table related to such variable is secured (ST3, ST4). Then, the variable name, type, and size information stored in the variable database 17 is copied in such secured table (ST5).

Next, offset information of the self node area that stores data (variable data) of such variable is acquired, and the information obtained at Step 5 and Step 6 is added to the Export variable list (ST7). Accordingly, the first item has an offset of 0, namely, registration is carried out from the head of the self node area.

Thereafter, the variable size is added to the current offset value to calculate a new offset value (ST8), and the flowchart returns to Step 2. Then, the processes described above are repeatedly carried out until all the output variables have been searched. In this way, the regions storing each variable data from the head of the self node area is secured in an order manner without a gap.

Figure 13:
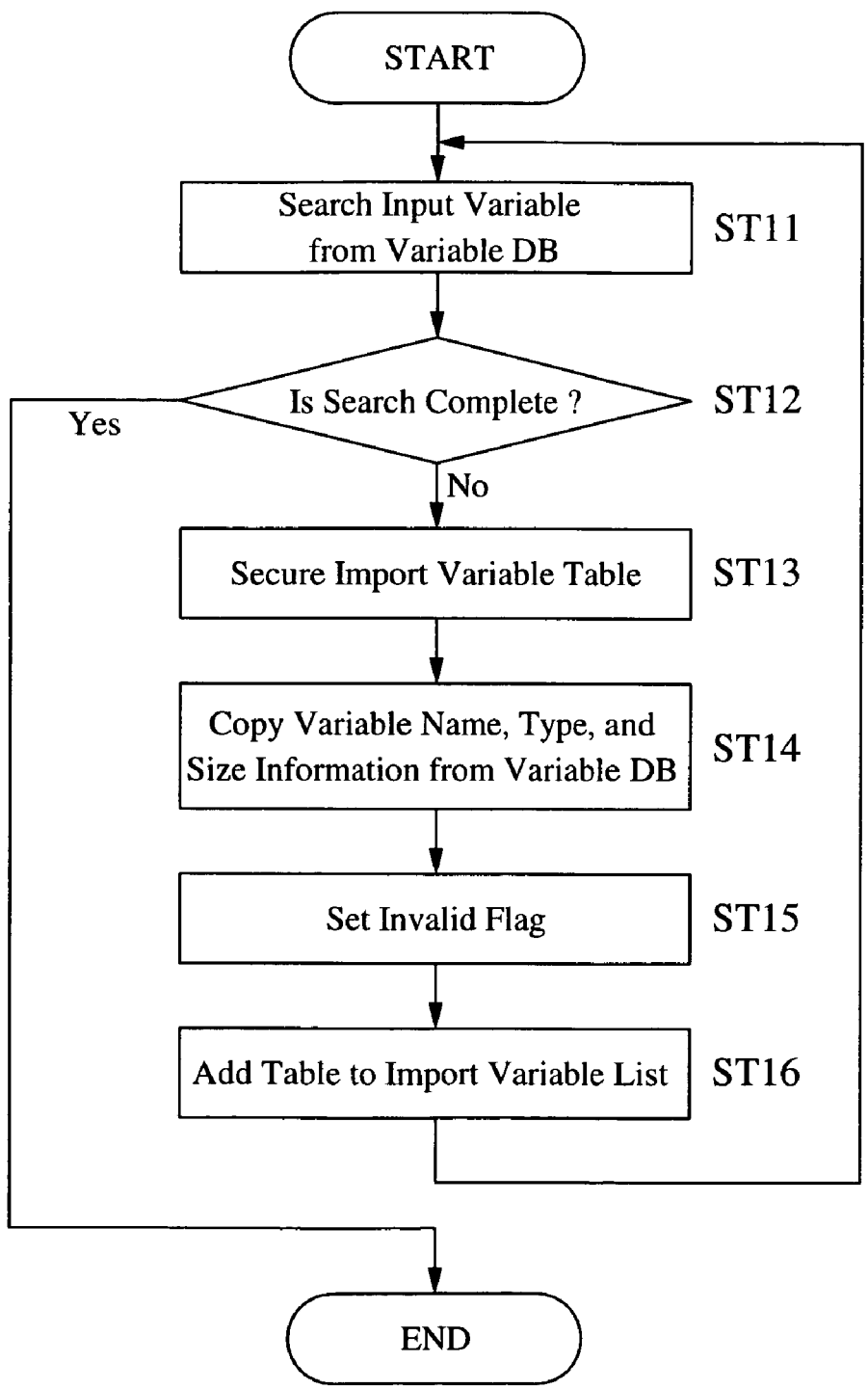
FIG. 13 is a flowchart showing the function for creating the Import variable list which is one portion of the function of the logical name adjustment portion.

On the other hand, the creation of the Import variable list 21 is achieved by the flowchart shown in FIG. 13. Namely, the input variable when the input/output attribute forms an input, namely the network global variable of the other node used by the self node is searched from the variable database 17 (ST11).

Then, each time a search is carried out, an Import conversion table storing the Import conversion information table related to such variable is secured (ST12, ST13). Then, the variable name, type, and size information stored in the variable database 17 is copied in such secured table (ST14). Further, the invalid flag is set (ST15), and the information obtained at Step 14 and Step 15 is added to the Import variable list (ST16). Thereafter, the flowchart returns to Step 11. Then, the processes described above are repeatedly carried out until all the input variables have been searched.

Further, in addition to the function for creating both the conversion tables described above, the logical name adjustment portion 19 also includes a function for updating the conversion tables described below, and the like. Namely, in the case where a control apparatus 1 is connected to a network already in operation, the logical name adjustment portion 19 carries out a simultaneous broadcast of the Export variable list 20 possessed by itself, and exchanges information of network global variables with the other control apparatuses.

Figure 14:
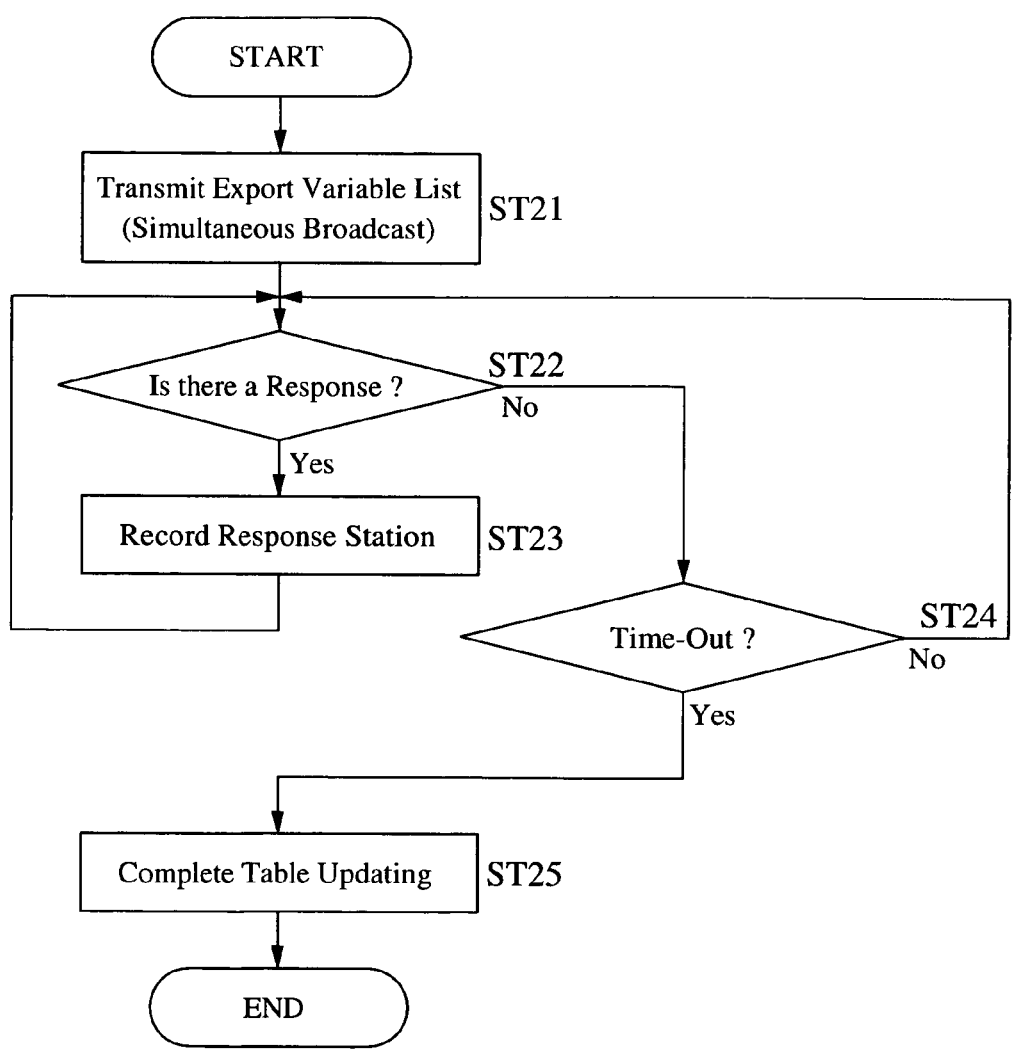
FIG. 14 is a flowchart for describing the process function of the side that distributes the Export variable list.

Namely, as shown in FIG. 14, first, the logical name adjustment portion 19 of the side transmitting the Export variable list carries out transmission of the Export variable list by simultaneous broadcast (ST21). As described below, because response signals are transmitted in from the other control apparatuses (nodes) at the side receiving such simultaneous broadcast, a judgment of whether or not such response signals exist is carried out (ST22). Then, in the case where response signals exist, the response stations issuing such response signals are recorded (ST23).

Then, a check of the presence or absence of a response signal is carried out until a time-out is made (ST24), and when a time-out is made, table updating is completed (ST25). In this way, it is possible for the node transmitting the Export variable list to judge who received the Export variable list and who did not receive such list.

Further, as for the transmission timing of the Export variable list, in addition to the time where a new control apparatus is added/connected to the network as described above, there are also the case where the memory content of the variable database 17 is changed in accordance with user program revisions, compile executions or the like, and the case where the memory content of the variable database 17 of the active control apparatus is changed in accordance with an online edit described below. Then, in the case where the version is updated each time a change is made, and the Export variable list is transmitted (simultaneously broadcasted), such version information will also be sent together therewith. Accordingly, the nodes at the reception side include the case where the Export variable list is received for the first time, and the case where reception has already occurred. Further, this version information does not necessarily have to be provided in the present invention. Further, the synchronization method of the table that uses the version information will be described below.

Figure 15:
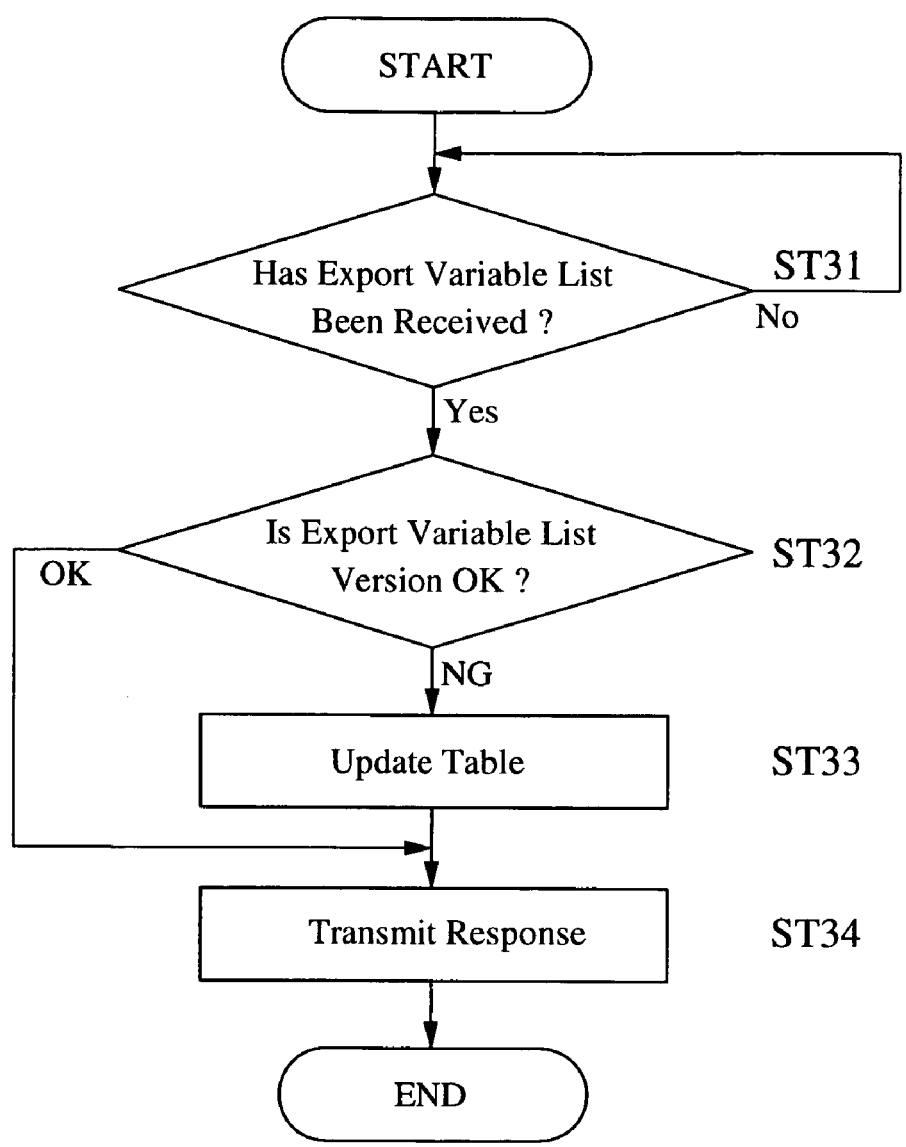
FIG. 15 is a flowchart for describing the process function of the side that receives the Export variable list.

On the other hand, a function for executing the flowchart shown in FIG. 15 is provided at the side of the existing other nodes (control apparatuses) that receive the Export variable list as described above. Namely, a judgment of whether or not the Export variable list has been received is carried out (ST31), and in the case where reception has occurred, a judgment of whether such version of the Export variable list matches the version previously received and stored is carried out (ST32).

Then, in the case where a match does not occur, the Export variable list is judged to have been updated, and the stored table (Import variable list and the like for the nodes of the reception side) is updated (ST33). Further, even in the case where the Export variable list is received for the first time, the version is judged to not match, and a table updating is carried out.

Then, after updating the table at Step 33, and in the case where the versions match at the branching judgment of Step 32 (updating is unnecessary), a response signal is transmitted to the node that is the transmission source of the Export variable list, and the process is completed (ST34).

Figure 16:
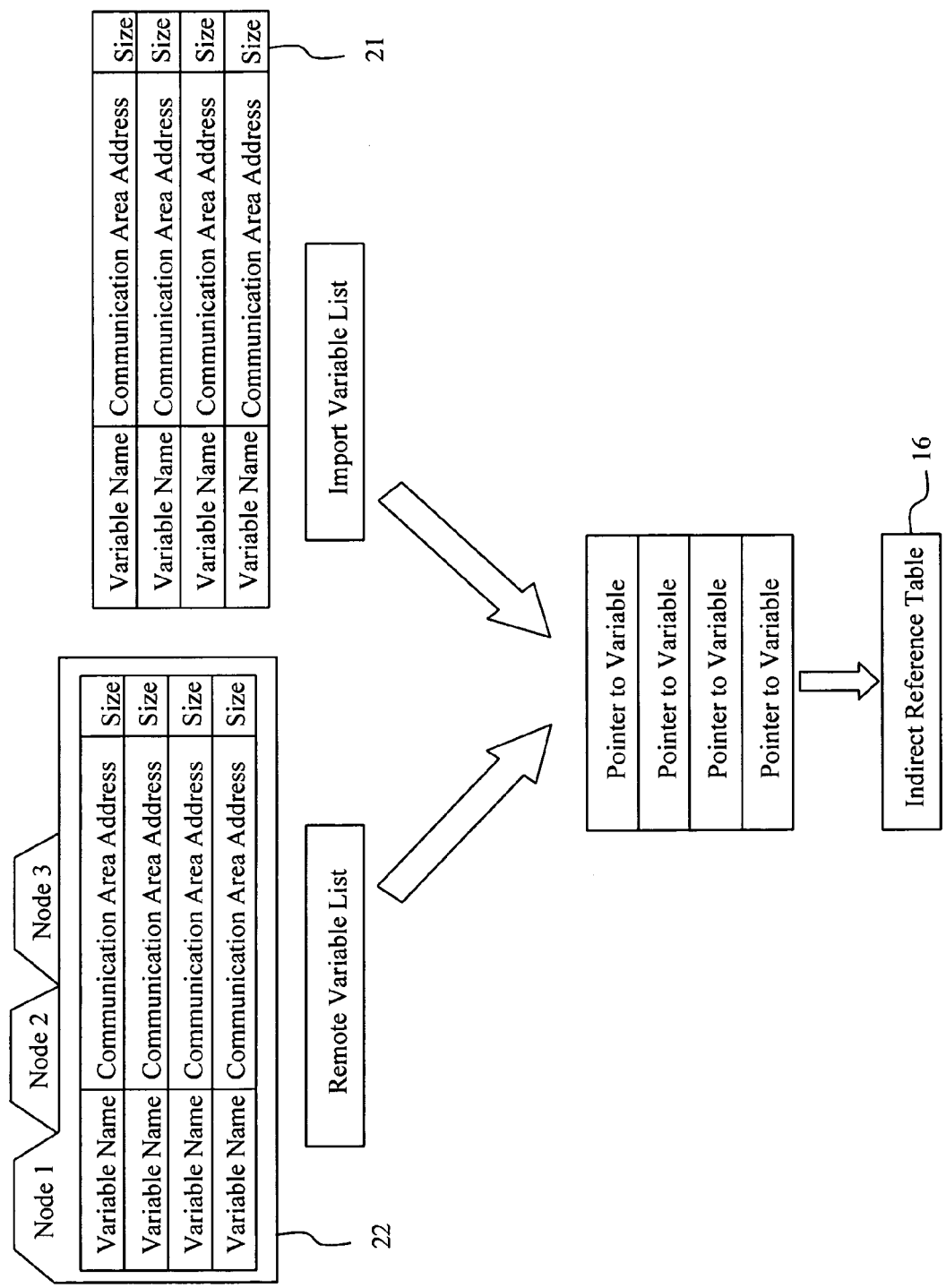
FIG. 16 is a drawing for describing the function which creates the indirect reference table from the Remote variable list and the Import variable list.

Further, the logical name adjustment portion 19 includes a function for creating the Remote variable list based on the received Export variable list. Namely, in the process of the reception side shown in FIG. 15, when the Export variable list transmitted in from another node is received, this is controlled as a Remote variable list for each node. In other words, regardless of whether or not the received variable data is required by the node, all the information related to the Export variable list is uptaked temporarily in the control apparatus, and held in storage. This list is held in a non-volatile memory. Specifically, as shown in FIG. 16, the Export variable list sent in from node 1 is stored in the table area of node 1.

Then, the logical name adjustment portion 19 creates/updates the indirect reference table 16 based on the Import variable list 21 and the Remote variable list obtained as described above. To give a conceptual description, with the variable name (logical name) used by the self node stored in the Import variable list 21 forming a key, the Remote variable list 22 is searched, the matching variable name is acquired, the pointer to the link memory 15 of the self node storing variable data related to such variable is calculated, and this is stored in a related memory area of the indirect reference table 16.

Figure 17:
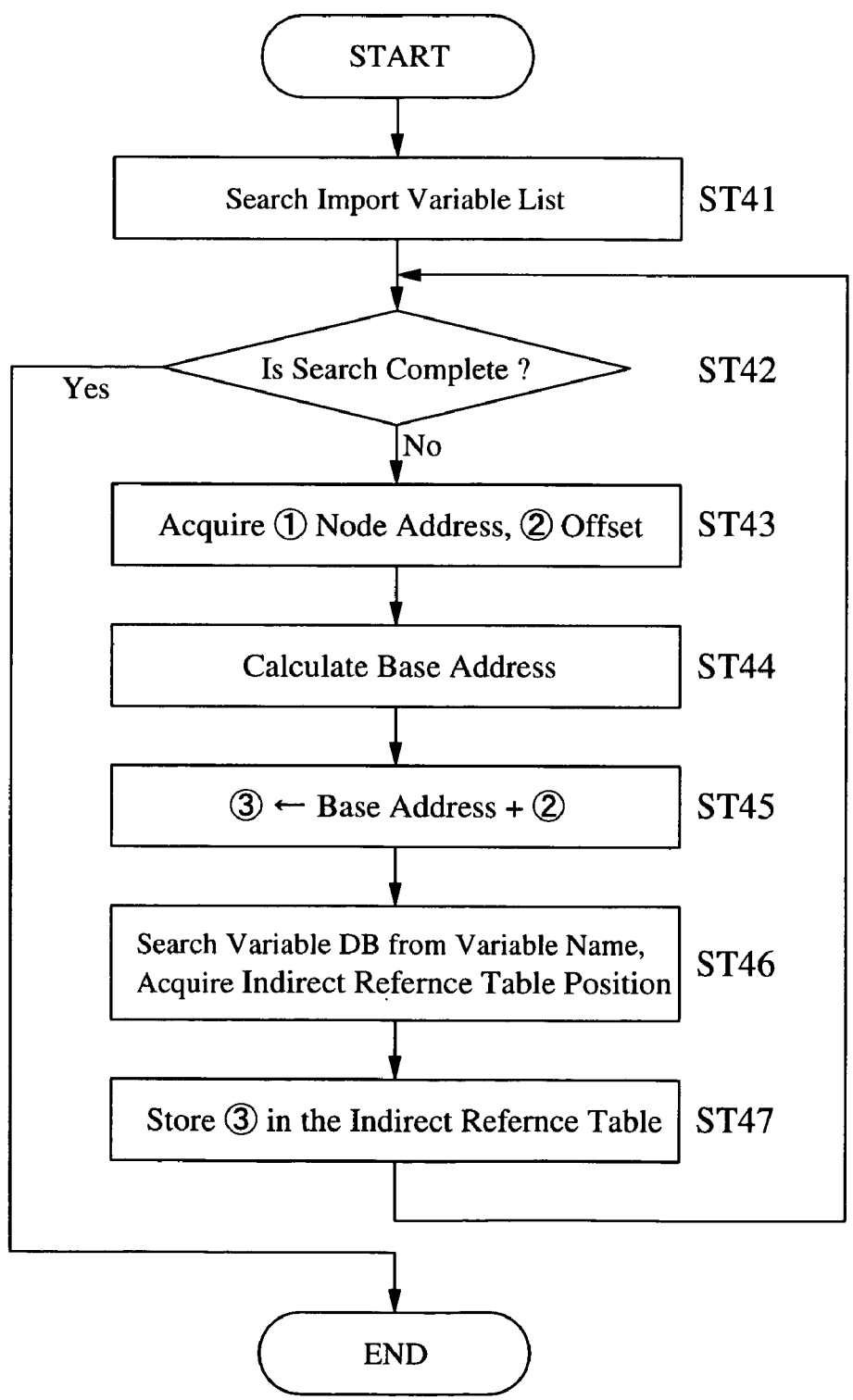
FIG. 17 is a flowchart showing the updating function of the indirect reference table which is one portion of the function of the logical name adjustment portion.

Further, in the case where a new control apparatus joins the network like the control apparatus (X) 1' described above, an Export variable list request is carried out for nodes that have not received the Export variable list. In this way, the creation/updating of the Remote variable list 22 through the indirect reference table 16 is carried out based on the received Export variable list. Specifically, the flowchart shown in FIG. 17 is executed.

First, the Import variable list 21 is searched in order (ST41, ST42), and the process described below is carried out for each searched variable name (logical name). Namely, the Remote variable list is searched with the acquired variable name as a key, and the node address ① of the control apparatus publicizing such variable, and the self node area offset ② inside the link memory of such apparatus are acquired (ST43).

Next, the base address (head address) of the other node area (the area for the node publicizing the variable) related to ① of the link memory is calculated (ST44). Then, a value ③ is calculated by adding the offset ② calculated at Step 43 to the base address (ST45). Namely, in the corresponding node area, because the offset values of regions storing variable data of the same logical name (variable name) are equal, the above-described calculated value ③ forms the head address of the link area storing the variable data.

Next, the variable database 17 is searched based on the variable name, and the indirect reference table position (location storing the pointer of the variable name) is acquired (ST46). Namely, the offset address recorded in the memory address column shown in FIG. 5 is acquired. Then, in accordance with this acquired offset address, the value ③ (pointer showing the head position of the region storing the variable data inside the link memory 15) calculated at Step 45 is stored in the storage region of the related indirect reference table. In this way, updating of the indirect reference table can be carried out.

Figure 18:
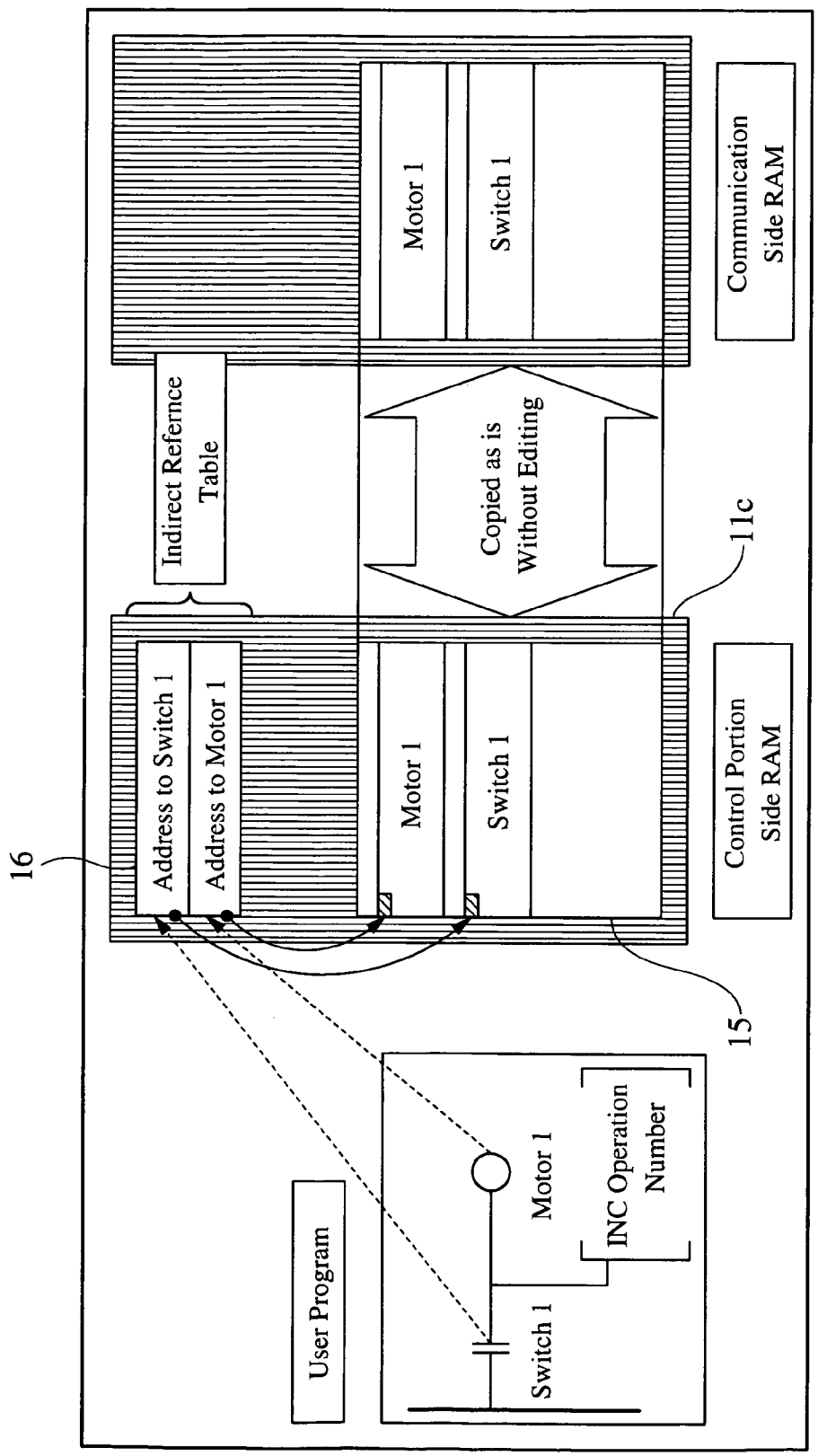
FIG. 18 is a conceptual drawing showing a specific example of the updating function of the indirect reference table which is one portion of the function of the logical name adjustment portion.

In this way, as shown in FIG. 18, for the variable database 17 shown in FIG. 5, in the example case where the storage region inside the link memory 15 of the variable data related to the logical name (variable name) "Switch 1" is as shown in the drawings, the address (pointer) of the head of such region is stored in the column (offset address 0000: head) of Switch 1 of the indirect reference table 16.

Figure 19:
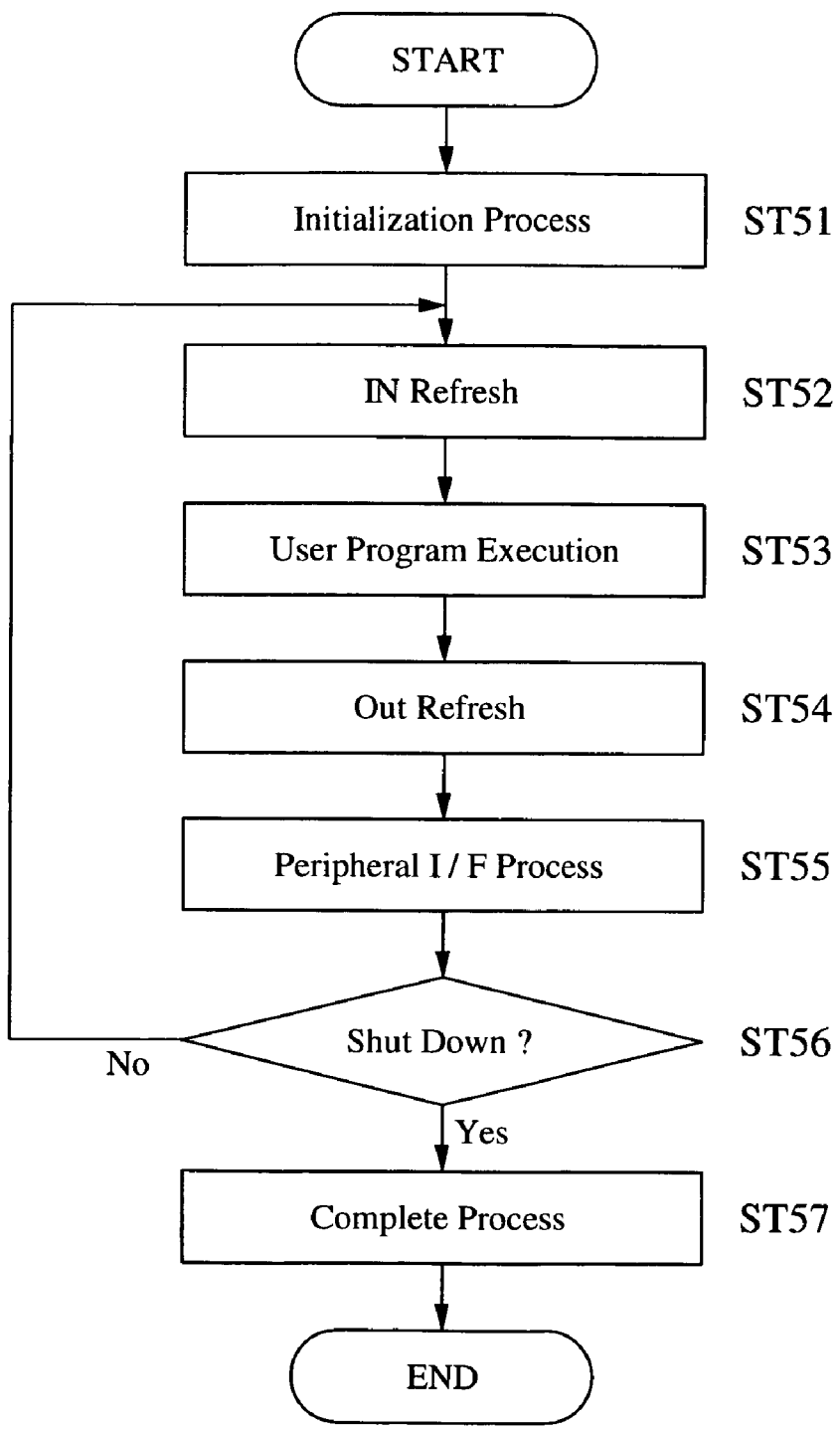
FIG. 19 is a flowchart showing the function of a control execution portion.

As described above, by having the logical name adjustment portion 19 update the content of the indirect reference table 16 and each of the lists 20~22 inside each node (control apparatus 1) each time, even when the content of the variable data stored inside the link memory 15 and the storage region of the variable data are changed, because the storage position (offset address) of the indirect reference table 16 related to a certain variable name (logical name) does not change (even in the case where a change is assumed to occur, this can be known by looking at the memory address column of the variable database), the control execution portion 18 can access the link memory 15 through the indirect reference table 16, acquire desired variable data, and execute a proper control system. Now, such function of the control execution portion 18 is like the flowchart shown in FIG. 19.

Figure 20:
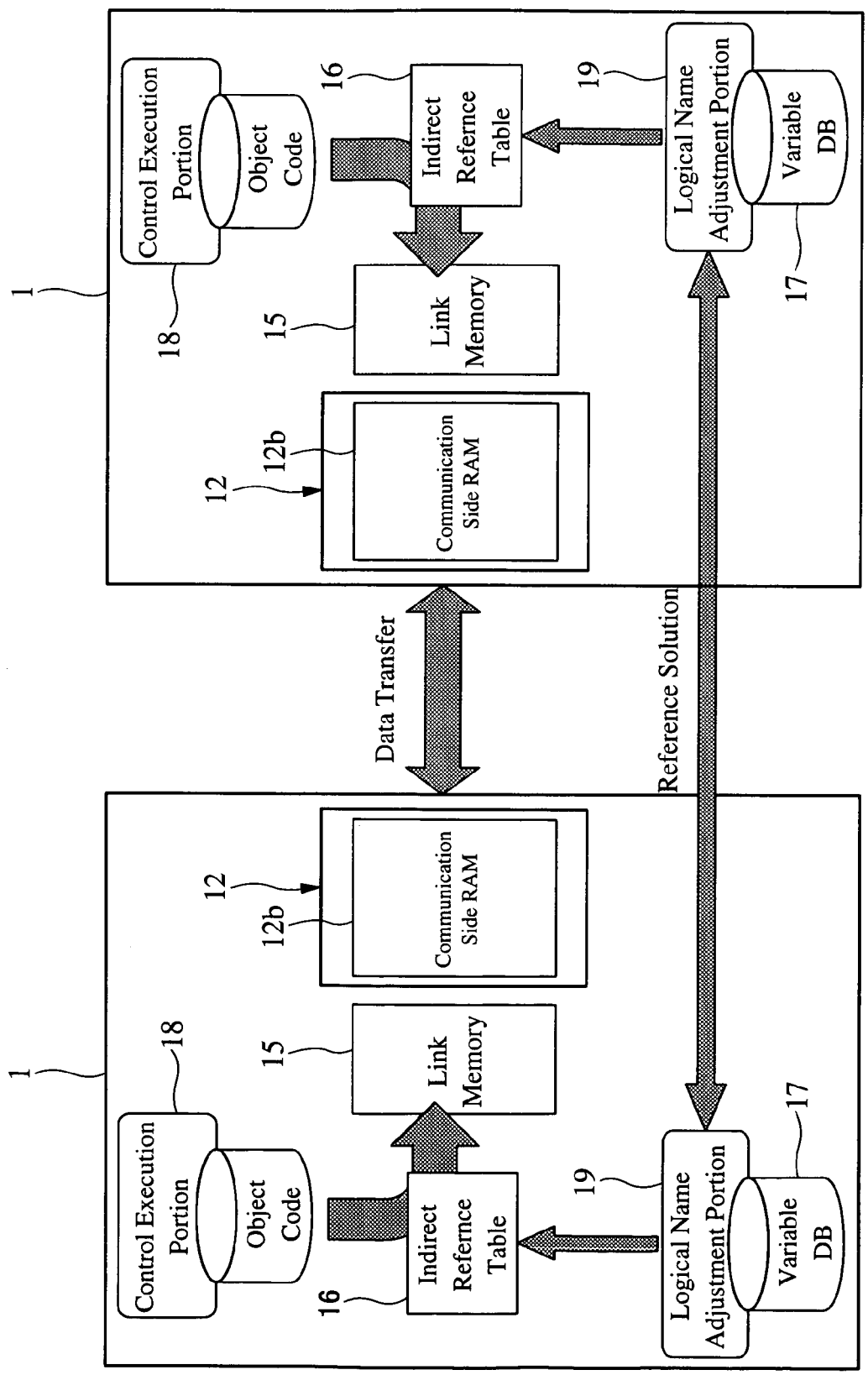
FIG. 20 is a drawing showing one example of the execution phase of the control apparatus.

Namely, after first carrying out an initialization process (ST51), an IN refresh is carried out (ST52). In other words, the area network global variables (variable data) stored in the other node areas of the link memory 15 are read out. Then, the user program (normal control) is executed (ST53), and an OUT refresh is carried out (ST54). Namely, the network global variables (variable data) publicized by itself are written into the self node area of the link memory 15. Next, a peripheral I/F process is carried out (ST55). In this way, while carrying out accessing (reading/writing variable data) for the link memory 15, the process for executing the user program is repeatedly carried out until the system is shut down (ST56, ST57). Further, FIG. 20 shows a conceptual drawing of the control apparatuses 1 and 1' at the time the user program is executed while accessing the link memory 15 as described above.

Further, the actual transmission and reception of the variable data stored in the link memory 15 is carried out between the control apparatuses 1 (nodes) through the communication portion 12. First, to give a conceptual description, the data (variable data) assigned to the self node area inside the link memory 15 is transmitted to the other nodes by a simultaneous broadcast communication method or the like, and data (variable data) assigned to the other node areas is received from corresponding other nodes.

Figure 21:
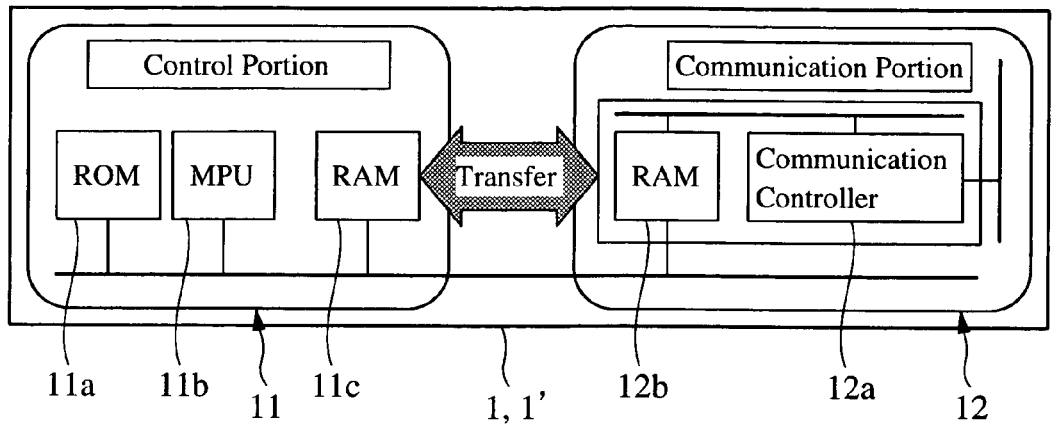
FIG. 21 is a drawing for describing the transfer of data between the control portion side RAM and the communication side RAM inside the control apparatus.

Namely, as shown in FIG. 21, required data is transferred between the RAM 11c of the control portion 11 side storing the link memory, and the RAM 12b of the communication portion 12 side. In this regard, as shown in FIG. 20, the data assigned to the self node area of the link memory 15 is copied and transferred temporarily to the communication side RAM 12b of the communication portion 12, and by carrying out data transfer according to simultaneous broadcast between each control apparatus by the fellow communication side RAM 12b (strictly, through the communication controller 12a) thereof, data is transmitted to the other node (control apparatus) side. Further, at the other node side that receives this, data required by the self node is transferred from the communication portion 12 (communication side RAM 12b) to the control portion 11 (control side RAM 11c) based on the transfer data size calculated from the Export variable list and the Import variable list. Furthermore, at the communication portion 12 side, a prescribed process is carried out based on such received data in the manner described above.

Further, the process function for transferring data between the control portion 11 and the communication portion 12 inside the control apparatus is as follows below. First, in the present embodiment, the communication portion 12 begins a cyclic communication service by a request from the control portion 11. Namely, the communication portion 12 calculates and establishes communication parameters based on the Export variable list and the Import variable list received from the control portion 11, and activates or subscribes to a cyclic communication service.

Further, the cyclic data includes valid/invalid information indicating whether or not the data can be used by the reception side. This valid/invalid information is established at the transmission side. Then, when this valid/invalid information is "valid", it is possible to judge that the communication portion of the reception side may transfer the received cyclic data to the control portion.

Furthermore, in the communication side RAM 12b, access can be carried out both from the communication controller 12a side of the communication portion 12, and from the control portion 11. Accordingly, when some control is not carried out, because there will be the situation in which the communication side RAM 12b is accessed simultaneously from both, in order to prevent this, in the present embodiment the control portion 11 side forms the main object for carrying out data exchange. Namely, the control portion 11 carries out access approval/prohibition notification to the communication portion 12. Then, the communication portion 12 is capable of access only during the time the control portion 11 approves access to the communication side RAM. Specifically, such control is carried out by the flowcharts shown in FIG. 22 (control portion) and FIG. 23 (communication portion).

Figure 22:
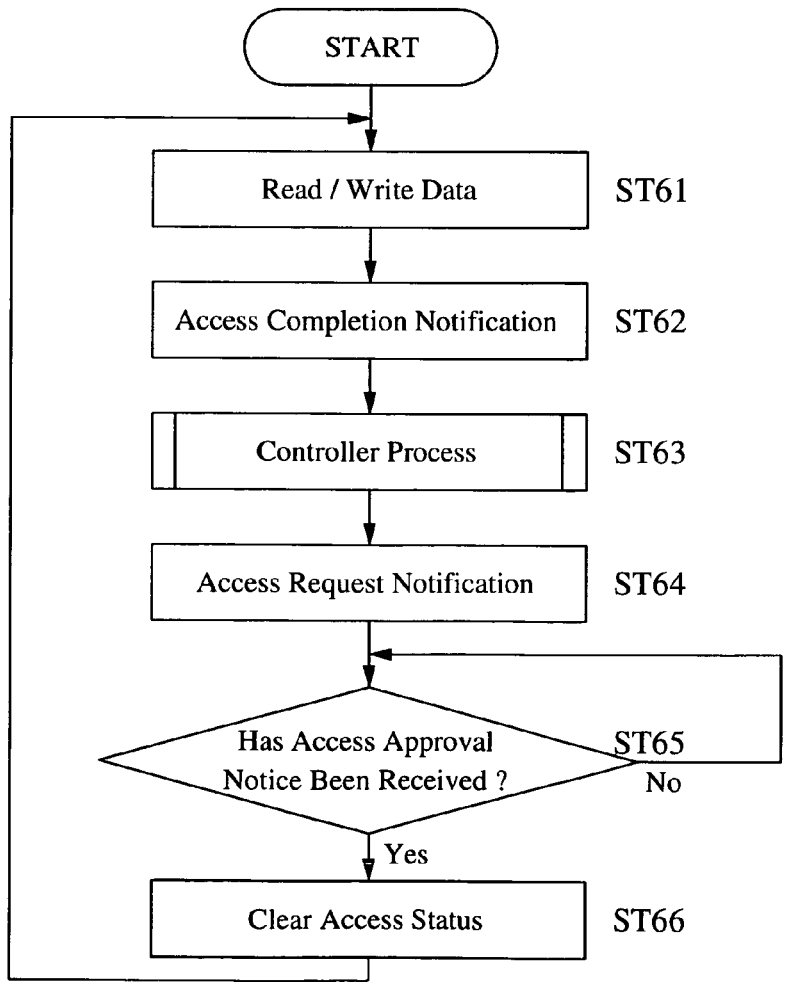
FIG. 22 is a flowchart showing the sequence (control portion side) of the transfer of data between the control portion side RAM and the communication side RAM inside the control apparatus.

First, as for the function of the control portion 11, as shown in FIG. 22, data Reading/Writing, namely, access to the communication side RAM 12b is carried out (ST61). Then, when such access process is completed, the communication side is notified of access completion (ST62). This access completion notice forms an access approval notice for the communication portion 12.

Then, a normal controller process (user program execution) is carried out (ST63). Further, in the case where there arises a need to access the communication side RAM 12b again, an access request notice is notified to the communication portion 12 (ST64). As will be described below, because the communication portion 12 that received this notice will send back an access approval notice, a judgment of whether or not the control portion 11 has received the access approval notice from the communication portion 12 is carried out (ST65), and when an approval notice is received, the access status is cleared (ST66), the flowchart returns to Step 61, and the control portion 11 accesses the communication side RAM 12b.

Figure 23:
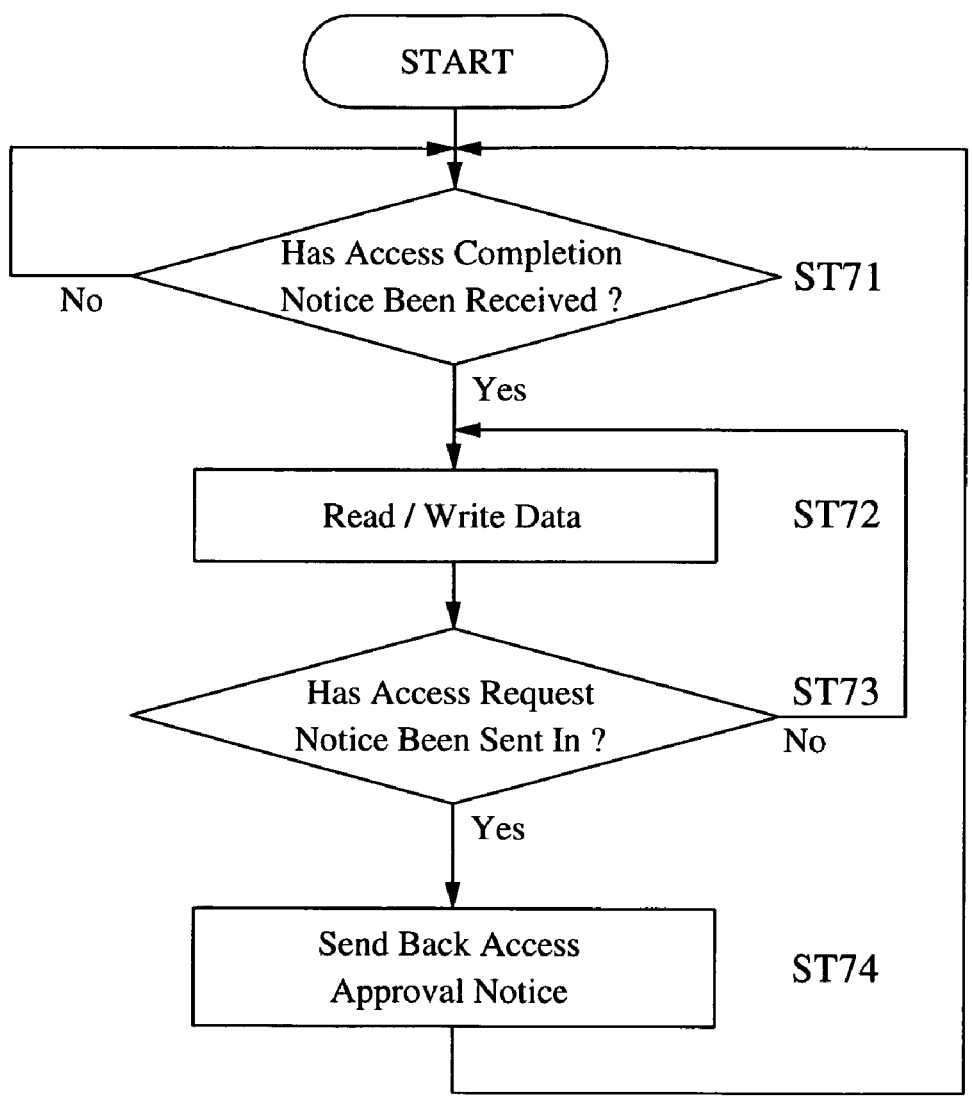
FIG. 23 is a flowchart showing the sequence (communication portion side) of the transfer of data between the control portion side RAM and the communication side RAM inside the control apparatus.

On the other hand, as for the function of the communication portion 12, as shown in FIG. 23, first, a judgment of whether or not an access completion notice has been sent in from the control portion 11 is carried out (ST71). Then, when such access completion notice has been received, the communication side RAM 12b is accessed (to Read/Write data) (ST72). Next, a judgment of whether or not an access request notice has been sent in from the communication portion 12 is carried out (ST73). Then, in the case where such notice has not been sent in, because the communication portion 12 still has the right to access the communication side RAM 12b, access is carried out as needed.

On the other hand, when an access request notice has been received, the accessing of the communication side RAM 12b is terminated, and an access approval notice is sent back to the control portion 11 (ST74). At this time, in the communication portion 12, because the simultaneity of the node units of the received data is secured, when an access request notice is received during the transfer of one node portion, an access approval notice is sent back after the transfer of such one node portion is completed. Further, after the interruption by the notice at Step 74, when an access completion notice is received again from the control portion 11, transfer is started to the communication side RAM 12b of the next node after the node having the above-described interruption.

With the above-described embodiment as a base, it is possible to further add the functions described below. First, an online edit function is provided as a first additional function. Namely, a function is provided to interpret an online edit request sent in from the programming apparatus, add or delete a logical name in the variable database 17, and change the indirect reference table 16 inside the self control apparatus in accordance with the changed content of the variable database 17. A description of each process is given below.

Figure 24:
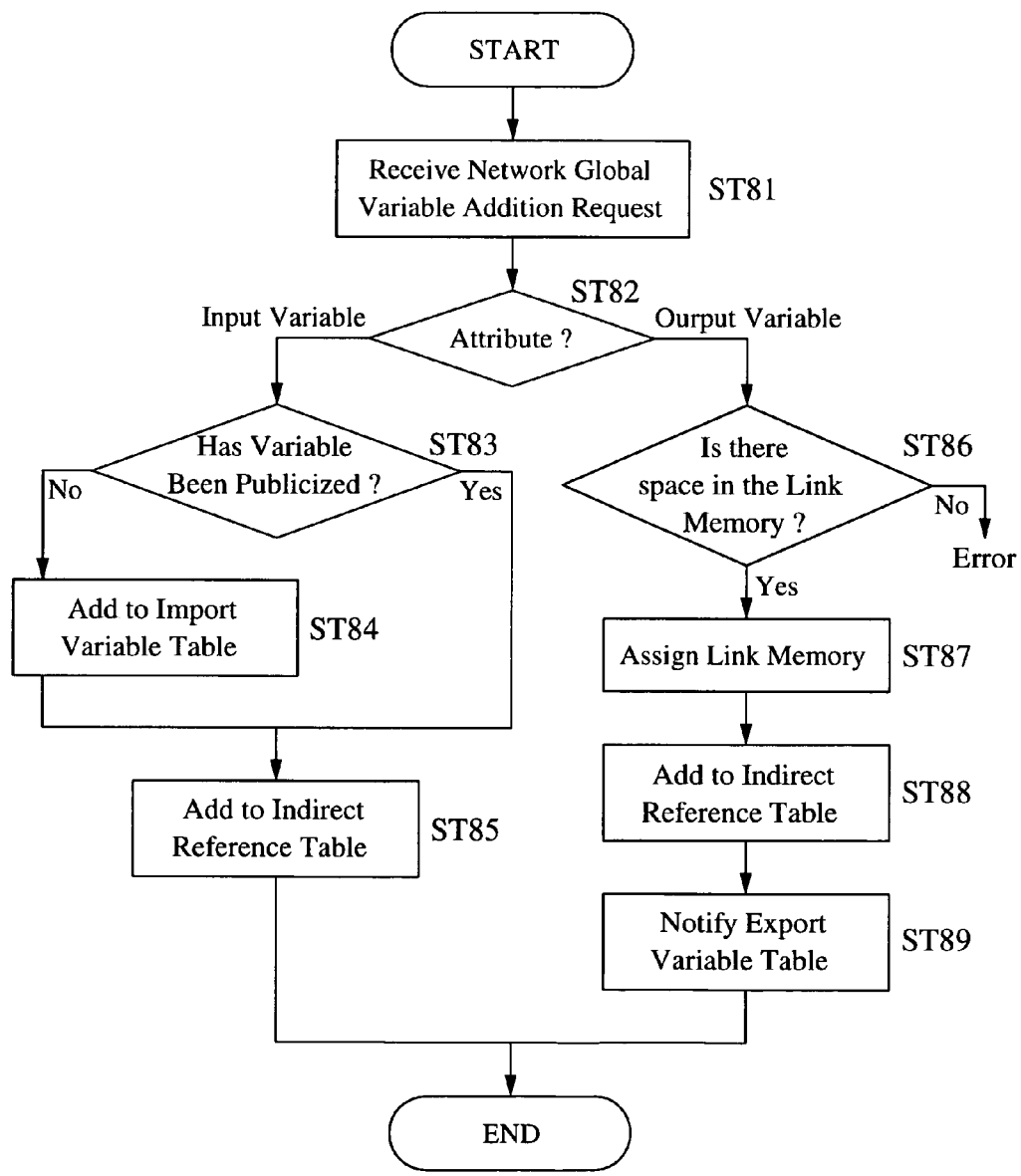
FIG. 24 is a flowchart for describing the function (variable addition) of the online edit.

First, the process function for adding network global variables in the online edit is like the flowchart shown in FIG. 24. Namely, first, a network global variable addition request is received from a connected programming apparatus (ST81). Then, first, a judgment of whether the attribute of the variable data of the added logical name is an input variable or an output variable is carried out (ST82).

Then, in the case of an input variable, a judgment of whether the variable is a variable (previously publicized variable) that has already been publicized by another node is carried out (ST83). In the case where the variable has not been publicized (unpublicized variable), because it is not possible to acquire and use data of the variable at the current point in time, an Import variable table related to the variable is created, and upon setting the valid/invalid flag at invalid, the variable is added to the Import variable list (ST84). Further, the flag related to this variable is switched to valid when another node publicizes such network global variable.

Then, information related to the variable is added to the indirect reference table based on the memory address of the variable database 17 (ST85). On the other hand, in the case where the input variable of the processing object has already been publicized by another node, the variable is added to the indirect reference table based on the variable database (ST85).

On the other hand, in the case where the attribute is an output variable, the flowchart proceeds to Step 86 at the branching judgment of Step 82, and a judgment of whether or not there exists an open region in the self node area of the link memory 15 is carried out (ST86). Namely, a judgment of whether or not there exists memory space of the data size related to such variable stored in the variable database 17 is carried out. Then, in the case where there is no space, because it is not possible to make an addition, an error process is carried out. Further, in the case where there is space, a region (data size portion) for storing such variable data is secured inside the self node area (ST87). Then, the offset (head address) of the secured region is stored in a related table of the Export variable table, and the offset (head address) of the secured region is written into the indirect reference table (ST88). Further, the created Export variable table is added to the Export variable list. Thereafter, only the added variable information is notified to each node by transmission of the Export variable table (ST89).

Figure 25:
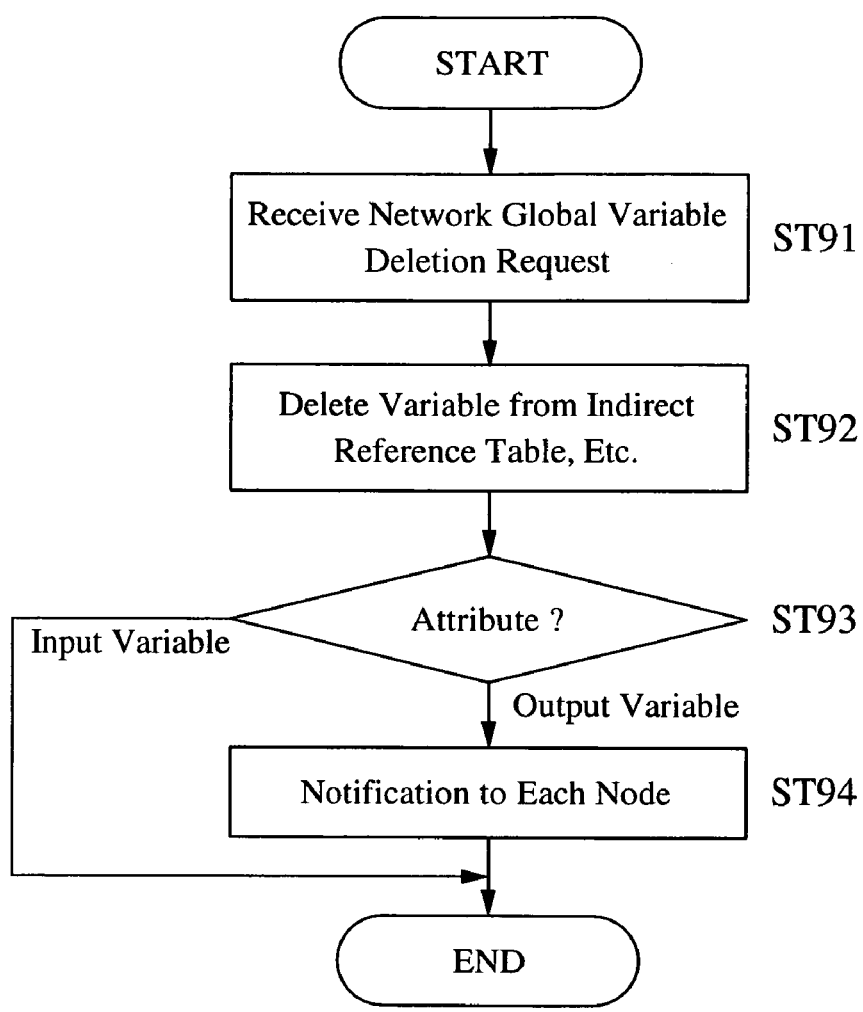
FIG. 25 is a flowchart for describing the function (variable deletion) of the online edit.

Further, the deletion process function of the online edit is like the flowchart shown in FIG. 25. Namely, first, a network global variable deletion request is received from a connected programming apparatus (ST91). Then, variable information related to the logical name is deleted from the indirect reference table and the like (ST92). Next, a judgment of whether the attribute of the deleted variable data is an input variable or an output variable is carried out (ST93). Then, in the case where the attribute is an input variable, because there will be no effect for the other nodes, the process is terminated as is.

Further, in the case of an output variable, because there will be an effect on other nodes using such variable data, the deleted variable name (logical name) is notified to each node (ST94). Further, at each node that receives this deleted variable name notice, the valid/invalid flag related to such variable inside the Import variable list is set at invalid.

Furthermore, the changes of the data size, attribute and the like of the network global variables in the online edit can be carried out after the above-described deletion process by once again carrying out the addition process.

Further, with the above-described online edit function forming a precondition, a second additional function can be constructed in which the indirect reference table is provided with two banks, and by appropriately switching between a used bank and an unused bank, it is possible to keep control execution interruptions at a minimum.

Namely, the content of the used bank is copied in the unused bank in advance, and in the case where the content of the variable database 17 is changed, first, the unused bank is updated, and after that the used bank is switched to the unused bank when the control execution portion 18 is not referring to the bank being used. In this way, because the used bank does not change even during updating of the indirect reference table for the used bank, it is possible for the control execution portion 18 to carry out processes by referring to the arranged bank being used during such updating operation. Accordingly, the control execution interruption period can be shortened as much as possible. Now, the functions of the control portion for executing such process functions is like the flowcharts shown in FIGS. 26 and 27.

Figure 26:
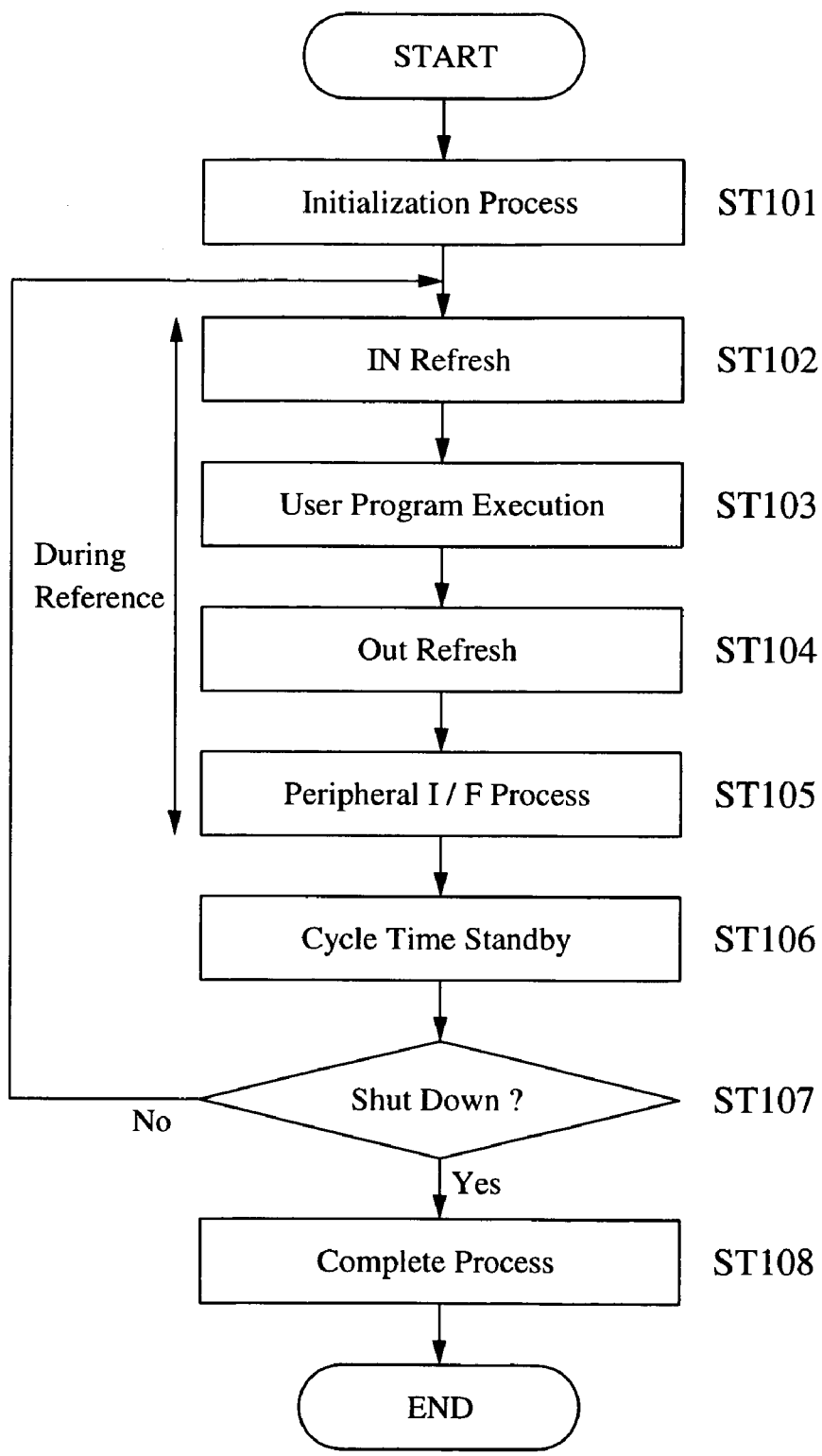
FIG. 26 is a drawing showing the flowchart of the control execution portion in the example of an online edit change.

Namely, as shown in FIG. 26, after first carrying out an initialization process (ST101), the control execution portion 18 carries out an IN refresh (ST102). In short, the area network global variables (variable data) stored in the other node areas of the link memory 15 are read out. This accessing of the link memory 15 is carried out by specifying the address based on the indirect reference table of the used bank.

Then, the user program (normal control) is executed (ST103), and an OUT refresh is carried out (ST104). Namely, the network global variables (variable data) publicized by itself are written into the self node area of the link memory 15. Naturally, this is also carried out by specifying the storage region of the link area based on the pointer stored in the indirect reference table of the used bank. Next, a peripheral I/F process is carried out (ST105). The interval from Step 102 to Step 105 is the period over which the control execution portion 18 is referring to the bank being used.

Thereafter, a standby is carried out for only the cycle time (ST106). The interval of this cycle time is the period over which the control execution portion 18 is not referring to the used bank. In this way, while carrying out accessing (reading/writing variable data) for the link memory 15, the process for executing the user program is repeatedly carried out until the system is shut down (ST107, ST108). At this time, a standby is carried out for a prescribed time each time one series of processes is finished.

Figure 27:
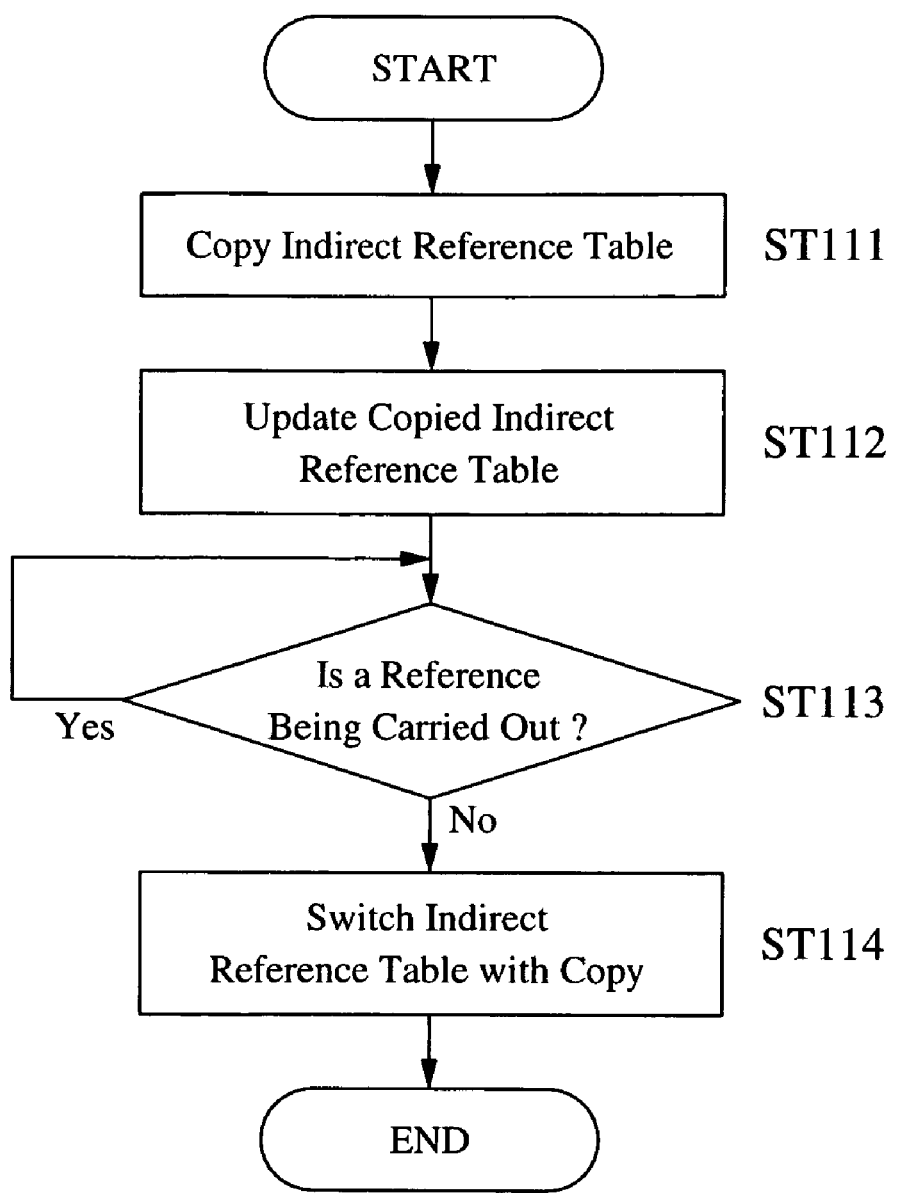
FIG. 27 is a drawing showing a flowchart showing an indirect reference table rewriting process function in the example of an online edit change.

On the other hand, the process function for rewriting the indirect reference table is like the flowchart shown in FIG. 27, wherein, first, the content of the indirect reference table of the used bank is copied in the unused bank (ST111). Next, the indirect reference table copied in the unused bank is updated (ST112). Then, a judgment of whether or not the control execution portion 18 is referring to the link list is carried out (ST113). Namely, a judgment of whether or not Step 102 through Step 105 are being executed is carried out. Then in the case where such reference is not being carried out (during the standby of Step 106), the process for switching the used indirect reference table with the copied indirect reference table is completed (ST114).

Further, a data control function which uses version information is provided as a third additional function. Namely, in the embodiment described above, only the updated version variable table is recorded, but the present invention is not limited to this, and version information may be added to both the variable database and the transmission data, and the changed content of the variable database may be sent to each node by simultaneous broadcast. In this way, a judgment of whether or not the version information added to the variable database and the version information related to data transmitted thereafter matches that of the variable database can be carried out, and it is possible to carry out an updating process in which only matching items are recognized as proper data.

Figure 28:
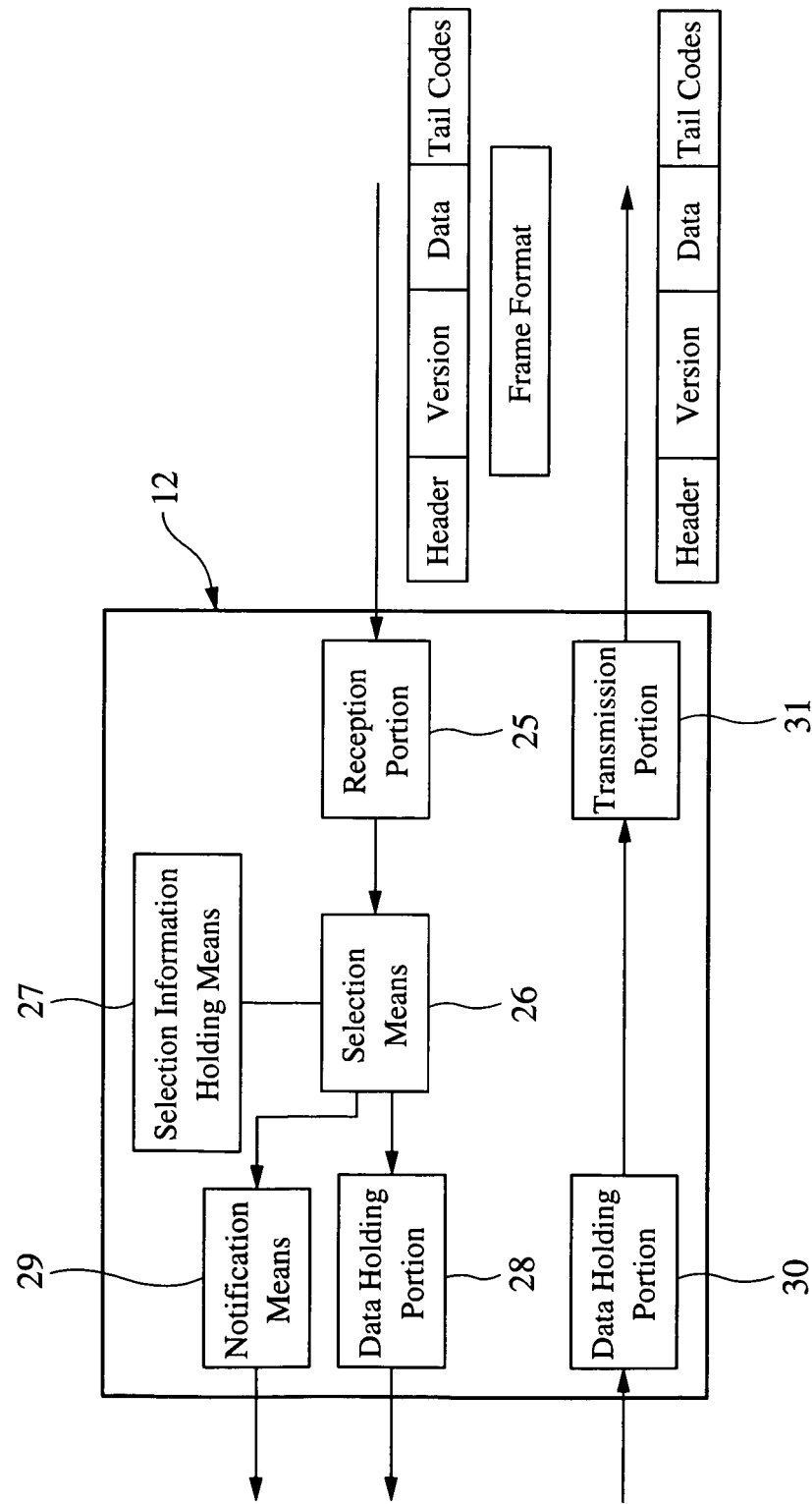
FIG. 28 is a drawing showing the internal structure of the communication portion which is an essential portion of a control apparatus equipped with a version information checking function.

In this way, by transmitting the variable database to each node in advance so that each node will know the version, it is possible to insure that all the nodes connected to the network will use the same version variable data. Now, as for the specific structure for achieving such process function, for example, the structure of the communication portion 12 may be constructed as shown in FIG. 28.

Namely, the communication portion 12 is equipped with a reception portion 25 which receives data sent in from the other nodes, a selection means 26 which receives the data (messages) received by the reception portion 25 and carries out a judgment of whether or not the version is correct, a selection information holding means 27 which holds the version information and the node address that should carry out reception which form a reference/dictionary at the time the judgment is carried out by the selection means 26, a data holding portion 28 which holds data judged to be true data (matching version or the like) by the selection means 26, and a notification means 29 which notifies the transmission source node that the version does not match in the case where data is judged to not be true data. Further, as for the function of itself as a transmission side, the communication portion 12 is equipped with a data holding portion 30 which temporarily stores information related to the variable publicized by itself, and a transmission portion 31 which transmits the data stored in the data holding portion 30 to the other nodes.

As for the version information and the like stored/established in the selection information holding means 27, it is possible to receive and record version information of the variable database sent from the node that is the publicizing source of the variable name (variable data). Now, as shown in FIG. 28, the frame format of the message actually sent in records the version information of the data between the header which stores information of the transmission source, address and the like, and the data forming the actual transmission content. Further, which node data is sent in from is understood from the transmission source information of the header.

Figure 29:
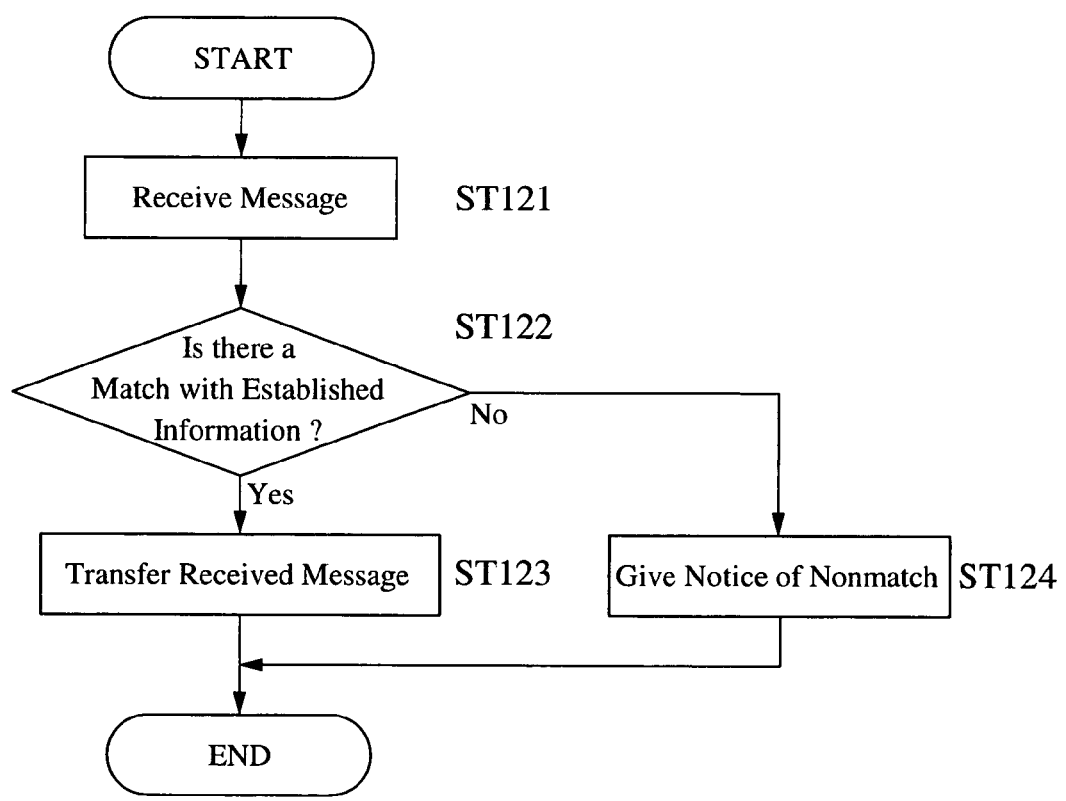
FIG. 29 is a flowchart showing the function of a selection means.

Further, the function of the selection means 26 is like the flowchart shown in FIG. 29. Namely, when a message is received through the reception portion 25 (ST121), the established version information and node address that should carry out reception stored in the selection information holding means 27 are compared with the version and the like of the received data, and a judgment of whether or not there is a match with the established information is carried out (ST122). Then, in the case where there is a match, the received message is transferred to the data holding portion 28 (ST123). Further, this transferred message stored in the data holding portion 28 sends data of a required location to the control portion 11 side, and based on this, required processes such as updating the variable list, the indirect reference table and data of the list memory and the like are carried out. On the other hand, in the case where the version and the like do not match, the transmission source node is notified of such nonmatch through the notification means 29 (ST124). This notification may be carried out simply by notifying that the version does not match, or the version information stored in the selection information holding means 27 may be sent together with the notice. The transmission source node that receives this resends data (Export variable list) of the correct version, and once again sends the current correct version information (variable database) that should be stored to the selection information holding means 27.

Further, as another additional function, it is possible to add a function (plug-in function) that automatically starts communication with existing control apparatuses when a new control apparatus is added, exchanges each variable list and the like, and creates a state which makes it possible to share logical data.

On the other hand, in the embodiment described above, all of the Export variable list sent in from each of the other nodes is temporarily uptaked as a Remote variable list inside the control apparatus, and is thereafter collated with an Import variable list to create an indirect reference table, but the present invention is not limited to this, for example, each time an Export variable list is received from another node, this can be compared with the Import variable list of the self node, and only required information may be uptaked. In this way, it is possible to greatly reduce the memory capacity for storing the Remote variable list. Accordingly, application to small-scale control apparatuses and other nodes becomes possible Furthermore, each node inquires about the variable name required by the self node, and this makes it possible to acquire information related to such variable name from the publicizing node. In this way, because a large-scale Remote variable table becomes unnecessary, it becomes possible to further reduce the memory capacity, and this makes it possible to develop a low-cost device.

Figure 30:
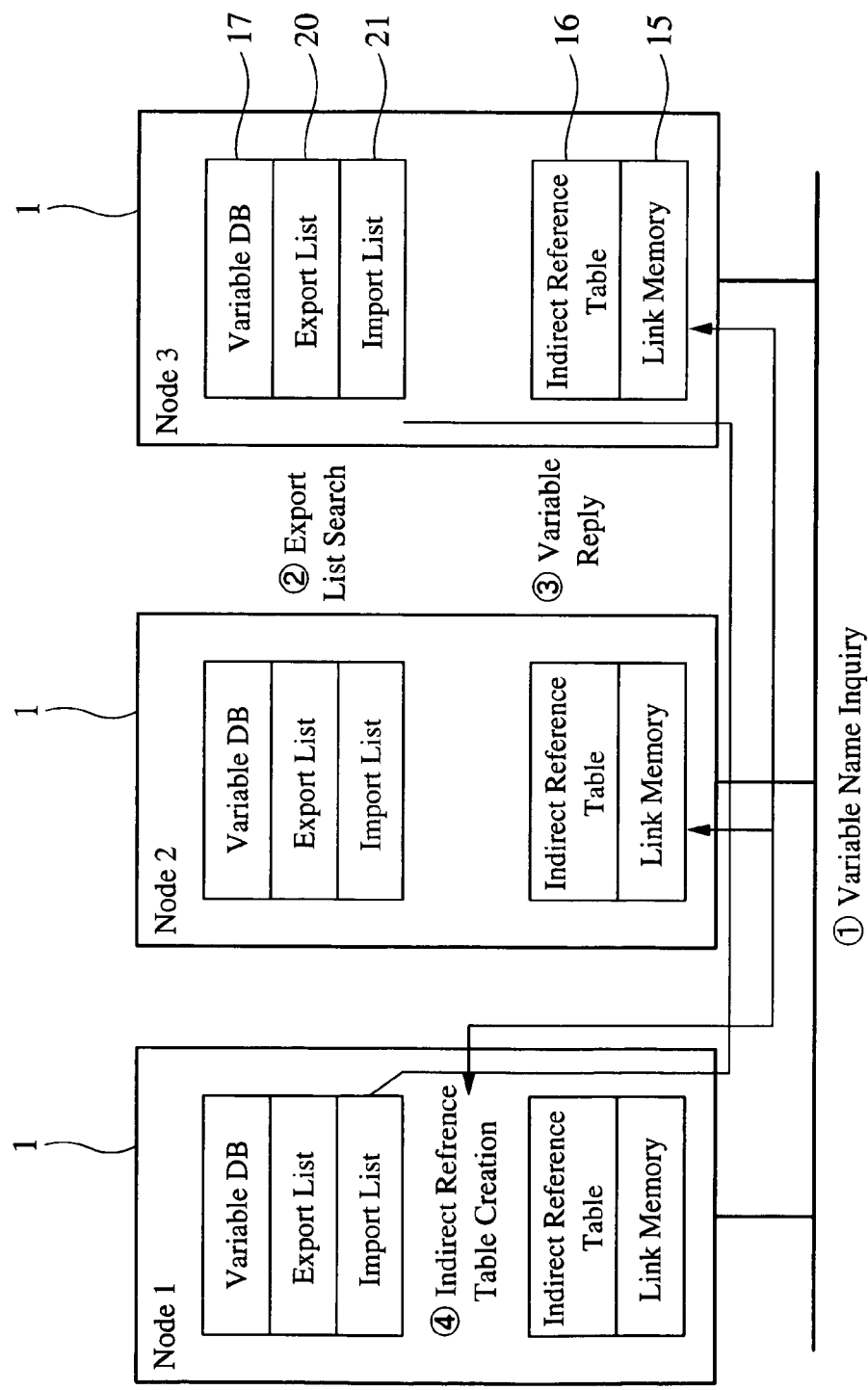
FIG. 30 is a drawing showing another embodiment of a control apparatus according to the present invention.

Specifically, as shown in FIG. 30, a plurality of nodes (control apparatuses 1) are connected to a network, and each of these possesses an Export variable list 20 and an Import variable list 21 required by the self node. Then, as is clear from a comparison of FIG. 30 with FIG. 3 and the like, each node is also equipped with an indirect reference table 16 and a link memory 15, but does not possess a Remote variable table. Further, FIG. 30 shows one portion of the internal structure of the RAM of each node, and required functions are stored in a MPU and a ROM in the same manner as that of the embodiment shown in FIG. 3 and the like.

In such structure, each node transmits the variables recorded in the Import variable list 21 to all the nodes by simultaneous broadcast (In the example shown in the drawing, an example in which transmission from node (1) is carried out is shown (① of FIG. 30)). The nodes that receive this variable name inquiry frame carry out a search of whether or not a related variable exists in the Export variable list of the self node (② of FIG. 30). Then, when the search result indicates that a related variable exists, the frame that records the node address of itself and the variable address is sent as a reply to the node (node (1) in the example shown in FIG. 30) that transmitted the variable name inquiry frame ((③ of FIG. 30).

In this way, because each node can acquire information of variables used by itself, the indirect reference table is created based on such frame. Further, because the process for creating the indirect reference table is the same as that of the embodiment described above, a detailed description thereof is omitted.

Figure 31:
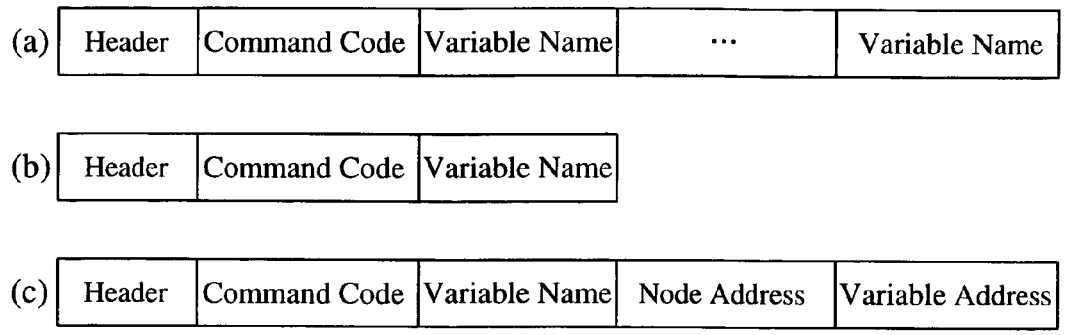
FIG. 31 is a drawing showing one example of a message format used by the embodiment shown in FIG. 30.

Now, to give one example of a frame format of the inquiry frame of the variable name described above, as shown in FIG. 31(*a*) for example, it is possible to transmit all the Import variable list in one batch. In this case, there are many instances where a plurality of frames from a plurality of nodes form replies. Further, as shown in FIG. 30(*b*), it is possible to transmit one frame at a time for each variable. In this case, as a matter of course, there becomes one reply frame. Now, FIG. 31(*c*) shows one example of the frame format of the reply frame.

Figure 32:
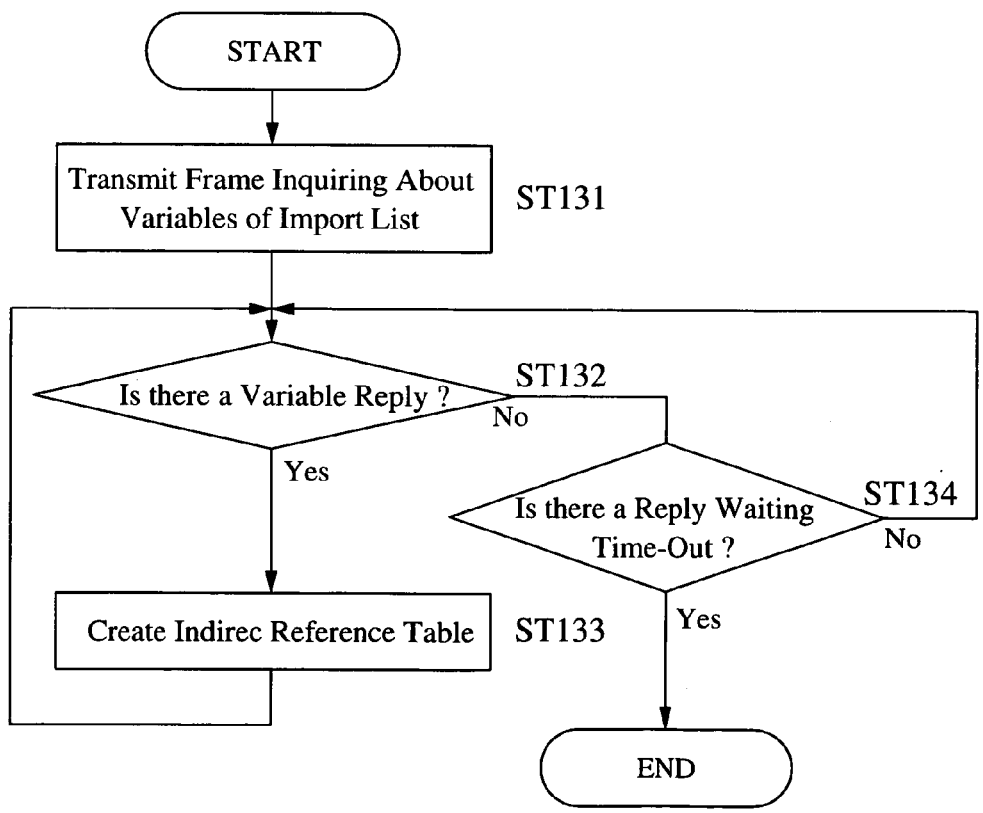
FIG. 32 is a flowchart showing a process function based on an Import variable list inquiry (one batch) in the embodiment shown in FIG. 30.

Then, the function in the case where the entire list of the Import variable list is inquired in one batch is like the flowchart shown in FIG. 32. Namely, first, a variable inquiry frame is transmitted to all nodes (ST131). Next, the node waits for reception while checking a timer, and a judgment of whether or not there is a reply for such frame is carried out (ST132, ST134), and when a reply is received, an indirect reference table is created based on the content of such reply (ST133). Then, when no reply comes within a prescribed time, a reply waiting time-out is carried out, and the creation of the indirect reference table is completed. Further, in the case where it is not possible to create an indirect reference table related to the variable name present in the Import variable list, the node that makes such variable name the output variable is judged to not exist in the system at the present step. Accordingly, the valid/invalid flag of the Import variable list becomes invalid.

Figure 33:
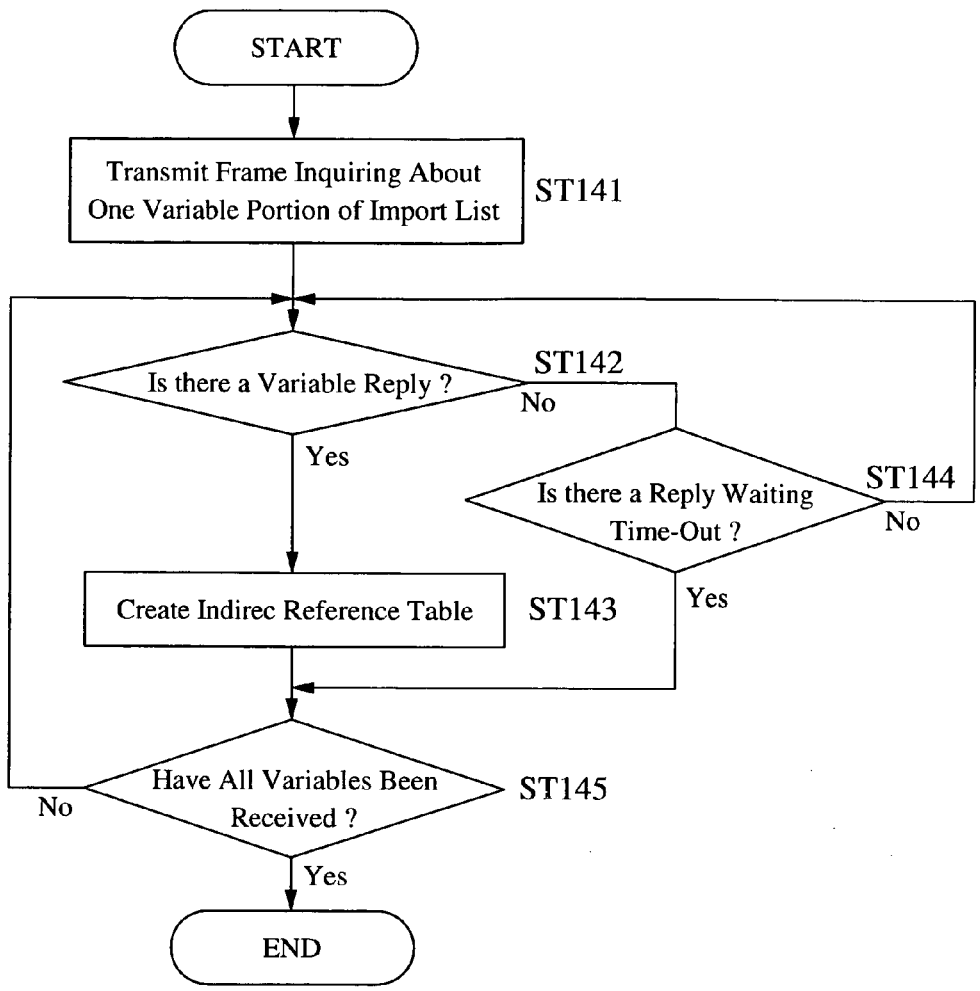
FIG. 33 is a flowchart showing a process function based on an Import variable list inquiry (one variable at a time) in the embodiment shown in FIG. 30.

Further, the function in the case where the Import variable list is inquired one variable at a time is like the flowchart shown in FIG. 33. Namely, a variable inquiry frame (of one variable portion) is transmitted to all nodes (ST141). Next, the node waits for reception while checking a timer, and a judgment of whether or not there is a reply for such frame is carried out (ST142, ST144), and when a reply is received, an indirect reference table is created based on the content of such reply (ST143). Now, when no reply comes within a prescribed time, a reply waiting time-out for such variable is carried out, and an indirect reference table for such variable is not created. Namely, the node that makes such variable the output variable is judged to not exist at the present point in time. Then, the process described above is repeatedly carried out for all the variables, and when reception occurs for all the variables, the process is completed (ST145).

In the present embodiment, in addition to the merit that a memory capacity required for the Remote variable list becomes unnecessary, there is also the effect that traffic is greatly reduced. Namely, for example, when assuming the case where a new node is added, such added node transmits a variable name inquiry related to the variable (variable stored in the Import variable list) required by itself by simultaneous broadcast in a prescribed frame format. Then, because only the node that has a related variable will transmit a reply frame related to such variable, there is no need for all the nodes to transmit all their data, and this greatly reduces traffic.

Furthermore, in the case where there exists the same variable name for different data (i.e., a double variable), the present embodiment makes it possible to detect such fact. Namely, in the present embodiment, the sole existence of the same logical name on the network forms a precondition, and there exists only one node (0 in some cases) that makes the same logical name an output variable. In this regard, in accordance with the present embodiment, when there exist a plurality of nodes which make the inquired variable name an output variable, each of such nodes that received the inquiry frame transmitted by simultaneous broadcast will transmit a reply frame, and then the node that made the inquiry will receive a plurality of reply frames for the same variable inquiry. In accordance with this, it is possible to detect the double definition of the variable.

Figure 34:
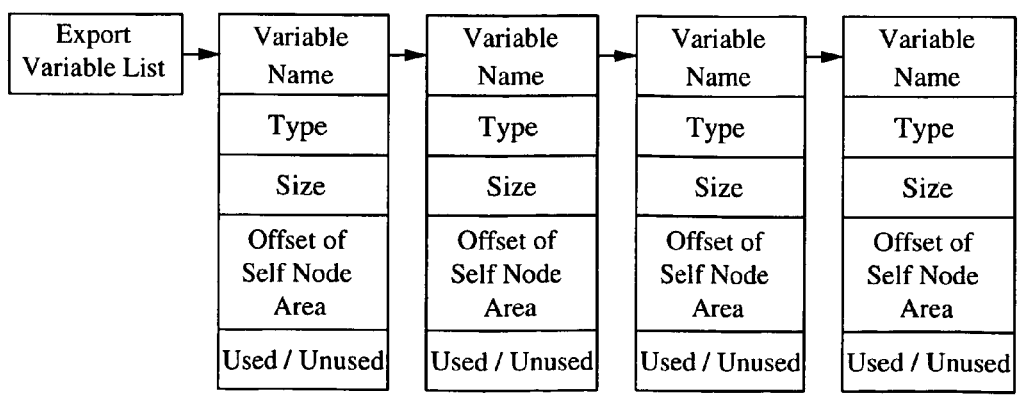
FIG. 34 is a drawing showing a modification.

As shown in FIG. 34, in place of the Export variable list shown in FIG. 7, a "used/unused" area is further added to the variable list of FIG. 7. This "used/unused" area is a flag showing whether or not the variable data of the variable name is utilized/used by other nodes, wherein "1" is set for the case where the data is used, and "0" is set for the case where the data is unused.

In this way, in the case where data link communication is carried out, in the basic embodiments described from FIG. 1, all the variables shown by the Export variable list are transmitted cyclically, but in the present method, by checking the "used/unused" area, it is possible to carry out transmission only for "used" variables without having to transmit all data. In this way, it is possible to suppress the increase in network traffic due to the transmission of useless data not used by anyone.

Now, the setting of the flag for such area can be easily achieved in the case where the inquiry is carried out based on the Import variable list in the manner of the present embodiment. Namely, the initial value of the "used/unused" area is set at 0 in advance. Then, in the case where the variable of the inquiry exists when a search of the Export variable list is carried out, by setting "1" in the "used/unused" area related to such variable to show that the variable is being used, it is possible to achieve such flag setting.

Figure 35:
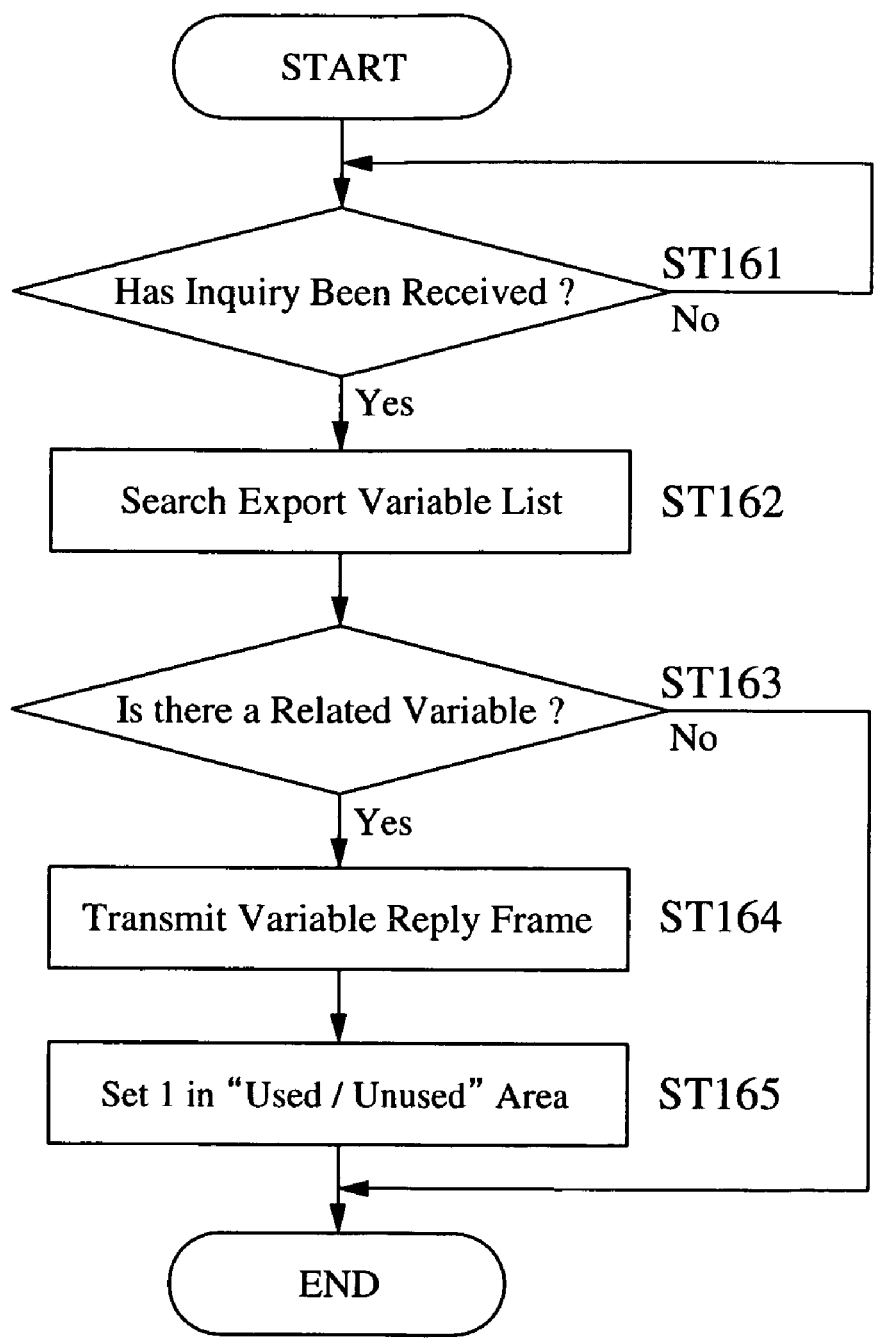
FIG. 35 is a flowchart showing the function that executes the modification shown in FIG. 34.

As for a flowchart of the processing portion for achieving such function, it is possible to use the flowchart shown in FIG. 35. Namely, when an inquiry frame of the Import variable list is received (ST161), the Export variable list is searched, and a confirmation of whether or not the variable of the inquiry exists is carried out (ST162, ST163). Then, if such variable does not exist, the process is terminated without sending back a reply. Further, if such variable exists, a reply is sent back in the form of a reply frame recording the address of the self node and the address of the related variable (ST164). Then, 1 is set in the "used/unused" area (ST165). Further, the flowchart (from ST161 to ST164) without the provision of this Step 165 forms a flowchart for achieving a normal process function.

Moreover, it is also possible to use a combination of the embodiment (Method ①) of the basic functions from FIG. 1 onwards described above, and the embodiment (Method ②) shown from FIG. 30 onwards. Namely, in the embodiment from FIG. 1 onwards, the nodes have sufficient memory capacity, and when an indirect reference table is simultaneously created by a plurality of nodes at the setup time or the like, because this can be carried out by only transmitting the Export list, there is good efficiency. Further, for a node that carries out Import of a major portion of area of the system, there is good efficiency for the case where an Export list is received from all nodes.

Figure 36:
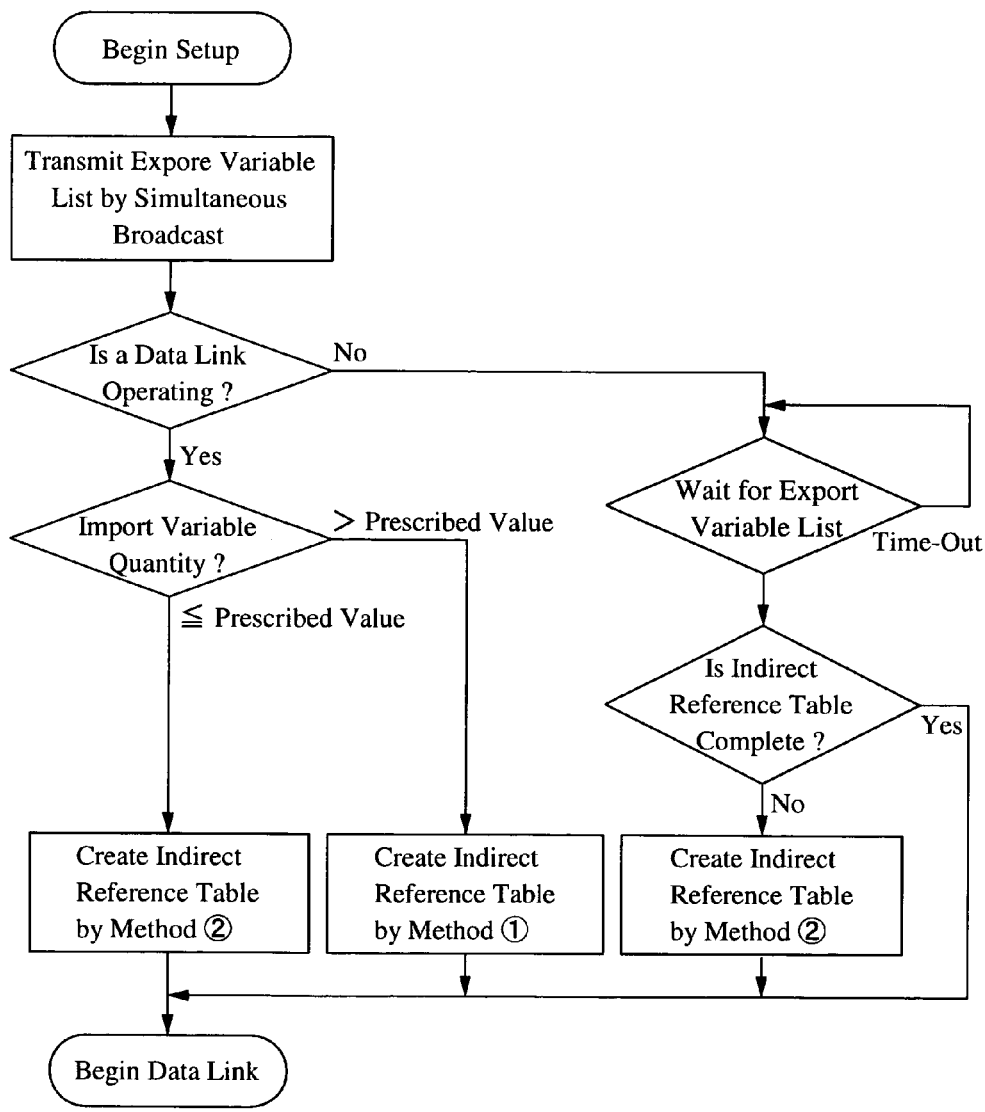
FIG. 36 is a flowchart showing the essential portion of another embodiment.

On the other hand, in the case where a new node is added when a data link is already operating in the system, there is good efficiency for the embodiment of FIG. 30 onwards. Further, because only required variables are received, there is good efficiency even for nodes that have a small Import variable list. In this way, because both embodiments have respective merits, by combining these, a synergistic effect of such merits can be expected. Now, the method of such combination is carried out by the rules shown below. In this regard, the process flowchart for achieving such rules is like that shown in FIG. 36.

① Before beginning the creation of the indirect reference table, each node transmits the Export list of the self node (Method (①))

② When the memory capacity of the Remote table is small, each node nullifies the received Export list;

③ At this step, when the indirect reference table has been created, the process is completed at this point ④ In the case where the indirect reference table is incomplete (there is still an unsolved Import variable list), an indirect reference table is created by an inquiry according to Method ②;

⑤ In the case where the indirect reference table is incomplete even when the process of ④ is carried out, the node that possesses such variable is judged to not have been set up yet, and a data link operation is begun;

⑥ When a new node is added while the data link is operating, because an Export list is sent in from such node, this is collated with the Import variable list, and when the variable exists, an indirect reference table is created;

⑦ When a node is already set up at the time a data link is operating on the network (midway joining from the viewpoint of the other nodes), first, the Export list of the self node is transmitted in the same manner as ①;

⑧ Because Export lists are not sent in from the other nodes, the size of the Import list is checked, and when this size is larger than a prescribed value (e.g., 1,000 variables), Method ① is carried out (the transmission of an Export list is required for all nodes), but when this size is smaller than the prescribed value, and an indirect reference table is created by Method ②.

Incidentally, in each embodiment and modification (additional function) described above, communication between control apparatuses connected to the network is carried out merely by defining the logical name shared between the plurality of control apparatuses connected to the network, and even in the case where the state of the communicating control apparatuses change (addition to or removal from the network, content changes due to recompiling, etc.), it is possible to solve the correspondence of the shared logical name and the address of the link memory without interrupting control.

Figure 37:
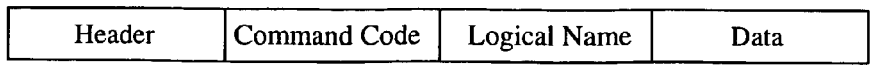
FIG. 37 is a drawing showing one example of a data format of a message used in another embodiment.
Figure 38:
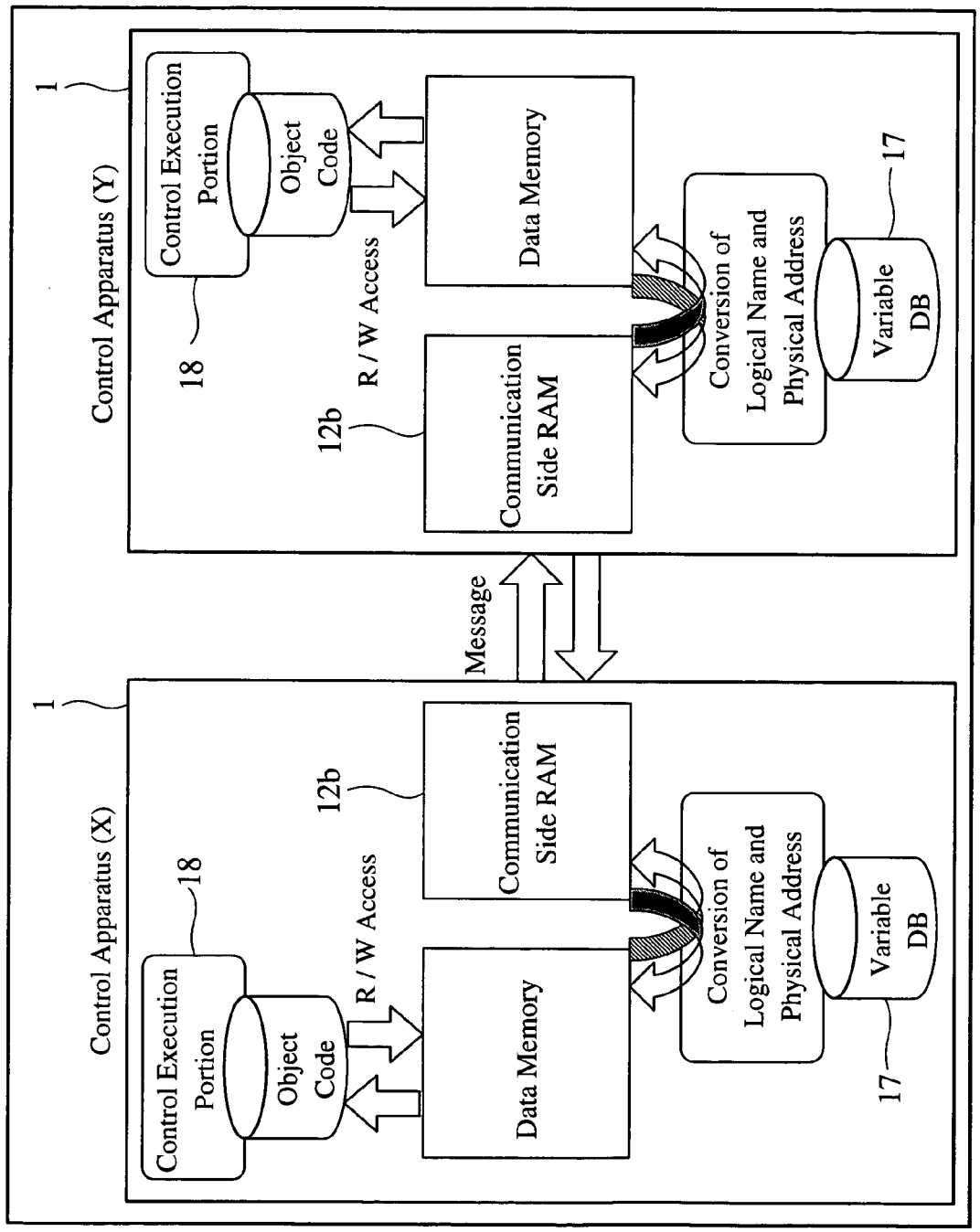
FIG. 38 is a drawing for describing another embodiment.

Now, in order to plan such solution, the link memory 15 and the indirect reference table 16 are provided, but the present invention does not necessarily have to be provided with such structure. Then, in the case where such structure is not provided, at least the logical name and the data thereof is stored inside the message received by the control apparatus as shown in FIG. 37, and the storage addresses of the network global variables are specified one communication at a time by the variable database, and data updating is carried out (see FIG. 38). In this case, a request to rewrite a plurality of network global variables may be included inside one message.

Figure 39:
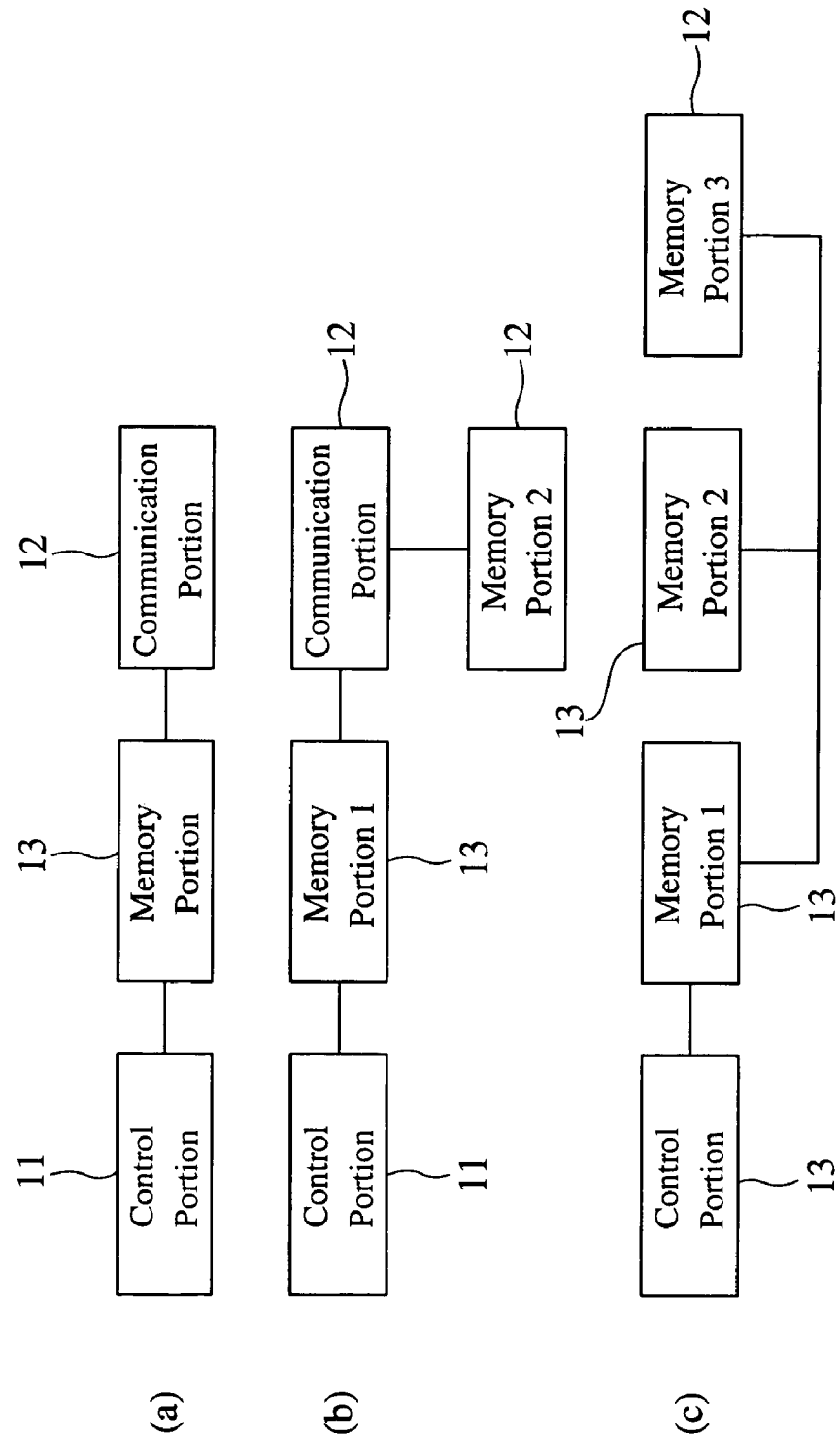
FIG. 39 is a drawing for describing another embodiment.

Further, in each embodiment described above, a link memory for storing variable data or information such as various variable lists and the like is stored in a non-volatile memory. Specifically, storage is carried out in a prescribed area of the RAM 11c inside the control portion 11. However, the present invention is not limited to this, and as shown in FIG. 39 for example, a memory portion 13 may be provided separate from the control portion 11 and the communication portion 12, and data may be stored inside this memory portion 13. Now, this memory portion 13 may of course be divided into a plurality.

Further, in each of the embodiments and the like described above, descriptions were given for apparatuses that possess both input and output functions, but the present invention is not limited to this, and application can be made to a control apparatus (node) of only input variables, or a control apparatus (node) of only output variables. In the case of each of such control apparatuses, this can be easily achieved by eliminating the function that is not used from the functions described in the embodiments described above. Namely, for example, in the case of a control apparatus of only input variables, the Export variable list becomes unnecessary, and a correspondence is possible by eliminating the function for creating the Export variable list as a function of the logical name adjustment portion 19.

Furthermore, each structure described above is not limited to data communication between control apparatuses, and application can also be made to a multi-MPU structure. Namely, although omitted from the drawings, a multiprocessor system (multi-MPU) in which each MPU possesses an occupied local memory, wherein these are connected by a serial pass or parallel pass, forms a precondition. Now, this can be achieved by providing a data transfer process portion which periodically carries out data exchange between each local memory, an indirect reference table used for accessing data stored inside these local memories, a control execution portion which possesses a function for accessing data through the indirect reference table, and a logical name adjustment portion which controls a corresponding table of logical names and local memory addresses, and changes the indirect reference table based on such information. In this case, the local memory corresponds to the link memory of the embodiments described above, and the data which is exchanged periodically forms the variable data in the embodiments described above.

Then, based on each processing portion and table and the like, it is possible to make data common by creating an appropriate variable link and the like. Further, because the specific process function can be achieved by a process the same as that for sharing data between the control apparatuses described above, a detailed description thereof is omitted.

Figure 40:
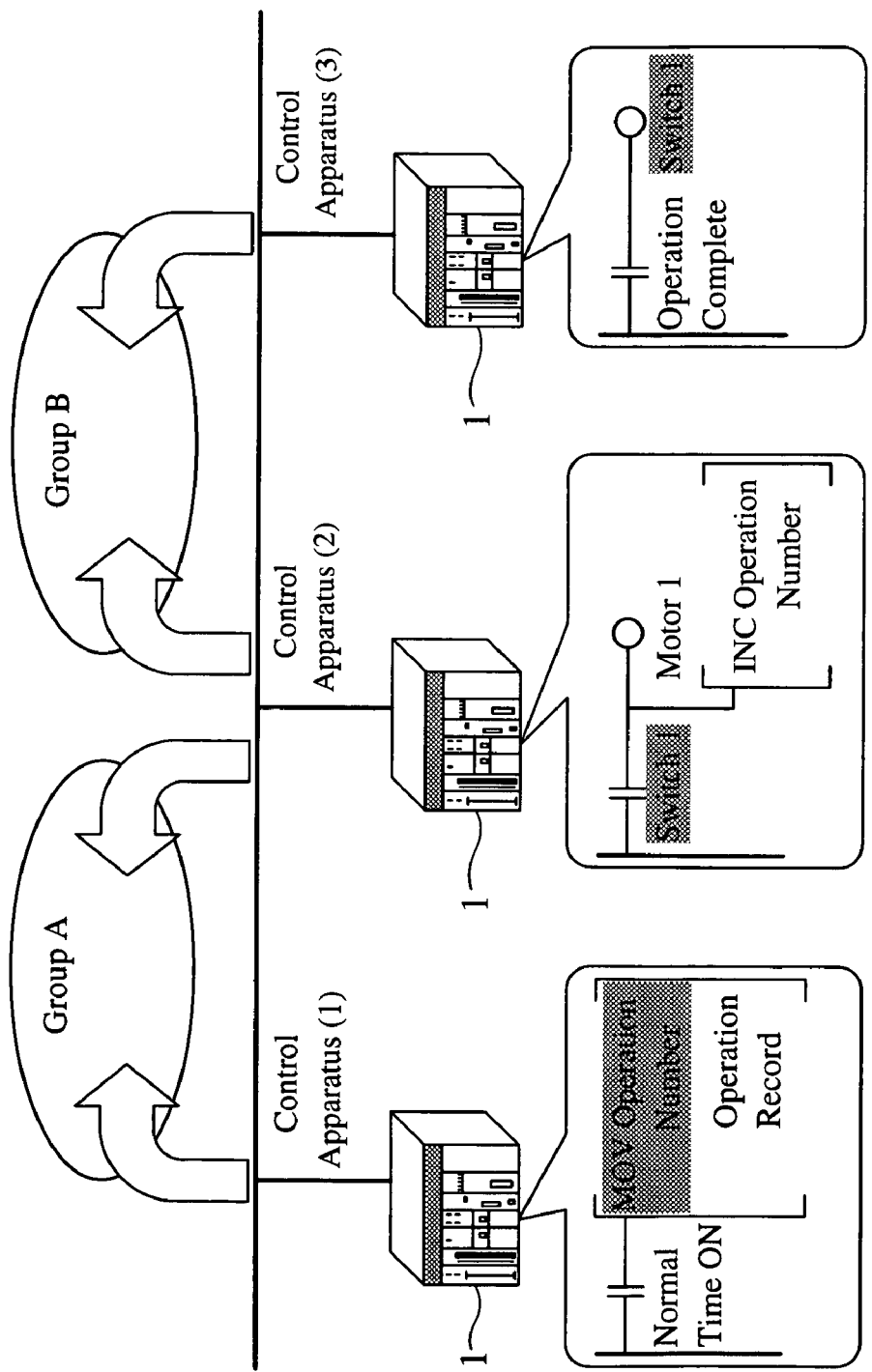
FIG. 40 is a drawing for describing a summary of the present embodiment that plans name solving by group units which is another embodiment of the present invention.

FIG. 40 shows another embodiment of the present invention. In each embodiment described above, the control apparatuses are connected by network global variables, and because fellow control apparatuses automatically carry out name solving of such network global variables, by using the respective programming tool stored in each control apparatus, it is possible to easily integrate the developed control programs as a system. In this way, an effect is created making it possible to support incremental development or simultaneous parallel development by a plurality of people.

This control apparatus automatically exchanges variable information with fellow control apparatuses, possesses a structure for assigning a batch of variables to memory before data transfer, and automatically carries out name solving. Now, this name solving is executed at the time the power source is switched ON or at the time a control apparatus joins the network.

In contrast with the planning of name solving by each variable unit in this way, in the present embodiment, the network global variables are grouped, and the version and ID are controlled by such group unit.

Namely, when name solving is required such as at the time the power source is switched ON or at the time of network joining or the like, the versions (ID) of the fellow group possessed by each control apparatus are compared, and when they are the same, it is possible to judge that name solving has been carried out once before, and because no changes of the content are considered to occur thereafter, a new name solving is not carried out for the network global variables belonging to such group.

By providing such structure, it is possible to reduce the number of processes for actually carrying out name solving, and it is possible to greatly shorten the time up to the start of the program execution of the control apparatus. In particular, in many cases, because name solving takes place at the time of site adjustment, debugging and the like, by executing only a version check at the time the power source of the control apparatus is switched ON during actual system operation, or at the time a control apparatus is added to or removed from the network, it is possible to reduce the network load and minimize effects on the system. Namely, for example, in the case where a control apparatus that is cut off once due to a network disconnection or bad contact joins the network again, name solving is carried out every time such situation occurs in each embodiment described above, but in the present embodiment, restoration is possible by executing only a version check, and for this reason the present embodiment is preferred. Further, in the case where the version does not match, name solving of the network global variables belonging to such group is carried out, and the specific process thereof can be executed by the method described in each embodiment described above.

Further, the version and ID of the group described above is updated in the case where the memory content of the variable database 17 is changed due to a user program revision or a compiling execution or the like, or every time the memory content of the variable database 17 of an operating control apparatus is changed due to an online edit.

Further, when the network global variables are grouped, the variables are preferably categorized for a separate purpose. By carrying out this kind of grouping, because it can be assumed that the control apparatus that uses data of the same group will carry out coordination/synchronization control and the like, it becomes possible to easily know the relationship between fellow control apparatuses. For example, in the example shown in FIG. 40, it is understood that the network global variables belonging to group A are shared by the control apparatus (1) and the control apparatus (2), and the network global variables belonging to group B are shared by the control apparatus (2) and the control apparatus (3).

Furthermore, the possessors of the group of network global variables are made clear. Namely, changes to network global variables belonging to one group are carried out by one control apparatus 1 (server) that is the possessor existing on the network, and the other sharing control apparatuses 1 (clients) receive data transmitted from the possessor control apparatus. In this way, the group (meaning a bundle of data, not individual data) can be regarded as an external interface of the control apparatus 1 possessing such group, and it becomes easy to appropriate the one-time developed function module (including the control apparatus, the control software and the control object hardware) as a standard module.

Figure 41:
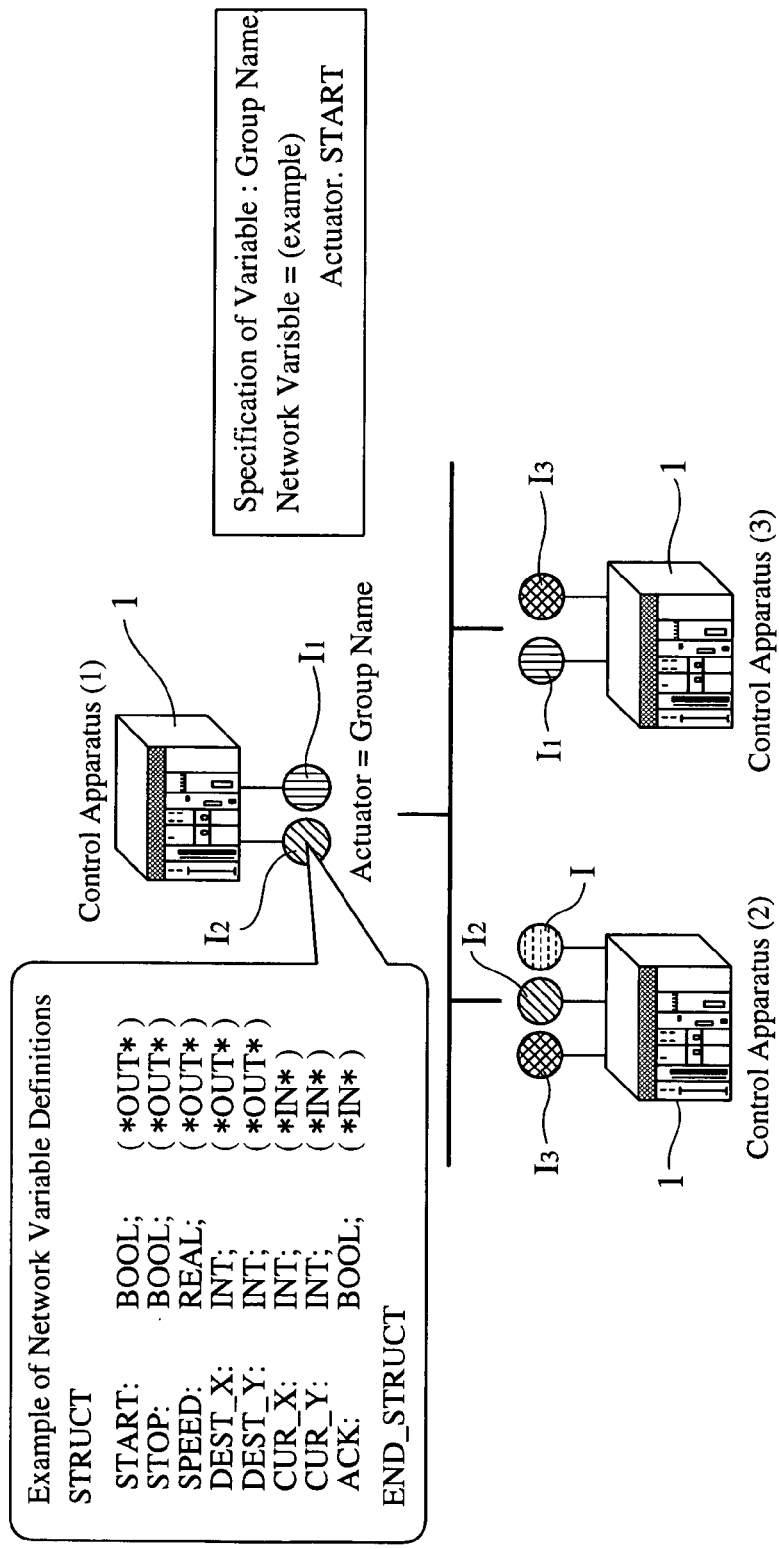
FIG. 41 is a plan view showing the interface connection of fellow control apparatuses of the embodiment shown in FIG. 40.

In the example shown in FIG. 41, a respective external interface $I_n$ is connected to each control apparatus 1. Then, the one interface $I_2$ of the control apparatus (1) forms group A made up of a plurality of network global variables, and this group A is also utilized by the control apparatus (2). Further, the specification of a variable is carried out by the group name and the network variable name. In this way, when the same network variable name is not inside the group, the network global variable specified by the group name and the network variable name has a sole existence on the network.

As described above, by having one control apparatus 1 possess the group, and by considering the group as an external interface of such control apparatus, apparatus development by combination of the standard module and construction of a plant line become easy. Further, input variables or output variables or both of such variables for the control apparatus 1 that possesses the interface can be included in the interface. Further, when the group/interface concept is expressed by language, a correspondence of the structural body or class may be applied to the interface. Then, there is the concept of a class (mode 1) and an instance in the interface.

Figure 42:
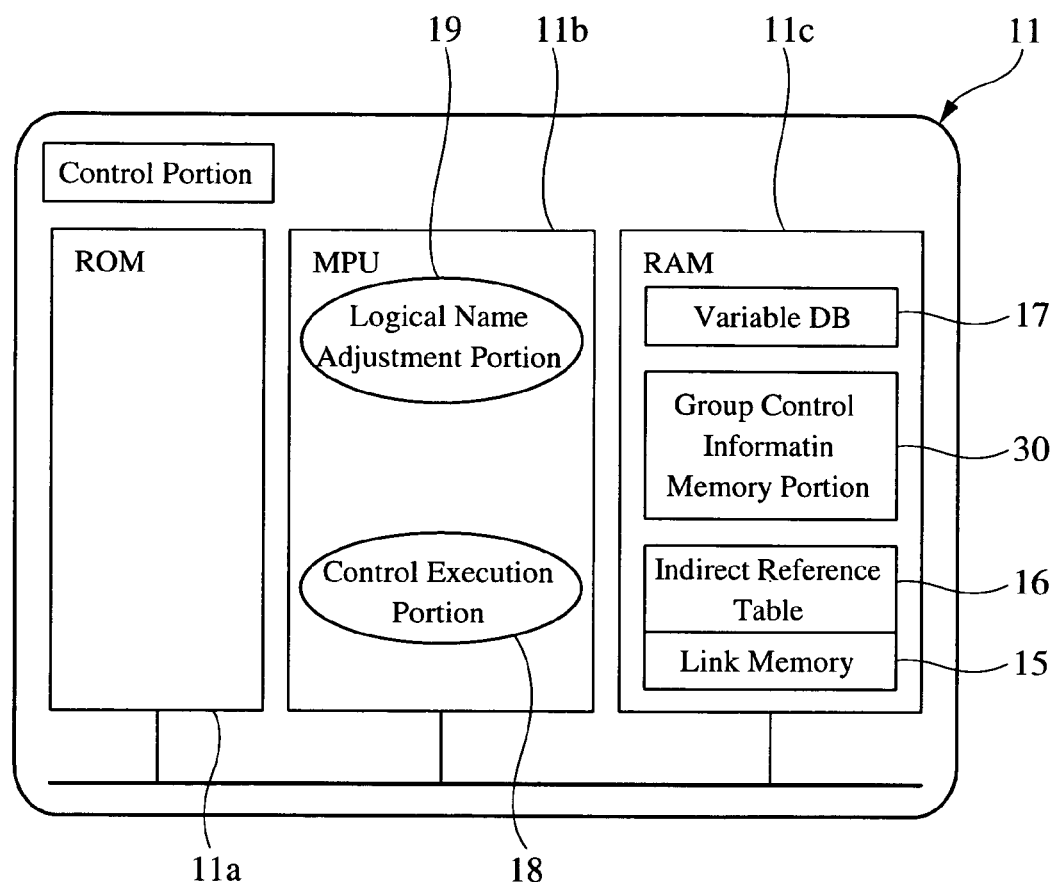
FIG. 42 is a drawing showing an example of the internal structure of the control portion of the control apparatus used by the embodiment shown in FIG. 40.

Next, as for the specific structure of the control apparatus 1 for carrying out the name solving by group units described above, it is possible to use the structure shown in FIG. 42. As is clear from this drawing, in the present embodiment, the embodiment shown in FIG. 3 is used as a base, and a group control information memory portion 35 is further provided inside the RAM 11c.

Figure 43:
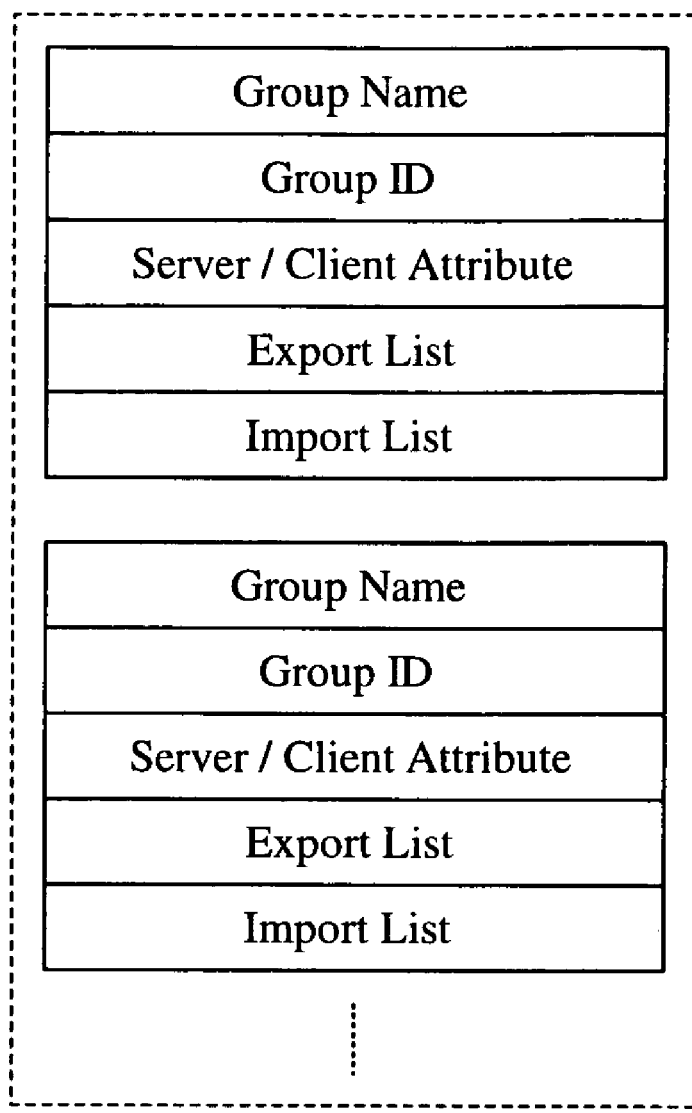
FIG. 43 is a drawing showing one example of the data structure of a group control information memory portion.

This group control information memory portion 35 is a memory portion that groups and holds the logical names (network global variables) of data shared between the plurality of nodes (control apparatuses) connected to the network. As shown in FIG. 43, the internal structure (data structure) of this group control information memory portion 35 is provided with the group name, the ID (or version) of such group, a server/client attribute which specifies whether a control apparatus forms a server having possession rights for such group or forms a client at the utilization side, and an Export list and an Import list which store information related to the variable names belonging to such group. Because these Export list and Import list are the same as those of the embodiment shown in FIG. 7 and FIG. 8, a detailed description thereof is omitted. Further, because the other structures and operational effects are the same as those of the embodiments described above, the same reference characters are assigned to corresponding members, and a detailed description of each function is omitted.

Next, a description will be given for the algorithm that carries out name solving in a system constructed by providing the network with a plurality of the control apparatuses 1 described above. This process is basically executed by the logical name adjustment portion 19.

Although a description will be repeated, in the case where the server-side control apparatus and the client-side control apparatuses possess the same group name, the essential portion of the present embodiment collates each other's ID. Then, when the IDs are the same, name solving is judged to have been carried out once, and a new name solving for the network global variables belonging to such group is skipped. Further, in the case where the IDs are different, a new name solving is actually carried out for the network global variables.

Namely, in the case where the server-side control apparatus 1 joins the network, or the server-side group changes, the server-side control apparatus 1 transmits the pair of the group name and the ID on the network by simultaneous broadcast. In this way, because the other control apparatuses 1 connected to the network will receive this simultaneously broadcasted data, the client-side control apparatus 1 accesses the group control information memory portion 35, and searches the group name transmitted in from the server. Then, when the same group name is present, the IDs are then collated.

At this time, in the case where the stored ID and the received ID are the same, the response "there is no name solving request" is sent back to the server-side control apparatus 1. Further, in the case where the IDs are different, the response "there is a name solving request" is sent back to the server-side control apparatus 1.

The server-side control apparatus that receives the responses described above creates a "name solving request station list" from only the nodes that sent in the "there is a name solving request" response, and name solving is individually carried out between the nodes (control apparatuses) present in such "name solving request station list".

On the other hand, in the case where a client-side control apparatus 1 joins the network, or the client-side group changes, the client-side control apparatus 1 simultaneously broadcasts the group name of the group used by itself, and makes a request by transmitting the pair of the group name and the ID to the server-side control apparatus 1. The prescribed server-side control apparatus 1 that receives this replies by sending back the pair of the group name and the ID possessing the same group name stored in the group control information memory portion 35.

Next, based on the pair of the group name and the ID sent in from the server-side control apparatus, the client-side control apparatus 1 accesses the group control information memory portion 35, and searches the group name transmitted in from the server. Then, when the same group name is present, the IDs are then collated, and in the case where the stored ID and the received ID are the same, the response "there is no name solving request" is sent back to the server-side control apparatus 1. Further, in the case where the IDs are different, the response "there is a name solving request" is sent back to the server-side control apparatus 1.

Then, the server-side control apparatus that receives the responses described above creates a "name solving request station list" from only the nodes that sent in the "there is a name solving request" response, and name solving is individually carried out between the nodes (control apparatuses) present in such "name solving request station list". Accordingly, in either case, the control apparatuses that possess a group having the same name skip the actual process of name solving of the network global variables.

Next, the specific functions of each control apparatus for carrying out all the processes described above will be described separately for the server side and the client side respectively for the case where a server-side control apparatus joins the network or the like, and there arises the possibility of carrying out name solving, and the case where a client-side control apparatus joins the network or the like, and there arises the possibility of carrying out name solving.

The control apparatus having "server" in the server/client attribute column of the group control information memory portion 35 forms the server for the group. Now, this server is equipped with an exchange function which sets the same group as an interface, and exchanges ID information with other control apparatuses having "client" in the server/client attribute, and an exchange function which exchanges the variable database information of the network global variables with the other control apparatuses only when there is a request from the client side. Now, the two functions are provided in the logical name adjustment portion 19.

The control apparatus having "client" in the server/client attribute column of the group control information memory portion 35 forms the client for the group. The control apparatus having a client attribute is equipped with an ID information reception function which receives ID information transmitted in from other control apparatuses possessing the same group name having a server attribute, a request function which makes a request for name solving of the network global variables to the server-side control apparatus in the case where such ID and the ID controlled by the self control apparatus are collated and found to be different, and an exchange function which thereafter exchanges variable database information with the server-side control apparatus. Now, each of these functions are also provided in the logical name adjustment portion 19.

Figure 44:
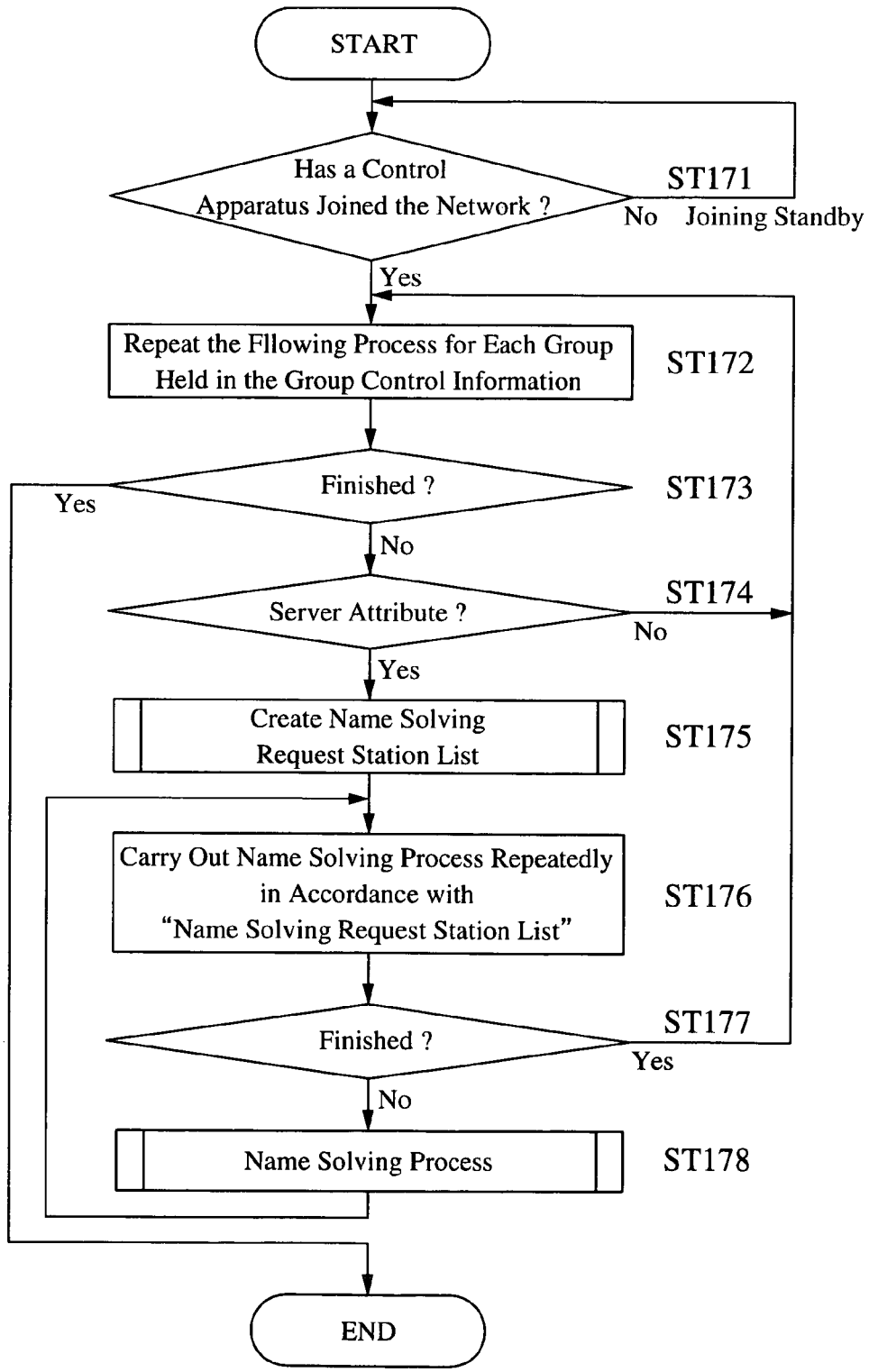

Now, the process at the time the server-side control apparatus joins the network or at the time the server-side group is changed is carried out by the exchange function formed from the flowchart shown in FIG. 44.

A judgment of whether or not a control apparatus has joined the network is carried out, and when a control apparatus has joined, the process described below is carried out by group units for all the groups held in the group control information memory portion 35 (ST171~ST173).

First, the server/client attribute is recognized, and a judgment of whether or not there is a server attribute is carried out (ST174). Then, in the case of a client attribute, because there is no need for the process of the server side, the flowchart returns to Step 172 and proceeds to the process for the next group.

Figure 45:
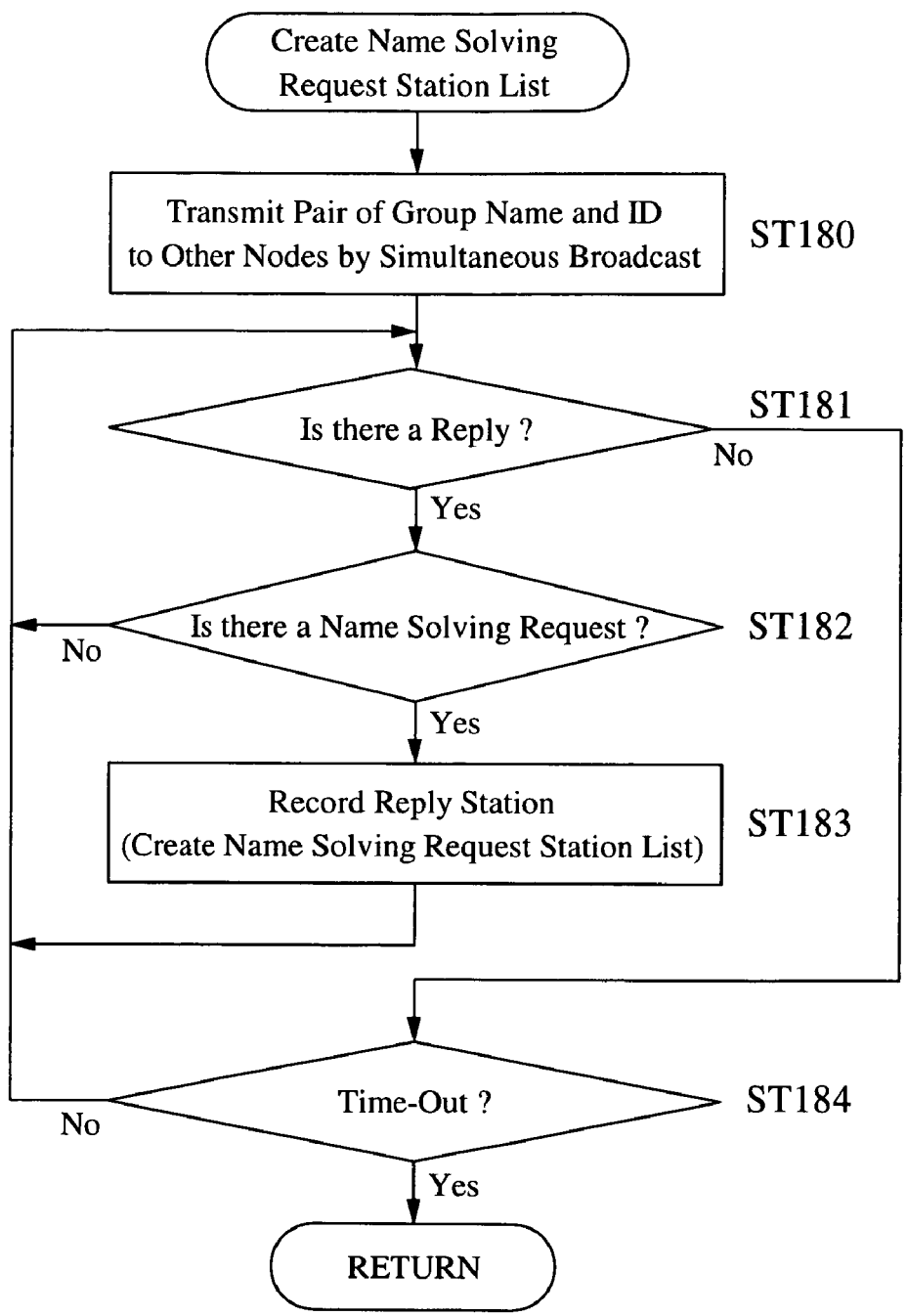
FIG. 45 is a flowchart showing the specific process algorithm of the name solving request station list creation process of the flowchart shown in FIG. 44.

On the other hand, in the case of a server attribute group, a process for creating a name solving request station list is carried out (ST175). Namely, a required series of processes are carried out in order to create a "name solving request station list" which lists the nodes requiring name solving of the global network variables described above, specifically, the flowchart shown in FIG. 45 is carried out.

Namely, first, this name solving request station list creation process transmits the pair of the group name and the ID of the group forming the processing object to the other nodes (the other control apparatuses connected to the network) by simultaneous broadcast (ST180). Then, as described later below, because the control apparatuses that form clients which use the received group will reply by sending back "there is a/no name solving request" responses, a judgment of whether or not there is such response (reply) is carried out (ST181), and in the case where there is a response, a judgment of the content thereof is carried out (ST182), and only in the case where there is a name solving request, the network address of the reply station (control apparatus) that replies by sending a response is recorded, and a name solving request station list is created (ST183). Further, the name solving request station list is a table which lists the network addresses of reply stations (control apparatuses that require name solving).

Accordingly, a No at the branching judgment of Step 182 occurs in the case where the response sent in from the control apparatus indicates that there is no name solving request (the IDs match), and because the network address of the reply station (client-side control apparatus) is not recorded in such case, the name solving that is executed thereafter is also not carried out. Namely, name solving is skipped.

Further, when there is no reply from the other control apparatuses after a prescribed time has passed since the simultaneous broadcast, a time-out is carried out and the name solving request station list creation process is terminated, and then operations proceed to the next process.

When the name solving request station list is created by carrying out the name solving request station list creation process described above, a name solving process (ST178) is carried out repeatedly (ST176~ST178) in accordance with such list. Then, when name solving has been carried out between all control apparatuses recorded in the list, a Yes is made at the branching judgment of Step 177, and the flowchart returns to Step 172 and proceeds to the process for the next group.

Figure 46:
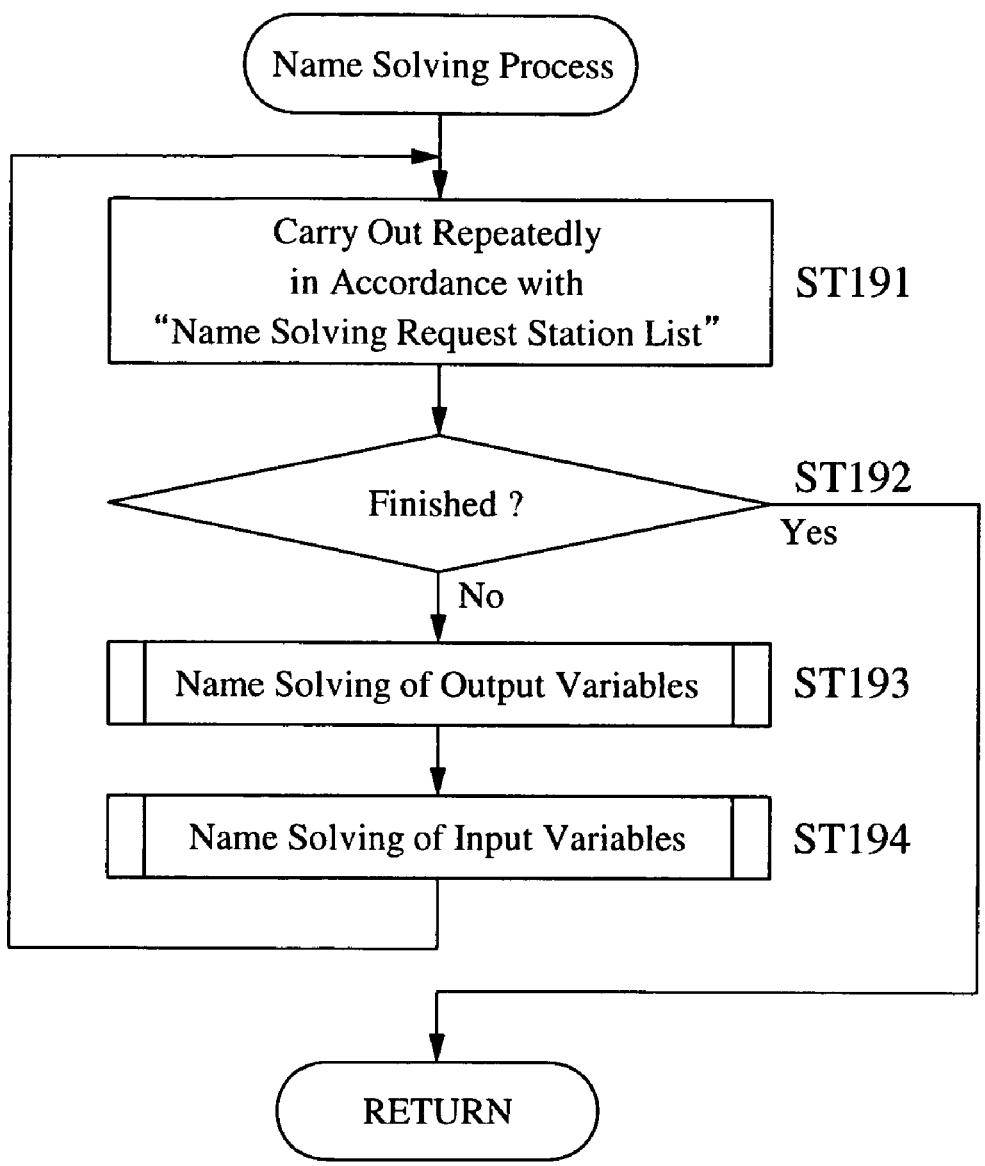
FIG. 46 is a flowchart showing the specific process algorithm of the name solving process of the flowchart shown in FIG. 44.

Further, the name solving process of Step 178 is specifically carried out like the flowchart shown in FIG. 46. Namely, because the network addresses of the control apparatuses that require name solving are listed in the name solving request station list, the process is carried out in an ordered manner (ST191, ST192). Namely, first, name solving is carried out for the output variables (ST193), and then name solving of the input variables is carried out (ST194). Further, the processes for the output variables and the input variables may also of course be carried out in reverse.

Figure 47:
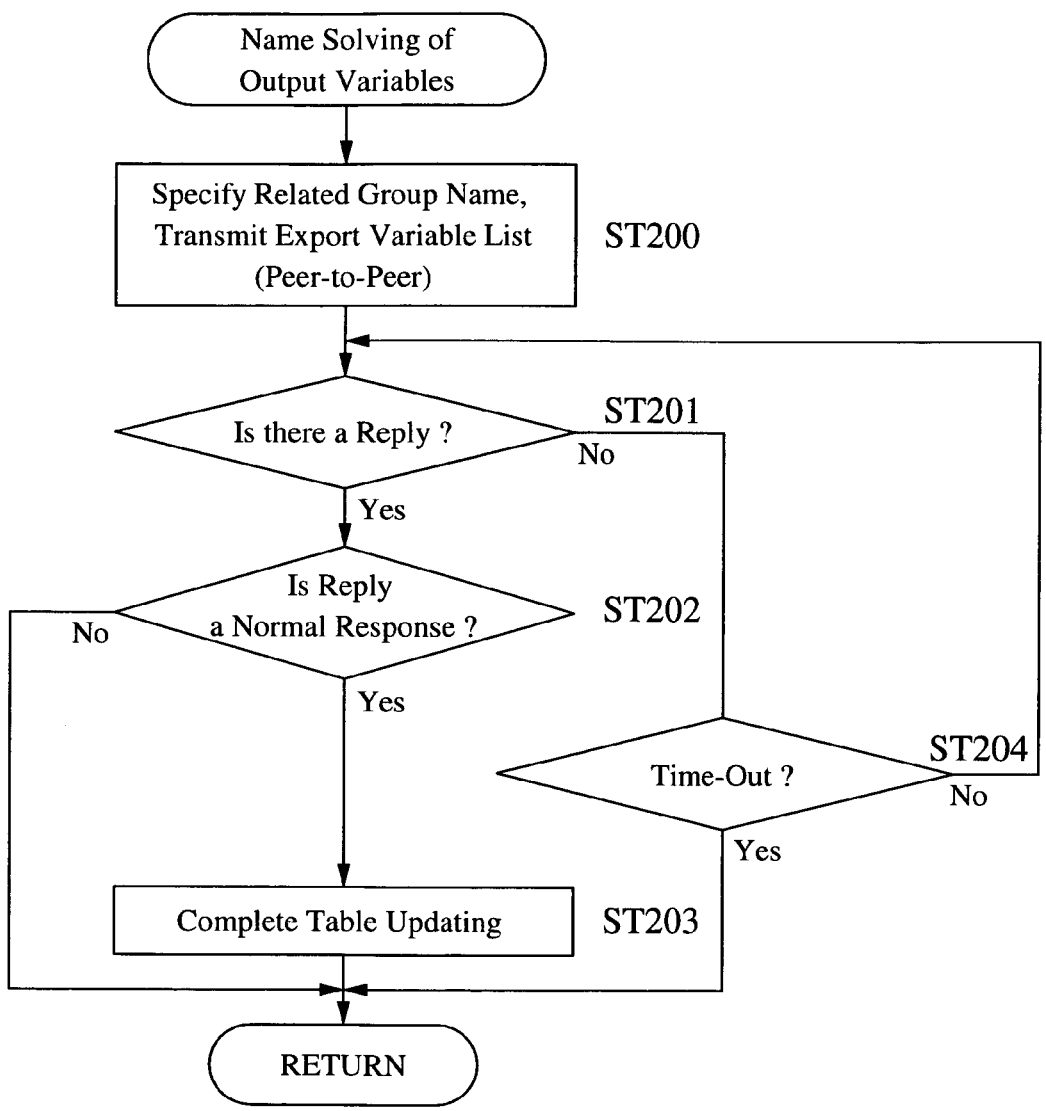
FIG. 47 is a flowchart showing the specific process algorithm of the name solving process of the output variables shown in FIG. 46.

Then, as shown in FIG. 47, in the name solving process of the output variables, first, the server-side logical name adjustment portion 19 specifies the related group name, and transmits an Export variable list (ST200). The destinations of this transmission are the control apparatuses recorded in the name solving request station list for the processing object group. Namely, the exchange of variable database information is carried out by one-to-one peer-to-peer communication between the control apparatus and the control apparatuses in the name solving request station list.

As described later, because the other control apparatuses (nodes) of the reception-side that receive the transmission of the Export variable list will transmit reply signals, a judgment of whether or not there is such a reply signal is carried out (ST201). Then, in the case where there is such reply signal, a judgment of whether or not such reply is a normal response is carried out (ST202), and table updating is completed (ST203). In this way, it is possible for the control apparatus that transmits the Export variable list to judge who receives the Export variable list, and who does not receive the Export variable list. Then, the check of the presence or absence of the reception of a reply signal is executed until a time-out is carried out (ST204), and when a time-out is carried out, the name solving process of the output variables is terminated. Further, the process is also terminated in the case where the reply signal is not a normal response.

Figure 48:
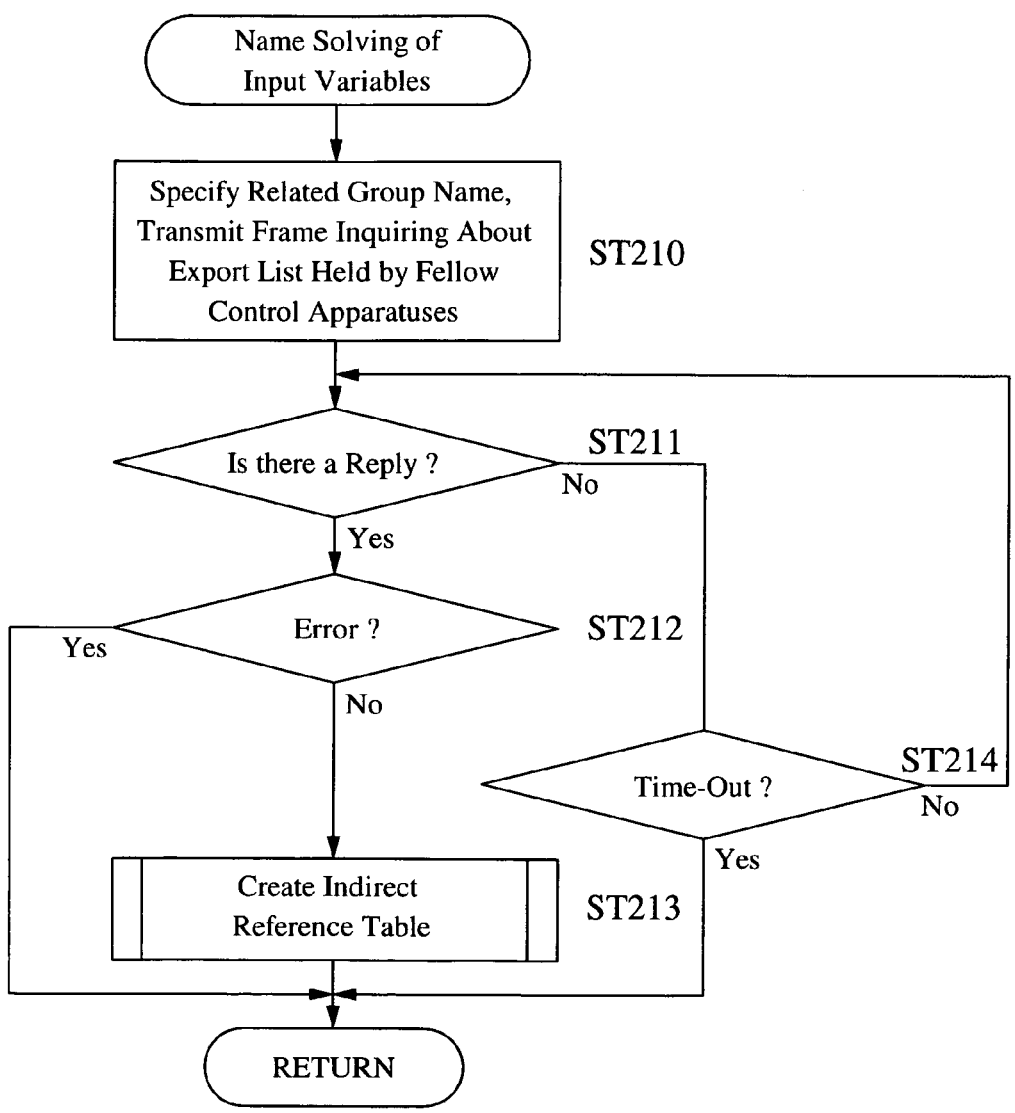
FIG. 48 is a flowchart showing the specific process algorithm of the name solving process of the input variables shown in FIG. 46.

Further, as shown in FIG. 48, in the name solving of the input variables, first, the server-side logical name adjustment portion 19 specifies the related group name, and creates and transmits a frame inquiring about the Export variable list held by the fellow control apparatuses (ST210). Because a corresponding Export variable list will be sent in from the above-described fellow control apparatuses as a reply to this inquiry, a judgment of whether or not there is such reply is carried out (ST211). Then, in the case where there is such reply, the fact that there is no error is confirmed (ST212), and an indirect reference table is created (ST213). Then, the check of the presence or absence of reception of a reply signal is executed until a time-out is carried out (ST214), and when a time-out is carried out, the name solving process of the input variables is terminated. Further, the process is also terminated in the case where the received reply is an error. By including a name solving process of the input variables in this way, it is possible to include the input variables inside the group.

Figure 49:
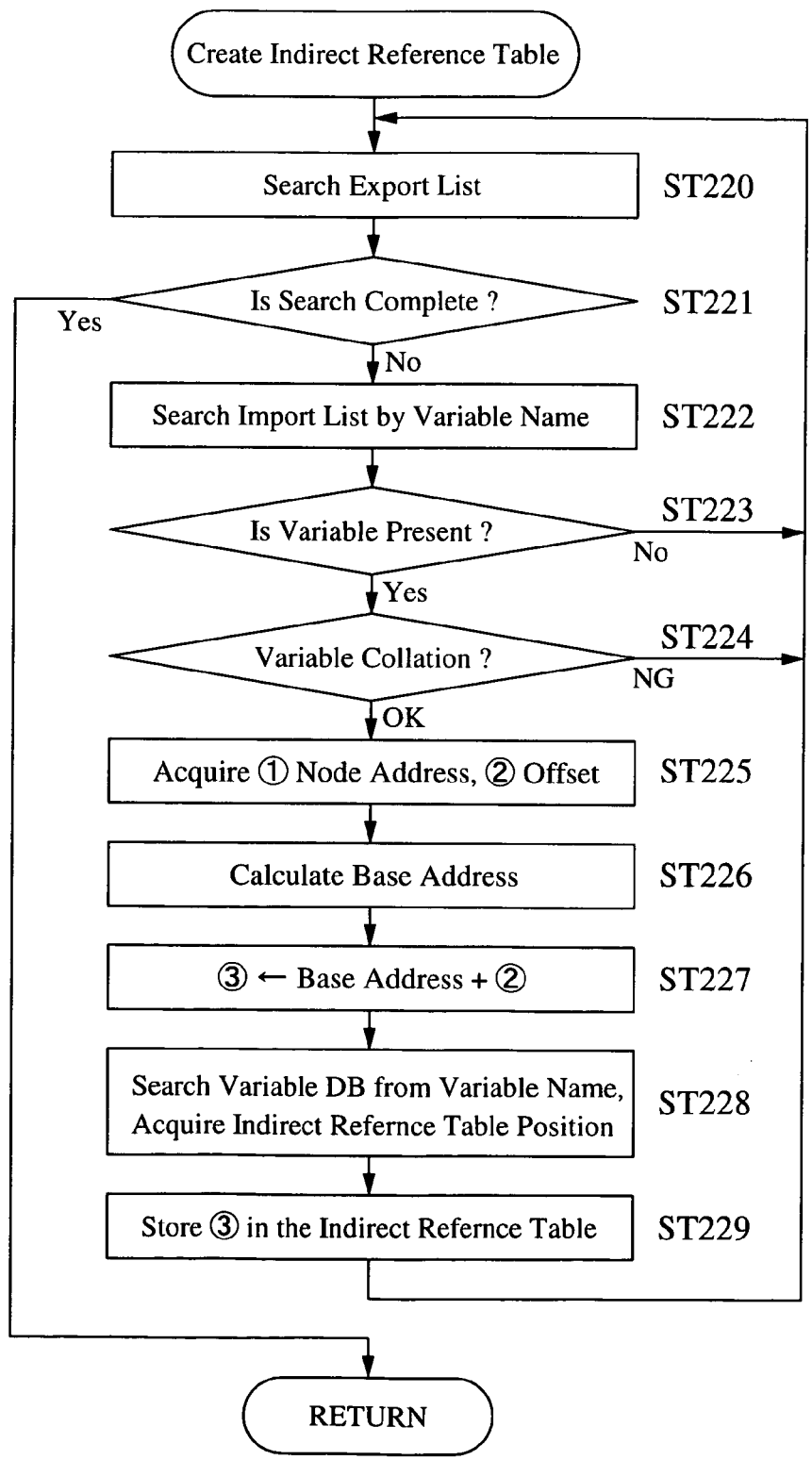
FIG. 49 is a flowchart showing the specific process algorithm of the indirect reference table creation process shown in FIG. 48.

Furthermore, the specific process algorithm of the creation process of the indirect reference table of Step 213 described above is like that shown in FIG. 49. Namely, using the process function shown in FIG. 17 as a base, an improvement of one portion is made. As shown in FIG. 49, first, the received Export list of the other nodes (control apparatuses) is searched in an ordered manner, and the process below is repeatedly carried out for all of the variables included in such list (ST220, ST221).

Namely, the Import list of the self node is searched by the variable name (ST222, ST223). Because a No will be made at the branching judgment of Step 223 when the variable is not present, the flowchart returns to Step 220 and proceeds to the next process. Namely, the process for such variable is skipped.

Then, when collation of the variables can be carried out, the node address ① of the control apparatus publicizing such variable, and the self node area offset ② inside the link memory of such apparatus are acquired from the Export list and recorded (ST224, ST225).

Next, the Import list held in the self node is searched by the variable name, and the base address (head address) of the other node area (the area for the node publicizing the variable) related to ① of the link memory is calculated (ST226). Then, a value ③ is calculated by adding the offset ② calculated at Step 225 to the base address (ST227). Namely, in the corresponding node area, because the offset values of regions storing variable data of the same logical name (variable name) are equal, the above-described calculated value ③ forms the head address of the link area storing the variable data.

Next, using the variable name as a key, the variable database 17 is searched, and the indirect reference table position (location storing the pointer of the variable name) is acquired (ST228). Namely, the offset address recorded in the memory address column of the variable is acquired. Then, in accordance with this acquired offset address, the value ③ (pointer showing the head position of the region storing the variable data inside the link memory 15) calculated at Step 227 is stored in the storage region of the related indirect reference table (ST229). In this way, updating of the indirect reference table can be carried out.

Figure 50:
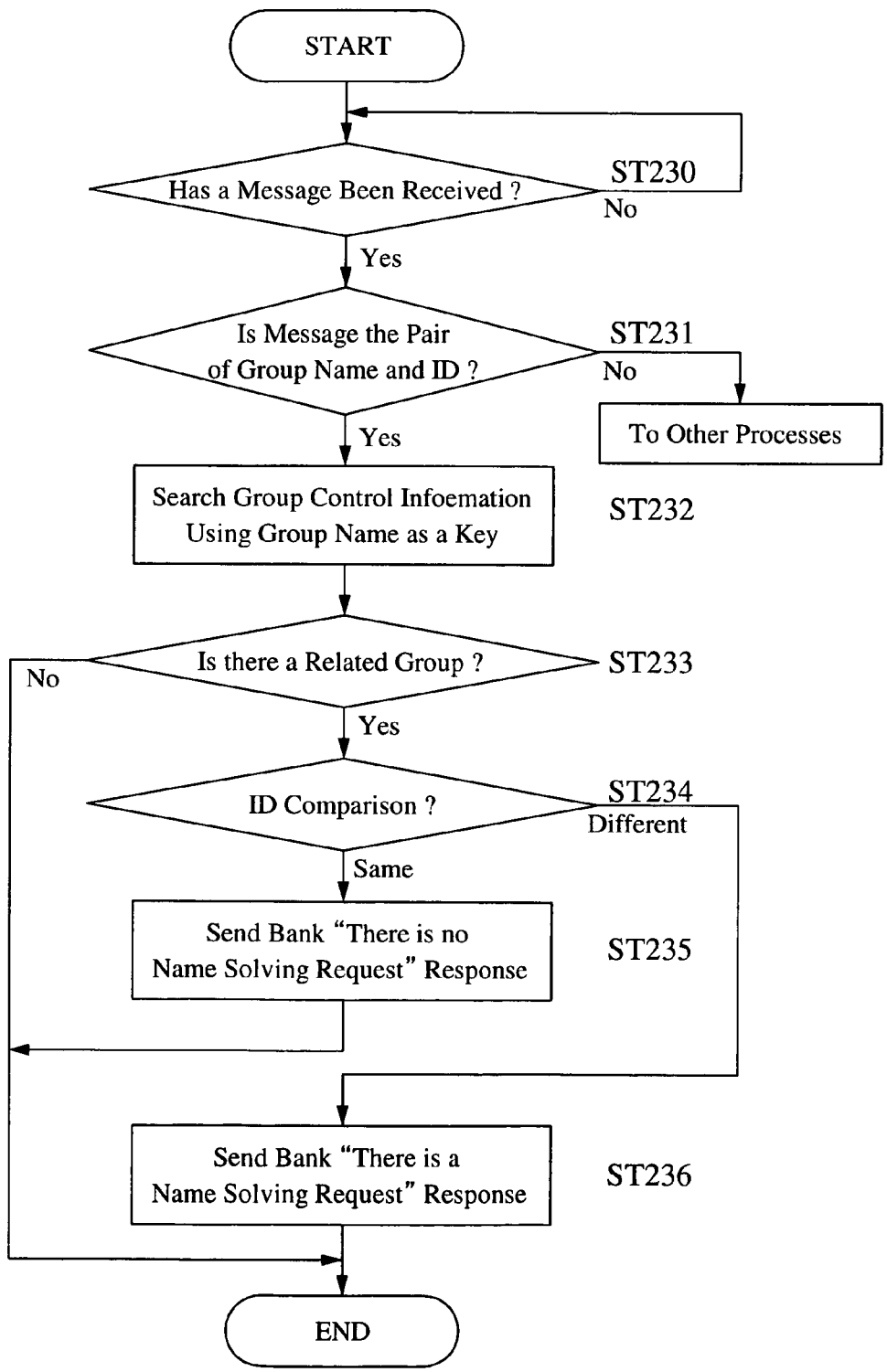
FIG. 50 is a flowchart showing the exchange function of a client-side control apparatus.

On the other hand, in the process of the existing client-side control apparatuses carried out when a server-side control apparatus joins the network or the group changes as described above, an exchange function formed from the flowchart shown in FIG. 50 is executed.

Namely, the process waits for reception of a message (ST230), and a judgment of whether or not the received message is the pair of the group name and the ID is carried out (ST231). Then, in the case where the message is not such pair, the process according to the message is carried out. On the other hand, in the case where the message is such pair, the group control information memory portion 35 of the self control apparatus 1 is searched, and a judgment of whether or not the group name transmitted in from the server is in the held "group control information" is carried out (ST232, ST233).

Next, in the case where the same group name is not present, the process is terminated, but in the case where the same group name is present, the IDs are then collated (ST234). Then, when the IDs are the same, a "there is no name solving request" response is sent back to the server (ST235). Further, in the case where the IDs are different, a "there is a name solving request" response is sent back to the server (ST236).

Figure 51:
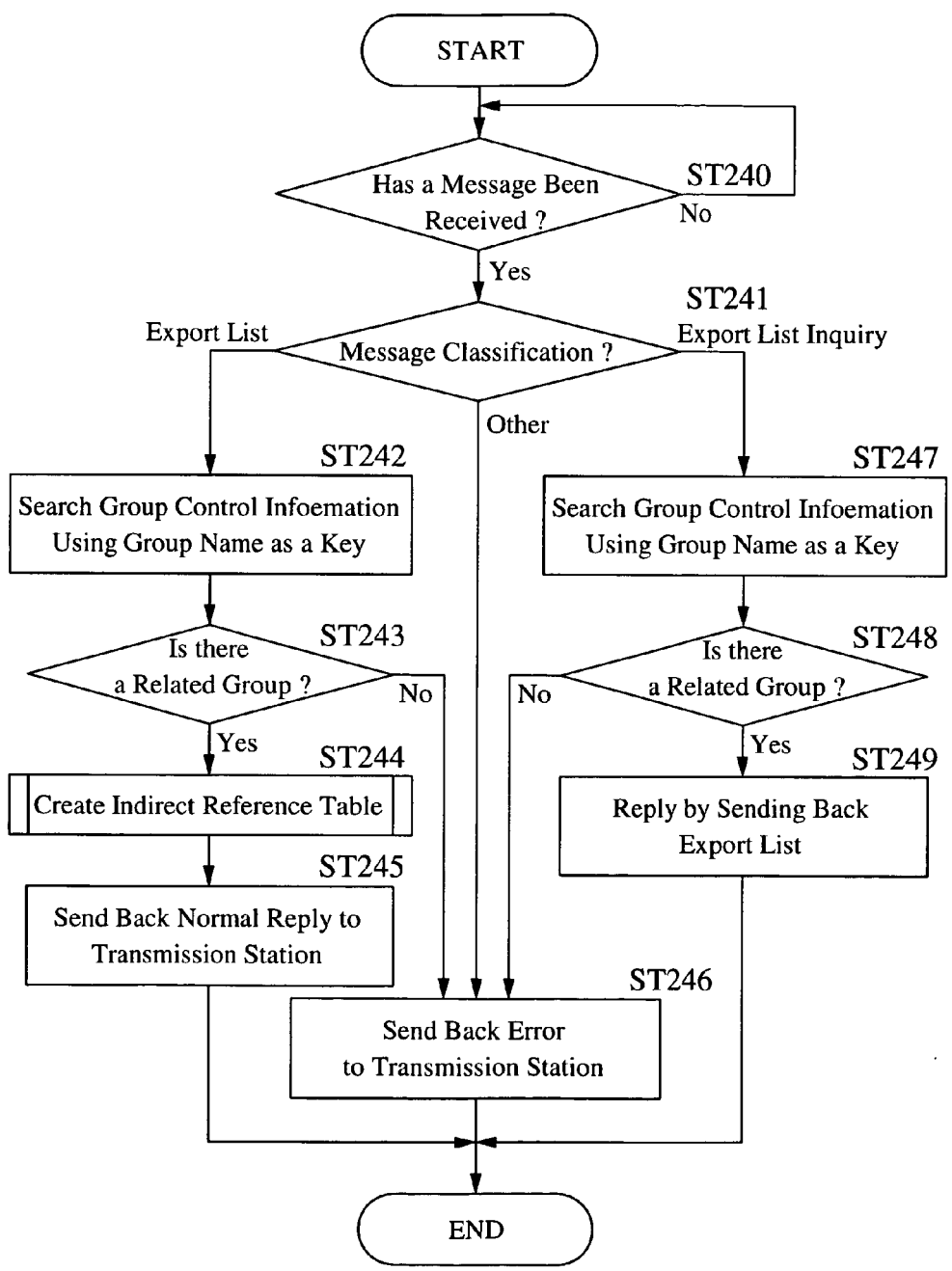
FIG. 51 is a flowchart showing the specific procedure when name solving is carried out.

On the other hand, in the case concerning the "there is a name solving request" response at Step 236 described above, thereafter a name solving process is carried out with the server-side control apparatus in accordance with the message from the server. This specific name solving process is carried out according to the flowchart shown in FIG. 51.

Namely, first, the process waits for reception of a message (ST240), and when a message is received, the classification thereof is judged (ST241). Then, in the case where the received message is an Export list, the group control information memory portion 35 is searched using the received group name as a key, and a judgment of whether or not there is a related group is carried out (ST242, ST243). In the case where there is a related group, an indirect reference table is created in accordance with the flowchart shown in FIG. 49 (ST244). Thereafter, a normal reply indicating the fact that a normal termination has been carried out is sent back to the server-side control apparatus which is the transmission station of the received message (ST245), and the process is terminated. Further, in the case where there is no related group, an error is sent back to the server-side control apparatus which is the transmission station (ST246), and the process is terminated.

On the other hand, in the case where the received message is an Export inquiry, the group control information memory portion 35 is searched using the received group name as a key, and a judgment of whether or not there is a related group is carried out (ST247, ST248). In the case where there is a related group, the Export list related to such group is transmitted to the server-side control apparatus which is the transmission station of the message (ST249), and the process is terminated. Further, in the case where there is no related group, an error is sent back to the server-side control apparatus which is the transmission station (ST246), and the process is terminated.

Each of the process functions of the server side and the client side described above were described for execution based on the server-side operations (network joining, group changes, etc.), and a description for each of the process functions executed based on the client-side operations (network joining, group changes, etc.) will be given next.

Figure 52:
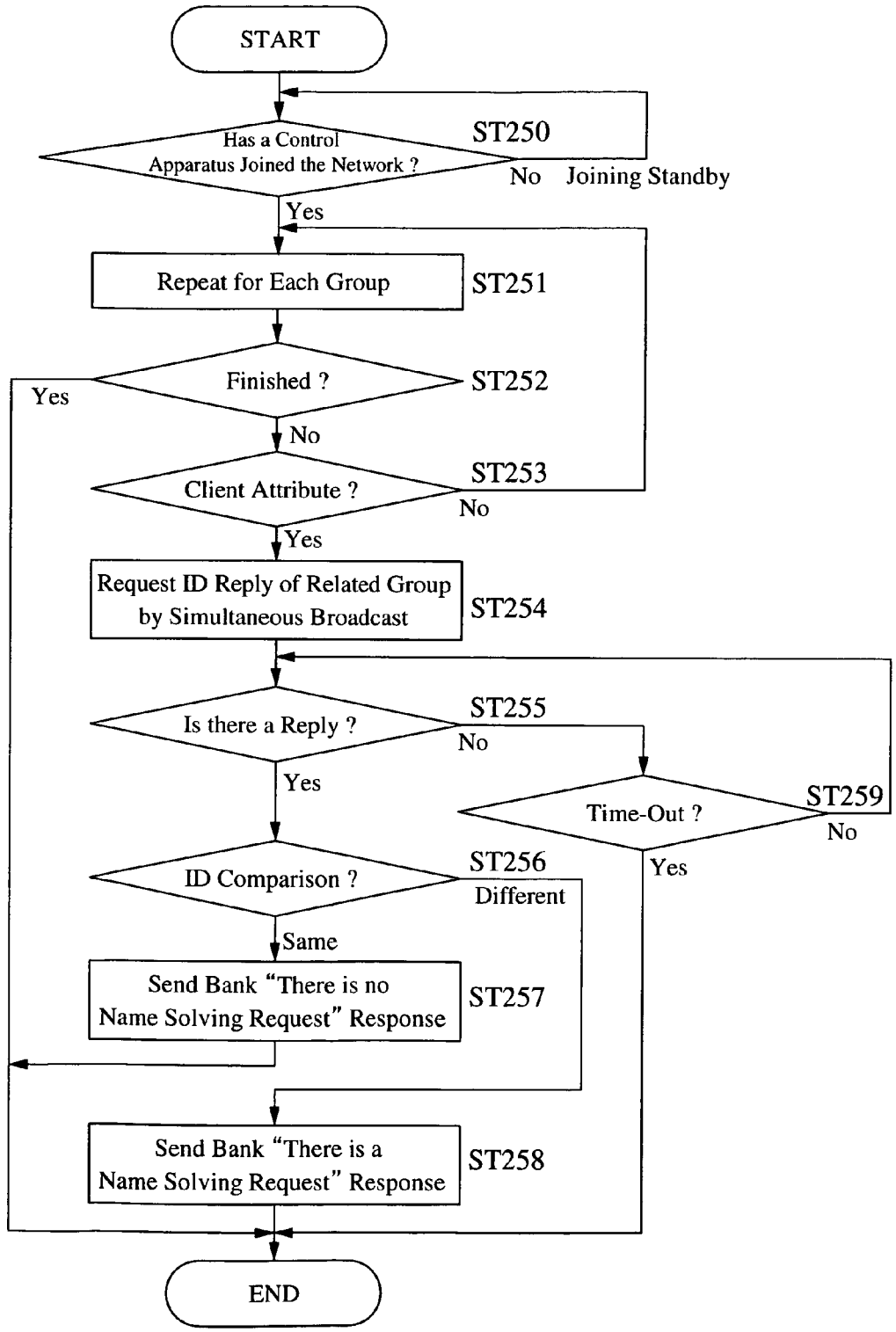

First, the client-side control apparatus executes an ID request function formed from the flowchart shown in FIG. 52. Namely, a judgment of whether or not a control apparatus has joined the network is carried out, and when a control apparatus has joined, the process from Step 253 to Step 259 described below is carried out by group units for all the groups held inside the group control information memory portion 35 (ST250~ST252).

Namely, the server/client attribute is recognized, and a judgment of whether or not there is a client attribute is carried out (ST253). Then, in the case of a server attribute, because there is no need for the client-side process, the flowchart returns to Step 271 and proceeds to the process for the next group.

On the other hand, in the case of a group having a client attribute, an ID reply of the related group is requested by simultaneous broadcast (ST254). Because the ID is transmitted in from the server for such related group in reply to this ID reply request, a judgment of whether or not there is such reply is carried out (ST255). Then, in the case where there is a reply, the received ID and the ID of the related group held by itself are compared (ST256), and in the case where the IDs are the same, a "there is no name solving request" response is sent back (ST257), but in the case where the IDs are different, a "there is a name solving request" response is sent back (ST258). Further, in the case where there is no reply even after a prescribed time has passed (time-out), the process for such group is terminated (ST259).

Figure 53:
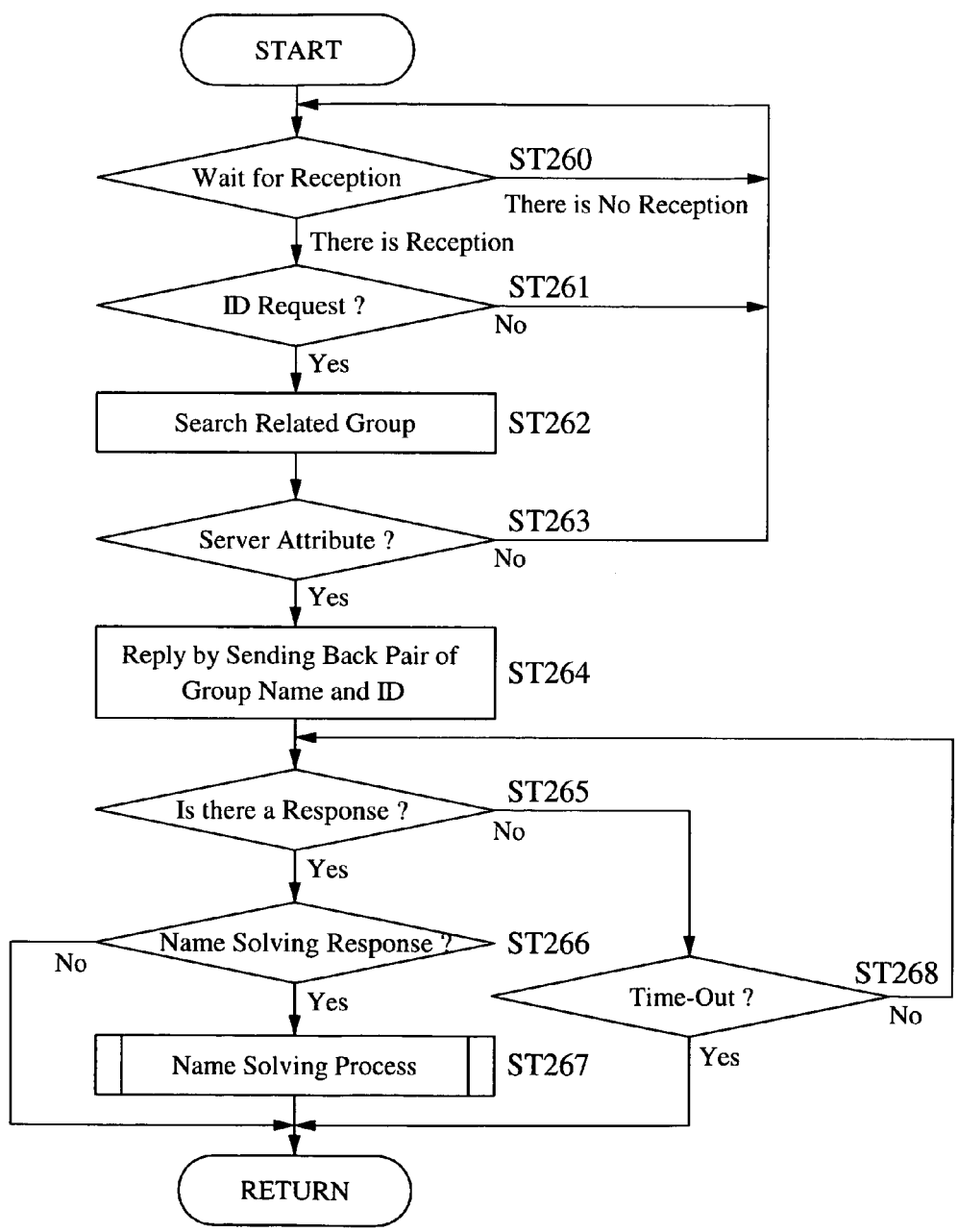

Further, as for the process of the server side in the case where such client joins the network or the like, the logical name adjustment portion 19 of the server-side control apparatus executes a function for replying to the ID information request formed from the flowchart shown in FIG. 53.

Namely, the process waits for reception of the ID reply request sent in from the client (ST260, ST261). Then, when reception occurs, the group control information memory portion 35 is accessed, and the related group is searched (ST262). Then, a judgment of whether or not the attribute of the searched related group is a server attribute is carried out (ST263), and in the case of a client attribute, because there is no need to reply, the flowchart returns to Step 260 and waits for the next reception. Now, in the case of a server attribute, a reply is carried out by sending back the pair of the group name and the ID to the transmission source control apparatus (ST264).

Then, in response to this reply, because the response (reply) of Step 257 or Step 258 of FIG. 52 described above is sent in from the client side, a judgment of the presence or absence of such reply is carried out (ST265). Then, in the case where there is a reply, a judgment of whether or not the reply is a name solving request is carried out (ST266), and in the case of a name solving request, the name solving process shown in FIG. 46 is executed (ST267).

Further, the process is terminated in its current state in the case where the reply is "there is no name solving request" (No at Step 266), and in the case where there is no reply and a time-out is carried out (Yes at Step 268).

Figure 54:
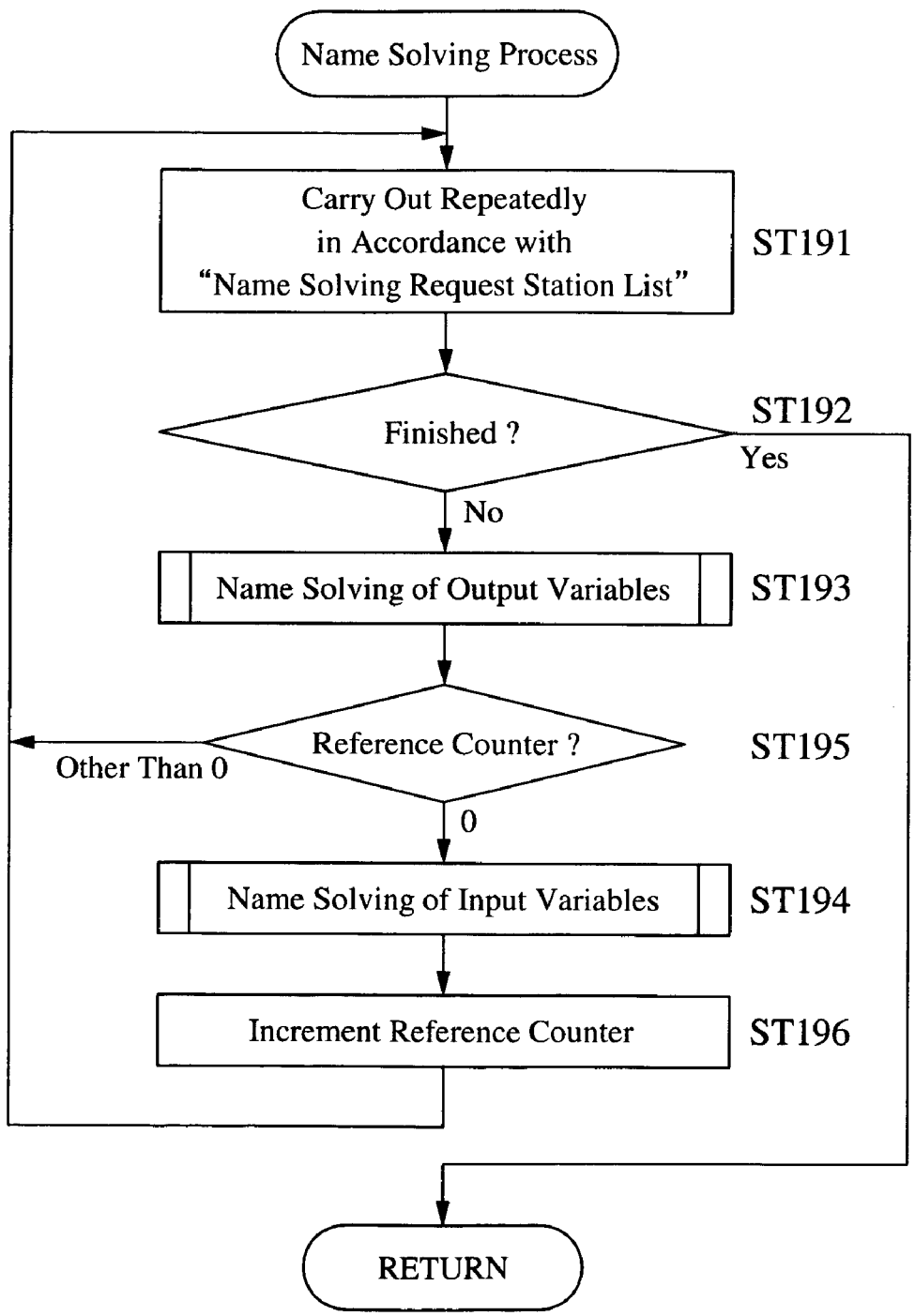
FIG. 54 is a flowchart showing a modification.

FIG. 54 shows a modification of the embodiment that carries out name solving by group units described above. In this modification, in the server-side control apparatus, the variables that form input variables for such control apparatus (server) from the network global variables belonging to the group are inputted from one specific apparatus, and are not inputted from a plurality of apparatuses. Specifically, a reference counter is provided, and name solving of the input variables is planned for the case where the reference counter is 0 (none of the apparatuses are references).

Specifically, as is clear from a comparison of FIG. 54 and FIG. 46, the name solving process shown in FIG. 46 is used as a base, and after carrying out name solving for the output variables (ST193), the counter value of the reference counter is confirmed (ST195). Then, in the case where the counter value is 0, name solving of the input variables is carried out (ST194). Further, in the case where the counter value is some value other than 0, the flowchart returns to Step 191 without carrying out name solving of the input variables, and proceeds to the process for the next control apparatus recorded in the name solving request station list. Further, when name solving of the input variables is carried out, the reference counter is incremented (ST196). In this way, name solving of the input variables that have undergone such name solving will be skipped thereafter (because the value of the reference counter will be some value other than 0 at Step 195). This reference counter can be reset by the programming apparatus or the like. Further, because the other process steps are the same as those shown in FIG. 46, the same step numbers are used, and a detailed description thereof is omitted.

Figure 55:
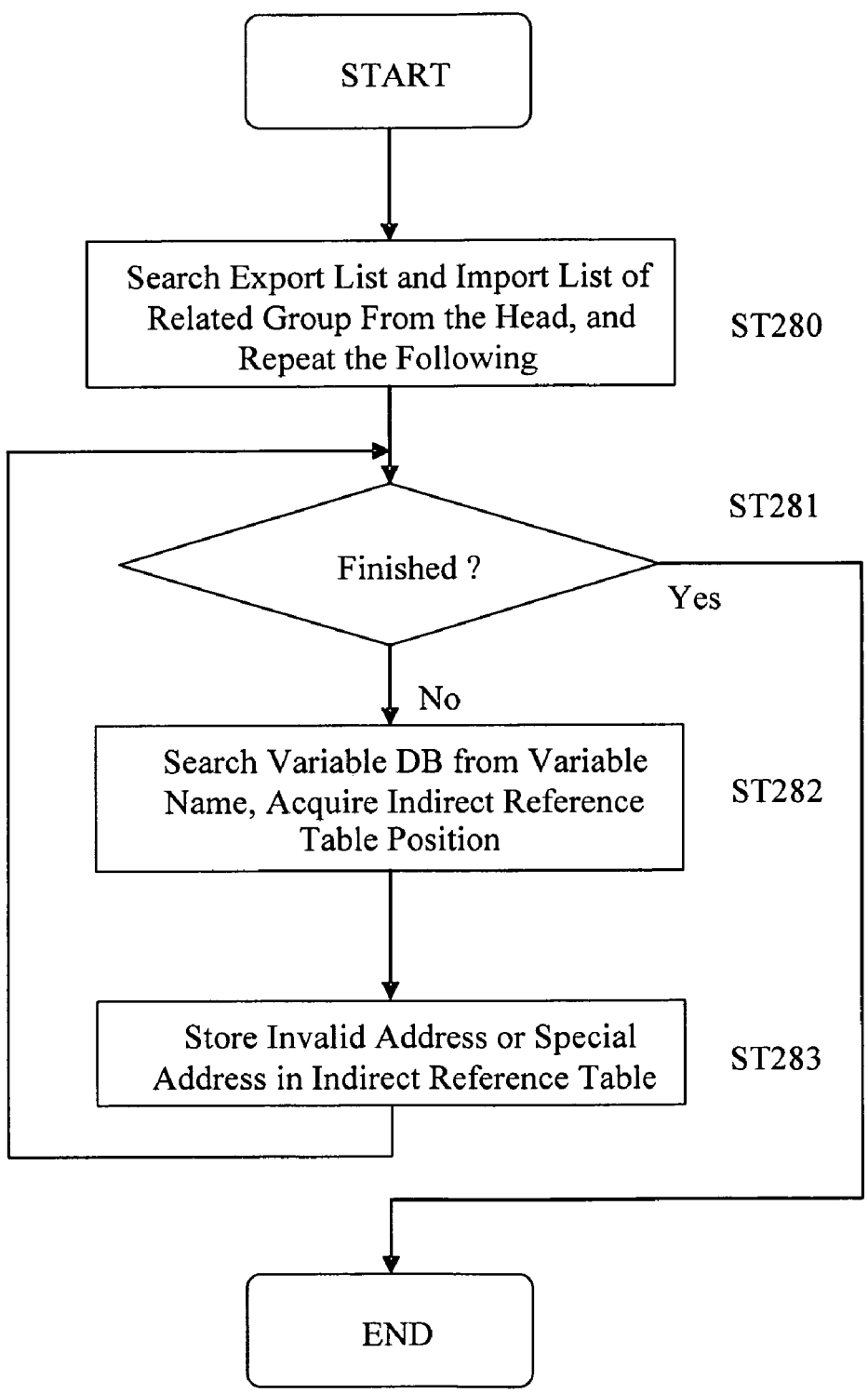
FIG. 55 is a flowchart showing another modification.

FIG. 55 shows another embodiment. Namely, using the above-described embodiment for carrying out group control as a base, an additional function is provided to prohibit the accessing of the data of the network global variables belonging to the related group from the application program inside the related control apparatus in the case where all the network global variables belonging to the group are not the same. Namely, as a result of carrying out name solving when the group name of the server side and the group name of the client side match, in the case where the name, data format or the like do not match even for one of the network global variables included in the group, the group validity is judged to be a mistake, and the address inside the indirect reference table is made invalid or rewritten as a special address which includes an error value.

Specifically, in the indirect reference table creation and updating process shown in FIG. 49, the continuation process is interrupted when a No occurs at Step 273 and Step 274, and a function is added to carry out the error process shown in FIG. 55. Then, this error process carries out a search in an order manner from the head of the Export list and the Import list of the related group (ST280), searches the variable name database from the variable name, and acquires the indirect reference table position of such variable (ST282). Then, a special address or invalid address which includes an error value is stored in the acquired indirect reference table position (ST283). When such position acquisition and address storage process has been carried out to the end of the list, the process is terminated (ST281).

Figure 56:
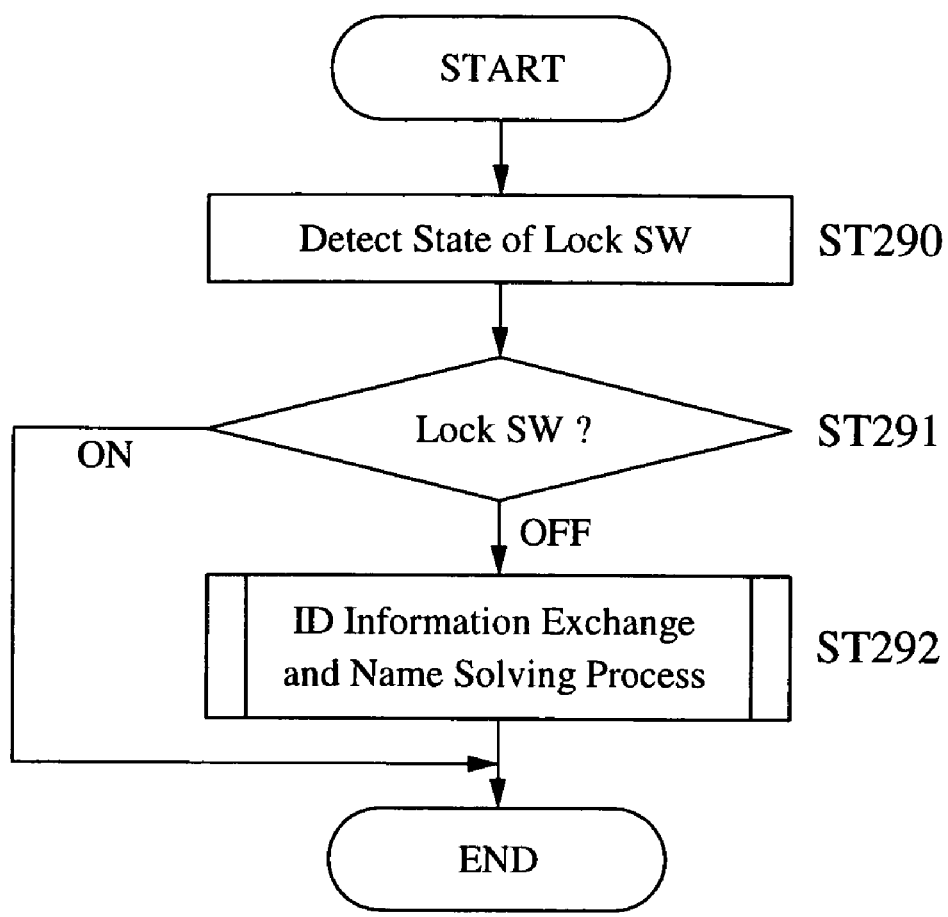
FIG. 56 is a flowchart showing yet another modification.

FIG. 56 shows an embodiment which is provided with another additional function (safety measure). Namely, in the present embodiment, the control apparatus 1 is provided with a name solving lock switch such as a software switch, lock button, dip switch or the like. Then, when this switch is turned ON, instead of carrying out the judgment of whether or not the group names and the IDs match as described above, the name solving process is not carried out. In this way, for example, in the case where it is understood that there is no need to carry out name solving, by turning such switch ON, it is possible to proceed to the actual program execution without carrying out the process for judging whether or not name solving will be carried out. Accordingly, a quicker setup can be carried out.

Specifically, as shown in FIG. 56, the state of the lock switch is detected (ST290), and a judgment of whether or not the lock switch is ON is carried out (ST291). Then, when the lock switch is ON, the pre-processes such as the name solving process and the like are skipped, and the flowchart proceeds to the execution of the program for actual system operation. Further, in the case where the lock switch is OFF, the judgment of the presence or absence of a requirement for name solving of ID information exchange and the like shown in FIG. 44 and the like is carried out, and then the name solving process is carried out as needed (ST292). Further, the name solving lock switch may be automatically operated in the execution mode of the control apparatus.

Figure 57:
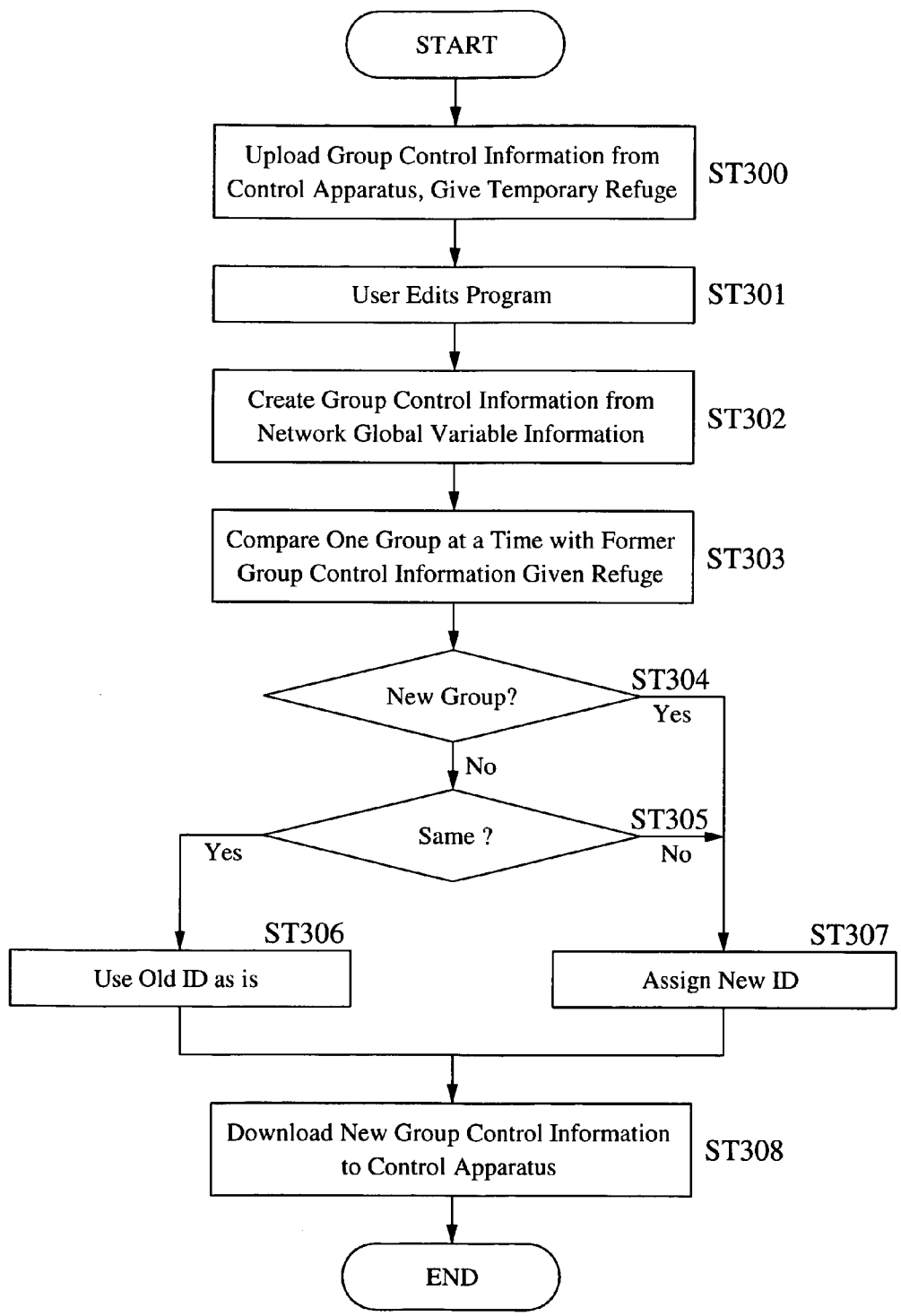
FIG. 57 is a flowchart showing the function of a programming apparatus.

FIG. 57 shows another embodiment. The present embodiment is a programming apparatus connected to a control apparatus which carries out a name solving process by group units according to the group control information described above, and FIG. 57 shows the function of such programming apparatus.

Namely, this programming apparatus controls the group and the network global variables belonging to such group, and is equipped with an ID assigning function which assigns a unique ID to each group, and an ID updating function which updates the ID of the group in the case where there is a change in the factors having an effect on the attributes of the network global variables belonging to the group and the binding of the variables.

Specifically, first, the group control information stored in the group control information memory portion 35 of the control apparatus 1 of the processing object is uploaded and given temporary refuge (ST300). Then, after the user edits the program, group control information is created from the information of the network global variables after such edit (ST301, ST302).

Next, the former group control information given refuge at Step 300 is read out and compared one group at a time with the group control information created at Step 302 (ST303). Then, a judgment of whether or not a created group is a new group is carried out (ST304). Namely, in the case where a created group does not exist within the groups given temporary refuge, because such group forms a new group, this branching judgment becomes Yes, and a new ID is assigned (ST307). This is the ID assigning function.

Further, in the case where the created group is not a new group, the content thereof is compared, and a judgment of whether or not such content is the same is carried out (ST305). Then, in the case where the content is the same, the process proceeds to Step 306, and the old ID is used as is. Further, in the case where the content is different, because a No is made at the branching judgment of Step 305, the process proceeds to Step 307, and a new ID is assigned (ST307). This is the ID updating function. Then, the new group control information for which ID assigning has been carried out as described above is downloaded to the control apparatus, and the process is terminated (ST308).

Further, in the descriptions of each of the embodiments described above, name solving is dynamically carried out for all of the data defined by logical names (network global variables) held by each control apparatus connected to the network, but the present invention is not limited to this and includes the case where name solving is carried out dynamically for one portion. Namely, communication is carried out between the control apparatuses connected to the network, and the processes for updating the correlation information for the logical name, the memory position information and the like may be carried out for all of the data or for only one portion of the data.

Namely, the programming tool is the environment for developing the program executed by the control apparatus, and possesses a function which compiles the program created by the user with a ladder language or the like, and links with a library to convert the program into a format that can be executed by the control apparatus. Now, by means of such programming tool, the programs and variable (data) information of a plurality of control apparatuses are controlled as one project. Accordingly, because the programming tool knows the variable (data) information used by the programs of the plurality of control apparatuses included in the project, name solving can be carried out by means of programming. This is called static name solving. This static name solving can carry out processes by means of the tool according to the same algorithm used in dynamic name solving, and because the tool knows all the variables, batch processing may be carried out at the tool side. Then, dynamic name solving is carried out for items that could not undergo static name solving.

INDUSTRIAL APPLICATION

In the network system, control method, control apparatus and multiprocessor system according to the present invention, because access can be carried out by the logical name without knowing the specific memory position information of the data, the accessing of shared data can be carried out easily without being aware of a communication process. Further, because the user program for operating the control apparatus and the like can include memory position information, a program can be easily constructed, and even in the example case where the memory position that stores data changes thereafter, there is no need to make changes up to the user program (only the correlation information needs to be corrected). Accordingly, because the development for accessing data and the corrections in accordance with system changes thereafter can be carried out easily, this arrangement is preferred.

The invention claimed is:

1. A network system, wherein:

logical names of data shared between a plurality of nodes connected to a network are defined;

said shared data is stored in prescribed memory regions of memory portions of said nodes;

correlation information correlated with said logical names and memory position information of said memory portions storing data corresponding to the logical names is stored in correlation information memory portions;

transmission and reception of said shared data between said plurality of nodes are carried out based on said logical names and said correlation information;

said correlation information is changed while processes of the nodes connected to said network are operated without interruption in the case where the state of a communication partner node changes and the change has an effect on said correlation information, and said correlation information is stored separately in an indirect reference table which stores memory position information used for accessing data stored in the memory portion, and a correspondence table having a correspondence with the memory position information inside said indirect reference table storing the logical names and the memory position information for the logical names.

2. The network system described in claim 1, wherein:

said nodes group the logical names of data shared between the plurality of nodes, and store group control information correlated with a group name and updating information; and in the case where the updating information for the same group name stored in said plurality of nodes does not match, this is judged to be a time when there is an effect on said correlation information, and an updating process of said correlation information is carried out.

3. A control method in a control apparatus capable of sharing data with a plurality of control apparatuses connected to a network, wherein:

when a user program provided in said control apparatus accesses data stored in a memory portion, correlation information correlated with memory position information where said data is stored and with logical names assigned to the data is stored;

said user program acquires said correlation information based on the logical names, and accesses said memory portion, and said correlation information is stored separately in an indirect reference table which stores memory position information used for accessing data stored in the memory portion, and a correspondence table having a correspondence with the memory position information inside said indirect reference table storing the logical names and the memory position information for the logical names.

4. The control method described in claim 3, wherein:
a process for notifying the other control apparatuses connected to the network about the changed content of said correspondence table is carried out in the case where the content of said correspondence table changes.

5. The control method described in claim 4, wherein:
the logical names of data shared between a plurality of control apparatuses connected to said network are grouped, and group control information correlated with a group name, updating information and information on the presence or absence of a possession right to such group is stored; and
said correlation information is updated in the case where the group name and updating information do not match the other control apparatuses, and the updating process of said correlation information is not carried out in the case where there is a match.

6. The control method described in claim 3, wherein:
each control apparatus may receive notification of changed content in the correspondence table and responds to such notification by interpreting the changed content and carrying out a process for updating said indirect reference table.

7. The control method described in claim 3, wherein:
each control apparatus may receive notification of changed content in the correspondence table and responds to such notification by judging whether or not it requires the data of the logical names corresponding to the changed content at the time of the reception, and stores only required items; and
next, the stored said changed content is interpreted, and a process for updating said indirect reference table is carried out.

8. The control method described in claim 3, wherein:
a message requesting the transmission of information related to the logical name is transmitted on the network;
information related to said logical name sent in from other control apparatuses in reply to said message is received; and
a process for creating said indirect reference table is carried out based on said received information.

9. A control apparatus capable of sharing data with other control apparatuses connected to a network, comprising:
a communication portion which carries out data exchange with said other control apparatuses through the network;
a memory portion which stores shared data acquired by said communication portion, wherein said shared data are defined by logical names;
a correlation information memory portion which stores correlation information correlated with the logical names and memory position information of said memory portion storing data corresponding to the logical names;
a control execution portion having a function which accesses said correlation information memory portion based on said logical names, acquires said position information corresponding to the logical names and accesses memory regions of said memory portion storing corresponding data; and
updating means which update said correlation information of said correlation information memory portion based on changes of said position information inside said memory portion, wherein said correlation information memory portion is provided with an indirect reference table which stores the memory position information used for accessing data stored in the memory portion, and a correspondence table having a correspondence with the memory position information inside said indirect reference table storing the logical names and the memory position information for the logical names.

10. The control apparatus described in claim 9, further comprising a function which transmits changed content of said correspondence table to the other control apparatuses connected to the network in the case where the content of said correspondence table changes.

11. The control apparatus described in claim 9, further comprising an updating function which interprets changed content of the correspondence table stored in said other control apparatuses received through the network from the other control apparatuses, and updates the control apparatus indirect reference table.

12. The control apparatus described in claim 11, further comprising means which judge whether or not received notifications of the changed content of said correspondence table are related to logical names, and stores only the notifications of changed content related to logical names;
wherein said updating function is executed based on said stored notification of changed content.

13. The control apparatus described in claim 9, further comprising a function which publicizes the logical names used inside the control apparatus to the other control apparatuses, and supplies data corresponding to the logical names to the other control apparatuses.

14. The control apparatus described in claim 9, further comprising a function which uses the logical names publicized by the other control apparatuses connected to the network, and refers to supplied data corresponding to the publicized logical names.

15. The control apparatus described in claim 9, further comprising:
means for transmitting a message requesting the transmission of information related to logical names on the network; and
means which receive information related to said logical names sent in from the other control apparatuses in reply to said message, and create said indirect reference table based on the received information.

16. The control apparatus described in claim 9, further comprising a function which interprets online edit requests received from a connected programming apparatus, carries out updating of the correspondence table in accordance with the interpretation, and updates said indirect reference table in accordance with the updating of the correspondence table.

17. The control apparatus described in claim 16, wherein the control apparatus is constructed to possess a plurality of said indirect reference tables, and appropriate switching between the plurality of indirect reference tables is carried out to establish one indirect reference table in a state of use.

18. The control apparatus described in claim 9, further comprising:
group control information memory means which group the logical names of data shared between a plurality of control apparatuses connected to said network, and store group control information correlated with a group name, updating information and information on the presence or absence of a possession right to such group;

wherein the updating means execute a process for updating said correlation information of said correlation information memory portion for the data belonging to the group when the group name and updating information do not match the other control apparatuses.

19. The control apparatus described in claim 18 having said possession right, further comprising:

updated information transmission means which transmit said updated information to the other control apparatuses that have the same group but not said possession right;

and correlation information transmission means which transmit said correlation information of said correlation information memory portion for the data belonging to the group only when there is a request from said other control apparatuses.

20. The control apparatus described in claim 18 having said possession right, further comprising:

reference information memory means which store reference information on whether or not reference has been made for data forming input variables for the control apparatus having said possession right from the shared data belonging to the same group; and a function which, based on the reference information stored in said reference information memory means, carries out an updating process of said correlation information for the data only in the case where a reference has not been made to any of the other control apparatuses.

21. The control apparatus described in claim 18 not having said possession right, further comprising:

reception means for receiving said updating information transmitted in from the other control apparatuses having the same group and said possession right; and request means which collate said updating information received by the reception means and the updating information controlled thereby, and in the case where these are different, make a request for the transmission of said correlation information of said correlation information memory portion for the data belonging to the group to the other control apparatuses having said possession right;

wherein said updating means carry out updating of the correlation information held thereby based on said correlation information transmitted in the request.

22. The control apparatus of claim 18, further comprising:

judgment means which judge whether or not each control apparatus that shares data belonging to the same group shares the same data; and a function which stops the accessing of shared data belonging to said same group when said judgment means judges that the same data is not shared.

23. The control apparatus of claim 18, further comprising:

updating stop command operation means; and means for prohibiting execution of said updating process when a stop command is issued from the updating stop command operation means.

24. A multiprocessor system in which occupied local memories possessed by a plurality of processors are connected by a bus, comprising:

a data transfer process portion which periodically carries out data exchange between each of said local memories;

an indirect reference table used for accessing data stored inside the local memories;

a control execution portion which possesses a mechanism for accessing data through said indirect reference table; and a logical name adjustment portion which controls a correspondence table of logical names and local memory addresses and changes said indirect reference table; and wherein correlation information is stored separately in said indirect reference table storing memory position information used for accessing data stored in said local memories, and the correspondence table having a correspondence with the memory position information inside said indirect reference table storing the logical names and the memory position information for the logical names.

\* \* \* \* \*